United States Patent
Morinaga et al.

(10) Patent No.: US 6,801,344 B2
(45) Date of Patent: Oct. 5, 2004

(54) IMAGE READING DEVICE

(75) Inventors: Kazuyuki Morinaga, Toride (JP); Keizo Sasai, Moriya-machi (JP); Naohiro Iwata, Kashiwa (JP); Katsumi Obana, Funabashi (JP); Hideyuki Terashima, Toride (JP); Yoshiaki Suzuki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/410,101

(22) Filed: Oct. 1, 1999

(65) Prior Publication Data
US 2003/0202218 A1 Oct. 30, 2003

(30) Foreign Application Priority Data

| Oct. 5, 1998 | (JP) | 10-283057 |
|---|---|---|
| Oct. 5, 1998 | (JP) | 10-283149 |
| Oct. 5, 1998 | (JP) | 10-283150 |
| Oct. 5, 1998 | (JP) | 10-283152 |
| Oct. 5, 1998 | (JP) | 10-299170 |

(51) Int. Cl.$^7$ .................... H04N 1/04; H04N 1/024
(52) U.S. Cl. .............. 358/474; 358/473; 358/496; 358/498
(58) Field of Search ............... 358/498, 473, 358/474, 496

(56) References Cited

U.S. PATENT DOCUMENTS

| 4,772,958 A | 9/1988 | Suzuki ............ 358/294 |
| 4,922,335 A | 5/1990 | Outa et al. .......... 358/80 |
| 4,962,526 A | 10/1990 | Kotani et al. ...... 379/100.02 |
| 4,969,053 A | 11/1990 | Outa et al. ......... 358/458 |
| 5,412,490 A * | 5/1995 | Kojima et al. ....... 358/473 |
| 5,528,352 A | 6/1996 | Ichinokawa et al. ... 399/365 |
| 5,579,129 A * | 11/1996 | Iwata et al. ........ 271/10.12 |
| 5,749,570 A | 5/1998 | Iwata et al. ........ 271/10.13 |
| 5,802,217 A | 9/1998 | Suzuki et al. ....... 382/274 |
| 6,426,803 B1 * | 7/2002 | Sasai et al. .......... 358/400 |
| 2003/0095296 A1 | 5/2003 | Terashima et al. ..... 358/498 |

FOREIGN PATENT DOCUMENTS

| EP | 0 548 374 | 6/1993 |
| EP | 0 840 194 | 5/1998 |
| JP | 6-209405 | 7/1994 |
| JP | 7-44118 U | 10/1995 |
| JP | 10-020738 | 1/1998 |
| JP | 10-139210 | 5/1998 |

OTHER PUBLICATIONS

Patent Abstracts of Japan; vol. 1999, No. 10, Aug. 31, 1999 (1999–08–31) & JP 11 146151 A (Matsushita Denso System KK), May. 28, 1999 (1999–05–28) * abstract * .

* cited by examiner

Primary Examiner—Edward Coles
Assistant Examiner—Houshang Safaipour
(74) Attorney, Agent, or Firm—Fitzpatrick, Cella, Harper & Scinto

(57) ABSTRACT

There is disclosed an image reading device, comprises a reading section detachably attached to a device body for reading an image of document by manual scanning when detached from the device body, a recording section for recording the image on a sheet, a document conveying path for conveying the document to the reading section and a sheet conveying path for conveying the sheet to the recording section. The conveying directions of the document and the sheet are set to be the same, and the sheet conveying path is disposed below the document conveying path. Similar paper handling can be performed on the document and the sheet, defects such as the mistaking of the discharge port of the document for that of the sheet and the difficulty in handling the document and sheet are eliminated, and the operating property of the device is enhanced. Additionally, the reading section can easily be detached from the device body.

27 Claims, 42 Drawing Sheets

IMAGE READING DEVICE

BACKGROUND OF THE INVENTION

1. Field of the Invention

The present invention relates to an image reading apparatus having sheet conveying device.

Moreover, the present invention relates to an image reading device, particularly to an image reading device, for example, which has a reading section detachably attached to a device body and an openable/closable operating section.

Furthermore, the present invention relates to an image reading device, particularly to an image reading device which is provided, for example, with recording means for recording an image on a recording sheet, or a rolled sheet storage section for feeding the recording sheet to recording means, below separating means for conveying a document to reading means.

Additionally, the present invention relates to an image reading device, particularly to an image reading device which is provided, for example, with a reading section for taking in an image of document, and which is applied to a facsimile machine, a copying machine, a scanner, and the like.

2. Related Background Art

A conventional image reading device of a printer, a copying machine, a facsimile machine, and the like will be described with reference to FIGS. 35 to 38.

Additionally, also according to the present invention, in the image reading device, sheets are conveyed. Examples of the sheets include paper, a thin resin sheet as a substitute for the paper, a post card, a board, a letter, a thin plastic plate, and the like. An example where the paper is conveyed will be described.

In the drawings, a separating piece 1102 is disposed opposite to a separating roller 1101, and pressed onto the separating roller 1101 by spring means 1103. The separating roller 1101 and separating piece 1102 separate and convey a plurality of sheets of document sheet by sheet.

Numeral 1104 denotes a conveying roller for determining the conveying speed of the document. A conveying roller 1105 is rotatably attached so as to hold and convey the document with the conveying roller 1104. Additionally, numeral 1106 denotes a discharging roller for holding the document with a discharging roller 1107 to discharge the document to the outside of a body.

Numeral 1108 denotes an upper document guide for guiding the document, numeral 1109 denotes a lower document guide, and numeral 1100 denotes an image reading device for reading the image of the conveyed document. The separating piece 1102, conveying roller 1105, and discharging roller 1107 are attached to the upper document guide 1108. The separating roller 1101, the conveying roller 1104, the discharging roller 1106, and a motor 1111 for operating the rollers are attached to a frame via a drive substrate 1112.

On the other hand, the upper document guide 1108 is rotatably supported on a protrusion formed on the frame as a support point to open and close using a document path as a boundary so that document jam handling, and cleaning of an image processing device can be performed. Specifically, as shown in FIG. 38, by unlocking a lock (not shown) to rotate the upper document guide 1108 upward, abutment states of the separating roller 1101 and separating piece 1102, the conveying rollers 1104 and 1105, and the discharging rollers 1106 and 1107 can be released. Thereby, the document stopped halfway during conveying can easily be removed by a user.

The operation of the rollers will next be described.

The conveying roller 1104 is constituted of a metal shaft 1104a and a rubber portion 1104b. The rubber portion 1104b is bonded to the metal shaft 1104a to integrally rotate with the metal shaft 1104a. To one end of the metal shaft 1104a, a feeding roller gear 1113 is attached so as to integrally rotate with the metal shaft 1104a. The feeding roller gear 1113 is connected to the reading motor 1111 via reduction gears 1114, 1115, so that it rotates at a reduction ratio N with respect to a step angle of the reading motor 1111.

In the same manner as the conveying roller 1104, the discharging roller 1106 is constituted of a metal shaft 1106a and a rubber portion 1106b. A discharging roller gear 1116 attached to one end of the metal shaft 1106a is connected to the motor 1111 via reduction gears 1117, 1115.

The separating roller 1101 is constituted of a holder portion 1101a and a rubber portion 1101b. A protrusion 1118 is formed on the end surface of the holder portion 1101a. To a separating roller shaft 1119 a disk-shaped mechanical timer 1120 provided with a protrusion 1120a is attached so as to integrally rotate with the shaft 1119.

The protrusions 1118 and 1120a are formed to be in the same position in a radial direction, so that when the separating roller 1101 is attached to the separating roller shaft 1119 and rotated, a play only of a constant angle is formed between the shaft 1119 and the roller 1101.

Moreover, attached to one end of the separating roller shaft 1119 is a separating roller gear 1121 which incorporates a one-way clutch to transmit drive only in one direction. Therefore, the rotating force of the reading motor 1111 is transmitted to the shaft only in a document conveying direction. The separating roller gear 1121 is connected to the motor 1111 via a connecting gear 1122, the conveying roller gear 1113, and the reduction gears 1114, 1115. The separating roller gear 1121 is rotated in the same direction as the conveying roller 1104 by the drive force of the motor 1111.

As shown in FIG. 38, the conventional image reading device 1100 can be opened/closed on the boundary of the document path. The separating piece 1102 and the separating roller 1101 are separately supported by the upper document guide 1108 and the member of the frame. Therefore, since it is very difficult to manage a positional relation between the separating piece 1102 and the separating roller 1101 and the spring state, there is a problem that sheet separating performance is unstable.

Moreover, for the conventional image reading device 1100, three drive rollers of the separating roller 1101, conveying roller 1104 and discharging roller 1106, and the reading motor 1111 are all arranged in the frame, and the positional relation among shafts can be managed by the dimension of a support portion on the frame. When the gears are interconnected, a highly efficient and precise sheet conveying system can be formed. However, when this constitution is incorporated in a reading/conveying system having a hand scanner, the discharging roller 1106 is disposed in the hand scanner. Therefore, it becomes necessary to disconnectably connect the drive of the discharging roller 1106 with the drive system of the sheet conveying device body, and there arises a problem that the highly efficient and precise sheet conveying system cannot be provided.

Furthermore, even if the highly efficient and precise sheet conveying system can be constituted, there is another problem that the number of components is increased and cost is also increased.

Additionally, in recent years, it has been desired that the image reading device should be able to read thin sheet documents as well as thick documents such as brochures and books. Moreover, there is a demand for means for removing the document from the device body when the reading operation of the device is abnormally stopped halfway.

As examples of the means to attain the reading operation of the thick documents for the image scanner, the copying machine, and the like, many constitutions comprise disposing a document base, laying on the document base the sheet documents or the thick documents such as brochures and books, and moving the document base itself or an image sensor as reading means, to read image information of the documents.

In the image reading device in which the device body is compact and easily operable, however, it is difficult to dispose a large document base. Therefore, in recent years, to attain the above-described demand, other structure has been increasingly proposed as follows. For example, in a small-size facsimile device, when the thin sheet document is read, a reading section is disposed in the device body, and image information is read by conveying the sheet document. When the brochure, the book, or another thick document is read, some constitutions comprise detaching the reading section from the device body, allowing the reading section to scan on an image plane to be read of the brochure, the book, and the like, and reading the document image information.

Moreover, to remove the document during abnormal stop, in the image scanner or the copying machine, by opening a document base cover, the document may be removed from the document base.

However, in small-size image reading devices such as a small-size facsimile device, a document conveying path is constituted of upper and lower document guide members. Many constitutions comprise moving the upper document guide member by rotating movement or parallel movement to open the reading document conveying path, and removing the document when the document is abnormally stopped halfway during reading operation.

Here, in the image reading device, white reference data is necessary for judging density during image reading, but in the small-size facsimile device, a white reference member for reading the white reference data is disposed in the opposite portion of the image reading device with respect to the document conveying path in many cases. When the sheet document is conveyed into the device body to read the image information, by reading the white reference member every time the reading operation is performed, the white reference data is taken. Moreover, when the reading section detached from the device body is allowed to scan on the reading image surface to read the image information, the white reference data before detaching the reading section from the device body is frequently used. Therefore, in many cases, the white reference data is usually read when power supply is turned on, so that the reading section can be detached from the device body at any time to perform the reading operation.

Here, first, assuming that the device body cannot recognize whether or not the attachable/detachable reading section is attached to the device body, in the operation of reading the sheet document while the detachable/attachable reading section is detached from the device body, the document is not conveyed onto the reading section, so that the image information cannot be read. Moreover, the document conveying is performed while no reading section is disposed in the document conveying path, and there is a defect that improper conveying, and the like could be generated. Moreover, when the reading section is detached from the device body, and power supply is turned on, there is a defect that the white reference data cannot be taken. Because no white reference member is disposed on the reading device.

Moreover, assuming that the upper document guide is moved, the device body cannot recognize whether or not the document conveying path is opened, but the document conveying path is opened, by turning on the power supply, the white reference member itself is detached from the image reading device, or the reading document conveying path is opened. In this case, exterior light enters the image reading face of the image reading device, which cases a defect that the white reference data cannot sufficiently be taken.

As the countermeasure of the defect, there is proposed a constitution which comprises a reading section presence/absence detecting sensor for detecting whether the reading section is attached/detached, and a document guide opening/closing detecting sensor for detecting whether the document conveying path is opened, so that the device body recognizes whether or not the detachable/attachable reading section is attached to the device body, or whether or not the document conveying path is opened.

However, in the above-described conventional constitution, each of the reading section presence/absence detecting sensor and the document guide opening/closing detecting sensor requires a sensor body, a mechanical component for turning on/off the sensor, an electric circuit around the sensor, wiring for transmitting a sensor ON/OFF signal to the device body, and many other components. The cost increase of the device body cannot be avoided, which also causes a defect that the assembling property and compactness of the device body are deteriorated.

Moreover, one example of the image reading device according to the related art proposed by the present applicant will be described with reference to sectional views of FIGS. 39 and 40.

First, the entire constitution comprises a reading section A' for optically reading the document; a recording section B' as an ink jet recording device; a recording sheet feeding section C' for separating stacked recording sheets and feeding the sheets to a recording unit; a document feeding section D' for separating stacked document sheets and conveying the sheets to a reading unit; and an operating unit E' of FIG. 6 which operates functions, and which is opened during the jam handling of document S, the cleaning operation of the reading section A', the jam handling of recording sheet P, and the replacement of an ink jet head 3105a and an ink tank 3105b in the recording section B'.

Next, the flow of the recording sheet P will briefly be described. A recording sheet conveying path is shown by an arrow F. Specifically, the recording sheet P stacked on a stacking tray 3101 and a pressure plate 3102 of the recording sheet feeding section C' is picked up by a feeding roller 3103, and fed into the recording unit B' by a pair of feeding rollers 3104a, 3104b.

In the recording section B' recording is performed by the ink jet head 3105a as recording means, and the sheet is conveyed by a certain distance in the device, then discharged/stacked by a pair of discharging rollers 3106a, 3106b, and a pair of discharging rollers 3107a, 3107b as discharging means.

Next, the flow of the document S will briefly be described. A document conveying path is shown by an arrow G.

In FIG. 39, the document feeding section D' has a lower document guide face 3161 on which the document S is stacked with its image facing downward. In this case, even when the document S is longitudinal, it can be held by the stacking tray 3101. Specifically, the stacking tray 3101 has a role of stacking both the recording sheet and the document thereon. The document S stacked on the lower document guide face 3161 is positioned by a document slider 3151 which is disposed on the lower document guide face 3161 and which is movable in a width direction. One or a plurality of stacked sheets of document S are struck and set onto a portion surrounded by a friction piece 3152 disposed on an upper document guide 3165 and a separating roller 3153 attached to a lower document guide 3162. The friction piece 3152 is pressed downward from above by a friction piece spring 3158 and is on standby while pressing the separating roller 3153. When a signal for conveying the document S is sensed, the separating roller 3153 is rotated by drive of a motor (not shown). By cooperating action with the friction piece 3152 only the bottom document S is conveyed in the direction of arrow G and the document is successively conveyed to the reading section A' sheet by sheet. The document S conveyed to the reading section A' is conveyed to a document edge sensor 3155 and a photoelectric conversion sensor 3157 by the cooperating action of feeding rollers 3154a and 3154b. The photoelectric conversion sensor 3157 is energized along a reading line by a reading white base 3164, so that the image of the conveyed document S closely abuts on the reading line. Furthermore, the feeding roller 3154a determines the recording speed in a sub-scanning direction of document S, and conveys the document to discharging rollers 3156a and 3156b. Subsequently, the read document S is discharged by the discharging rollers 3156a and 3156b.

The constitution of the operating unit E' will next be described with reference to FIG. 40. As shown in FIG. 40, the top surface of the operating unit E' is provided with keys and slide SWs (not shown) for operating functions and display elements (not shown) of LED and LCD. Moreover, the under surface of the operating unit E' is provided with the upper document guide 3165 to form the conveying path of the document S. Furthermore, on the upstream side of the friction piece 3152, a sensor 3159 for detecting the presence/absence of the document S and a sensor 3160 for detecting the size of the document S are disposed. On the other hand, in the reading section A' of the upper document guide 3165 the feeding roller 3154b and the discharging roller 3156b are attached and pressed downward from above by a roller pressing spring 3167. Moreover, as described above, the reading white base 3164 is disposed between the feeding roller 3154b and the discharging roller 3156b to serve as white reference during document reading. The operating unit E' constituted as described above can be opened in a direction shown in FIG. 40 (front to rear) centering on a hinge portion 3165a as a rotating center which is a part of the upper document guide 3165 and positioned in the rear of the body, and the opened operating unit E' is held by an operating section support arm (not shown). Moreover, when the operating unit E' is closed, the operating unit E' is locked in a normal position by a lock arm (not shown), and the like to maintain the pressing forces of the separating roller 3153 and friction piece 3152, the feeding rollers 3154a and 3154b, and the discharging rollers 3156a and 3156b at constant values.

The arrangement relation of the document feeding section D', the reading section A' and the recording section B' will next be described with reference to FIGS. 39 and 40. As described above, both the document S and the recording sheet P flow in substantially parallel paths from the body rear side of a sheet feeding port to the body front side of a sheet discharge port. Moreover, in the recording section B', for the replacing operation of the ink jet head 3105a and the ink tank 3105b, the jam handling operation of the recording sheet P, and the like, an operation space needs to be provided above the recording section B'. Therefore, above the recording section B', the separating roller 3153 and friction piece 3152 of the document feeding section D' and the reading section A' are not arranged, and they are arranged before the recording section B'.

Here, the operating methods for the replacement of the ink jet head 3105a and the ink tank 3105b and the jam handling of the document S and the recording sheet P will be described with reference to FIG. 40.

An operator first rotates the operating unit E' in a direction of arrow M centering on the hinge 3165a, until it is locked by the lock arm (not shown). In this case, a recording cover section 3166 constituted by a part of the lower document guide face 3161 disposed above the recording section B' appears. By rotating the section as shown in FIG. 40, the portion above the recording section B' is opened to form a space. Subsequently, a cartridge replacement key (not shown) disposed on the lower document guide 3161 is depressed to move the ink jet head 3105a and the ink tank 3105b (usually on standby in a position where no recording cover section 3166 is disposed above) to below the recording cover section 3166, so that the replacing operation is performed in the space. Furthermore, in this state the jam handling of the document S and recording sheet P can be performed.

In the above-described related art, when the operator replaces every ink jet head or only the ink tank, or performs the jam handling of the recording sheet, it is difficult to perform the replacing operation from the front part of the body. Because on the body front side the document feeding section and the reading section are arranged, and the recording section is disposed on the body rear side. Similarly, it is difficult to perform the recording sheet jam handling.

Moreover, in the related art, since the document feeding section and reading section are arranged on the body front side and the recording section is disposed on the body rear side, the depth of the device body is increased, and the installation area is enlarged.

Furthermore, in the related art, since the document feeding section and reading section are arranged on the body front side and the recording section is disposed in the vicinity, and both the document feeding section and the reading section are arranged in parallel above a recording sheet discharge port, space is narrow in the vicinity of the discharge port, and the recording sheet jam is easily generated.

Additionally, in the related art, when the documents are set, the operating unit is opened for the replacing operation of the ink jet head or the ink tank, the jam handling operation of the recording sheet or the cleaning operation of the reading section. In this case, since the document is an obstruction, the document needs to be once removed during the operations, which deteriorates the operation efficiency.

Furthermore, the facsimile machine as the image reading device has spread substantially completely to general companies, and in recent years, has increasingly spread broadly also to general household. In the companies where the sheet documents of A4 size or another fixed size need to be read in large amounts at once, there has been a large demand for the facsimile machine having a large-capacity high-speed automatic document feeder (ADF). In the general household, however, since the documents are seldom read in large amounts once, the ADF does not need a very large capacity. Rather, there are strong demands for the facsimile machine which can read various documents such as newspaper and other large-size documents, documents of unfixed forms, and books, magazines and other documents which cannot be passed through the ADF. To meet these demands, a so-called hand scanner system is widely used, which is constituted so that a reading section can be attached to/detached from a facsimile device body. Therefore, by manually scanning the document which cannot be passed through the ADF by a hand scanner detached from the body, image can be read.

FIGS. 41 and 42 are sectional views for describing the facsimile machine which has the conventional hand scanner. The facsimile machine comprises a facsimile device 9901; a document reading section 9902 for reading image information of a document; a hand scanner 9903 which can be attached to/detached from the facsimile device 9901 and which is provided with the document reading section 9902; a recording section 9904 for recording received data (or data read by the machine) onto recording sheets; an operating section 9905 in which switches (not shown) for operating the device are collected; and an ADF section 9906 driven by a drive source (not shown) for separating and conveying the document sheet by sheet to the reading section 9902 of the hand scanner 9903. Character G denotes the document set on the upper portion of the device, K denotes the recording sheet set inside the device, and arrows H and T indicate conveying paths of the document G and recording sheet K. The document G is separated sheet by sheet from the upper portion of the device by the ADF section 9906, and introduced to the document reading section 9902. After the image is read, the document is discharged to the outside of the device from the front face of the device. On the other hand, the recording sheet is printed with the image information in the recording section 9904, and discharged to the outside of the device from the rear face of the device.

Arrow X indicates a direction in which the hand scanner 9903 is attached/detached. Numeral 9907 denotes an opening for accommodating the hand scanner 9903, 9908 denotes a guide section for guiding the attachment/detachment of the hand scanner 9903, and 9909 denotes a positioning member disposed in the opening 9907. The positioning member 9909 is constituted of an elastic member, and engaged in a concave portion 9910 formed in the hand scanner 9903 to position the hand scanner 9903 in a predetermined position to the device 9901. For the books, magazines and unfixed-form documents which cannot be passed through the document conveying path H and the ADF section 9906, the hand scanner 9903 is detached from the device 9901, the document is manually scanned to read the image, and the image can be printed onto the recording sheet or transmitted.

As described above, by detachably attaching the hand scanner to the device, the books, magazines, and unfixed-form documents can be read. However, in the conventional constitution in which the recording sheets are discharged from the rear face of the device, there are respects to be improved such as "since the recording sheet is behind the device, it is hard to notice document received", "it is hard to remove the recording sheet", "a recording sheet discharging space is necessary in the rear of the device, and the installation area is enlarged", and "it is difficult to perform the recording sheet jam handling". Moreover, since the discharge ports of the document and recording sheet are in different places, in front and rear of the device, the operator has to perform different paper handlings with the recording sheets and the document, which is troublesome. Furthermore, in a disadvantageous respect, there is a possibility that the operator mistakes a sheet taking port.

The above-described reading device of so-called hand scanner system is widely used in which the reading section is detachably attached to the facsimile device body. The prior art is disclosed in Japanese Utility Model Publication No. 7-44118. As described above, by manually scanning the document with the hand scanner detached from the device body, the image can be read.

In the above-described prior art, since the reading section is exposed from the body, and can directly be detached, the following defects are caused.

When the document reading section is touched during the cleaning, or moving of the device body, the reading section tends to be easily detached from the body, or the normal conveying, or reading of the document cannot easily be performed, and reading defects such as the image deficiency by the position deviation of the document and reading section, and the image blur generated by the rising of the document and reading section tend to be easily caused.

Moreover, in the prior art, when the reading section is attached to the body, a special method is necessary, which comprises connecting engaging portions disposed on the reading section and body, rotating the reading section centering on the engaging portions, and engaging the reading section into an elastic member disposed on the body, so that the positions of the body and reading section are fixed. Therefore, the troublesome attaching method generates the attachment mistake of the reading section, and causes the above-described disadvantages.

SUMMARY OF THE INVENTION

The present invention has been developed in consideration of the above-described situation, and an object of the present invention is to provide a constitution which comprises:

reading means detachably attached to a device body for reading an image of document by manual scanning when detached from the device body;

recording means for recording the image on a sheet;

a document conveying path for conveying the document to the reading means; and a sheet conveying path for conveying the sheet to the recording means.

The conveying direction of the document and the conveying direction of the sheet are set to be the same, and the sheet conveying path is disposed below the document conveying path.

Based on the above-described constitution, since the conveying direction of the document to the device body and the sheet conveying direction are set to be the same, similar paper handling can be performed on the document and the sheet, defects such as the mistaking of the discharge port of the document for that of the sheet and the difficulty in handling the document and sheet are eliminated, and the handling property of the device is enhanced. Additionally, since the recording sheet conveying path is disposed below the document conveying path, the reading section can easily be detached from the device body.

Moreover, since the discharge ports of the document and sheet are provided on the front side, the visibility and handling property of the document and sheet are enhanced.

Furthermore, since the reading means is disposed above the sheet conveying path, the recording means can easily be detached from the device body. Additionally, since a large space can be formed above the sheet discharge port, the sheet jam handling can easily be performed.

BRIEF DESCRIPTION OF THE DRAWINGS

FIG. 9 is a diagram showing an arrangement relation of protrusions 162a, 163a.

DESCRIPTION OF THE PREFERRED EMBODIMENTS (a) First Embodiment

A facsimile device 191 provided with an attachable/detachable reading unit as one example of an image reading device 190 according to the present invention will be described with reference to FIG. 1.

The device has a layout of four sections: an operating section A; a reading section B; a recording section C; and a power supply section D in order from above.

Figure 1:
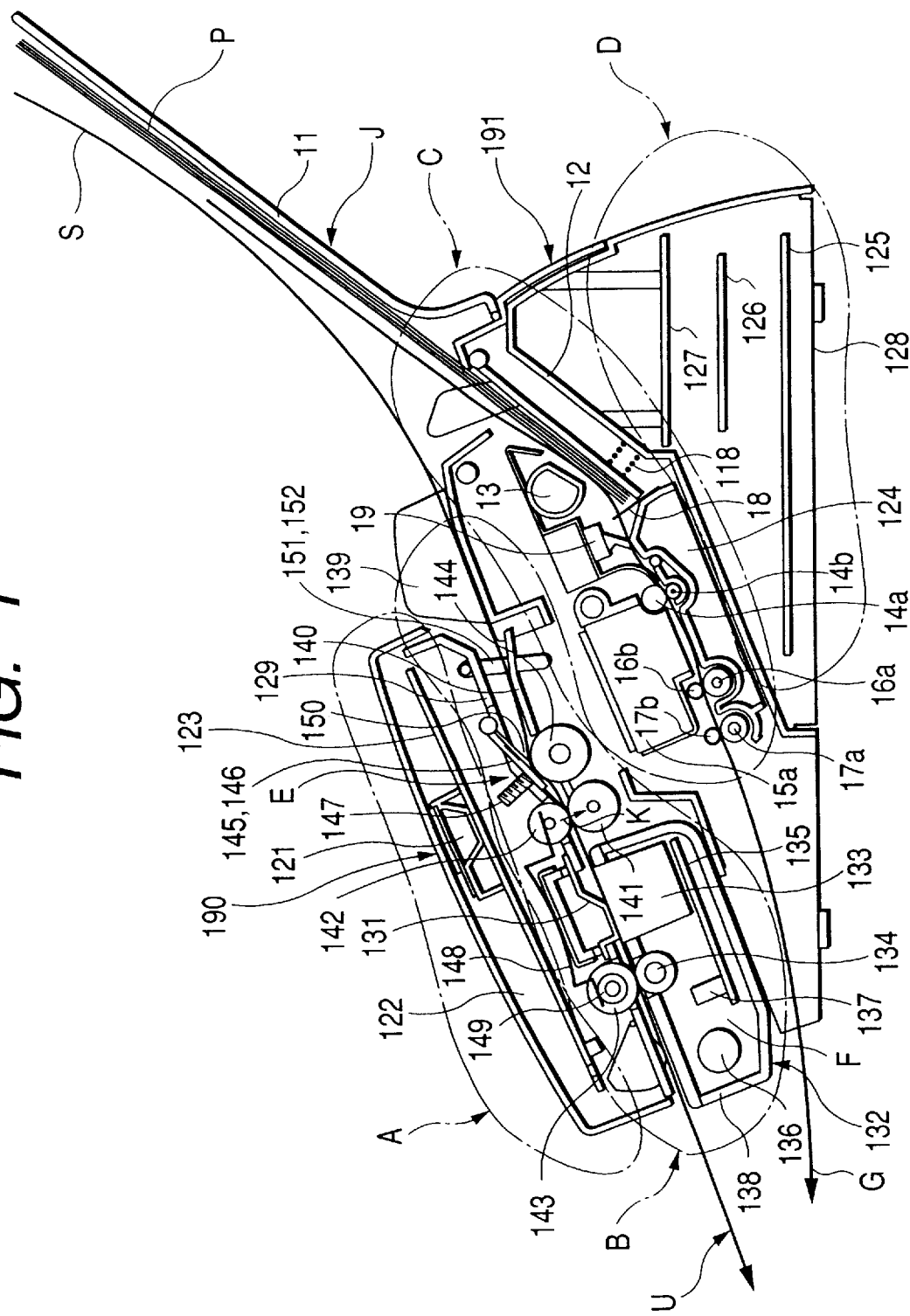
FIG. 1 is a sectional front view of a facsimile device according to a first embodiment of the present invention.

Additionally, in FIG. 1, to facilitate the understanding of constitutions of the sections A to D, for convenience, the sections are surrounded by virtual lines, but they are not necessarily limited to the ranges surrounded by the virtual lines.

First, the operating section A will be described.

The operating section A comprises a panel cover 122 in which windows of keys for operating the functions of the facsimile device 191 and a liquid crystal display (LCD) 121 and a light emitting diode (LED) informing users of device states are arranged; an operation substrate 123 attached to the inside of the panel cover 122 with screws, on which electric components such as LCD and LED are mounted; rubber keys (not shown); and the like. The rubber keys (not shown) are arranged in the lower portions of the keys between the panel cover 122 and the operation substrate 123. When the user pushes the key, the carbon pattern of the operation substrate 123 contacts a carbon contact printed on the under side of the rubber key, and electricity is supplied to the pattern on the substrate, so that ON/OFF is detected. Moreover, the panel cover 122 is attached to an upper document guide 129 described later.

The recording section C will next be described.

First, the flow of the recording sheet P on which image is formed will be described.

A recording sheet conveying path is shown as an arrow G. Specifically, the recording sheet P stacked on a stacking tray 11 and a pressure plate 12 of a recording sheet feeding section J is picked up by a feeding roller 13, and fed into the recording section C by a pair of feeding rollers 14a, 14b.

For the recording sheet P, in the recording section C, recording is performed by an ink jet head 15a as recording means, and the sheet is conveyed by a certain distance in the device, then discharged by a pair of discharging rollers 16a, 16b, and a pair of discharging rollers 17a, 17b as discharging means.

The recording sheet feeding section J and the recording section C will be described.

In FIG. 1, the recording sheet feeding section J is provided with the stacking tray 11 and the pressure plate 12 on which a plurality of recording sheets P with images to be formed thereon are stacked. The stacking tray 11 also plays a role of stacking document S described later. The pressure plate 12 is pressed upward by pressure plate springs 118 which are disposed on both sides of the feeding roller 13 and the pressure plate 12 in a sheet width direction as described later. The pressure plate 12 is pressed downward by cams (not shown) to lower when waiting for sheet supply, which provides a structure easily refilled with the recording sheets P when the recording sheets P are reduced, or eliminated.

On the other hand, when the image is formed on the recording sheet P in the facsimile device 191, the sheet conveying device 190 detects an image forming/recording signal to start its sheet feeding operation. In this case, the depression of the pressure plate 12 by the cams (not shown) is released, and the recording sheet P is picked up by the feeding roller 13. When the picked up recording sheet P deflects a bank sheet 18, it is separated from its topmost position sheet by sheet by the action of resisting force. The separated/fed recording sheet P is detected by a paper edge sensor 19, conveyed to the pair of feeding rollers 14a, 14b, and further conveyed to the recording section C by the pair of feeding rollers 14a, 14b.

Furthermore, the recording section C will be described with reference to FIG. 2.

Figure 2:
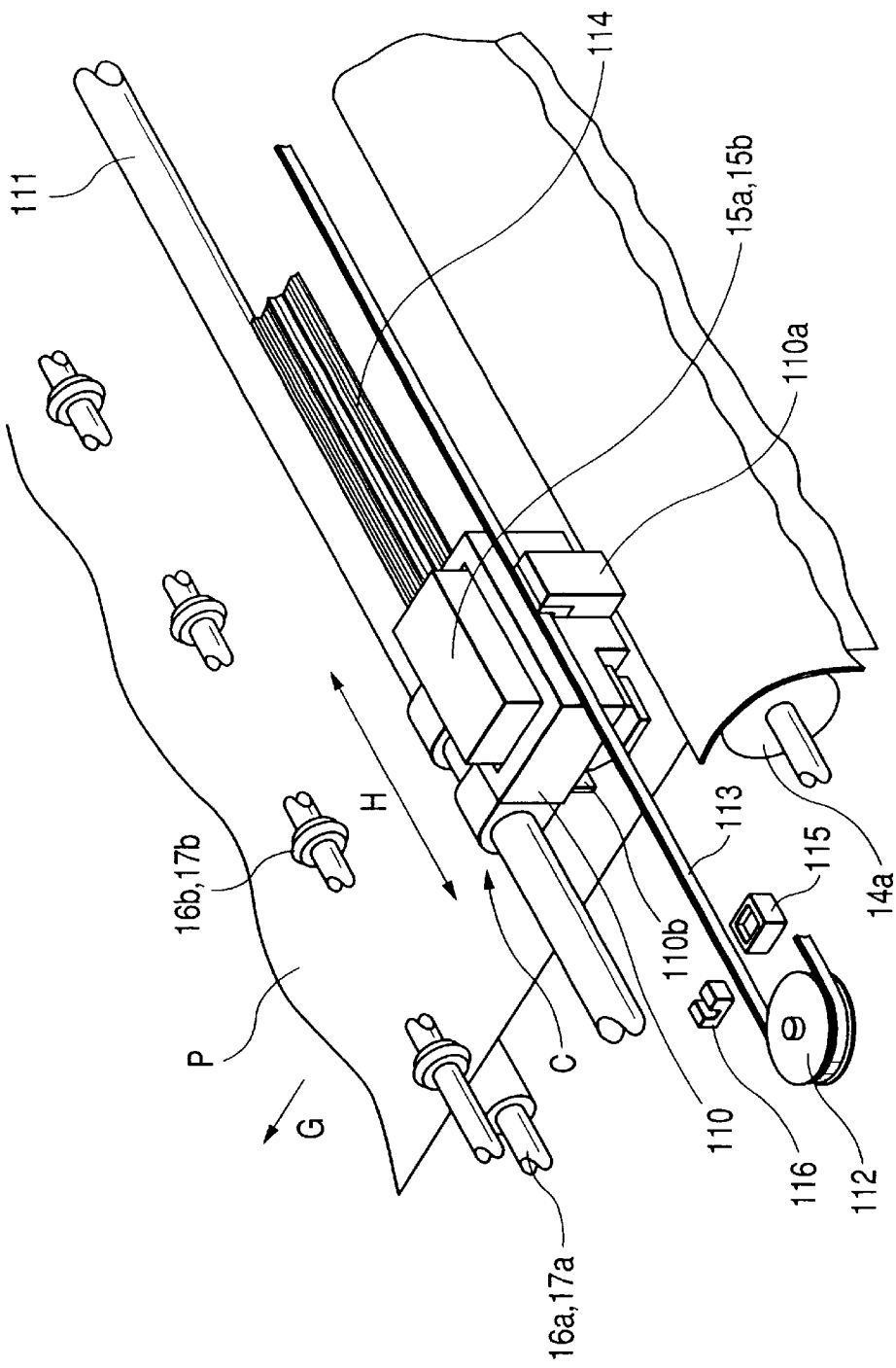
FIG. 2 is a perspective view of a recording section in the facsimile device of FIG. 1.

In FIG. 2, used as the ink jet recording means of the embodiment is a cartridge type integrally provided with the ink jet head 15a and ink tank 15b which can be separated from each other. If necessary, only the ink jet head 15a, or only the ink tank 15b can be replaced.

However, this is merely one example, and as the ink jet recording means of the present invention, there may be a constitution incorporating the ink tank 15b and comprising the ink jet head 15a, in which the entire recording head can be replaced with a new one when ink is missing.

The ink jet head 15a for use in the first embodiment may be either one of a monochromatic ink jet head and a color ink jet head, or can appropriately be replaced with the other one.

For example, the monochromatic ink jet head has a resolution of 360 dpi, and has a nozzle string formed of 128 nozzles (discharge ports) arranged in one row, in which the ink is spouted from the discharge port of a nozzle tip end by a film boiling pressure generated in the ink by the heating of an electrothermal converting element disposed in the nozzle.

On the other hand, in the color ink jet head, black nozzles and color nozzles are separately arranged. A black head has 64 nozzles. A color head has 24 nozzles each for three colors: cyan; magenta; and yellow, and the nozzles are arranged in one row. This color ink jet head is structured so that two ink tanks of black ink and color ink can be replaced.

A carriage 110 precisely holds the ink jet head 15a, additionally reciprocates the head in a direction (main scanning direction, direction of arrow H) orthogonal to the conveying direction (sub-scanning direction, direction of arrow G) of the recording sheet P, and is slidably held by a thrust portion 110a. The reciprocating movement of the carriage 110 is performed by a pulley 12 and a timing belt 113 driven by a carriage motor (not shown). In this case, the recording signal and electric power are supplied to the ink jet head 15a via a flexible cable 114 from the electric circuit of the device body.

Moreover, a cap 115 functioning as ink receiving means is disposed in a predetermined standby position (home position) of the carriage 110, and is elevated/lowered as occasion demands. When the cap is elevated, it closely abuts on the ink discharge port section of the ink jet head 15a to prevent ink evaporation or dust adhesion.

In the first embodiment, to relatively position the ink jet head 15a and the cap 115 in opposite positions, a carriage home position sensor 116 disposed on the device body and a shielding plate 110b disposed on the carriage 110 are used. A transmission type photointerruptor is used in the carriage home position sensor 116. When the carriage 110 moves to its standby position, the transmission of light radiated from a part of the carriage home position sensor 116 is intercepted by the shielding plate 110b. This is used by the sensor to detect that the ink jet head 15a and the cap 115 are relatively positioned opposite to each other. Thereby, the carriage 110 can be set in the predetermined standby position.

The recording sheet P is conveyed in a direction parallel with the ink jet head 15a by the pair of feeding rollers 14a, 14b, and conveyed in a direction of arrow G (sub-scanning direction). The feeding roller 14a and discharging rollers 16a, 17a are driven by a motor (not shown), and the recording sheet P is conveyed in the direction of arrow G (sub-scanning direction) highly precisely in cooperation with the reciprocating movement of the carriage 110 as required. Spurs 16b, 17b are made of highly water repellent materials, and contact the recording sheet P only at a recording sheet surface and blade-shaped circumferential portions.

The spurs 16b, 17b are arranged in the position opposite to the discharging rollers 16a, 17a, apart from one another at predetermined lengths by bearing members (not shown) in a direction of arrow H (main scanning direction), and in a plurality of places. The spurs are constituted to guide and convey the recording sheet P so that they exert no influence on the image even when contacting the non-fixed image on the recording sheet immediately after recording.

The power supply section D will next be described.

As shown in FIG. 1, the power supply section D is disposed below the recording section C, and the sections are partitioned by a frame 124, so that even when electrically conductive ink overflows the recording section C, the ink is prevented from entering the power supply section D.

The power supply section D is constituted of a control substrate 125 for controlling functions such as copying, facsimile transmission, and telephone; a power supply 126 for supplying electricity to the control substrate 125 and devices; a cordless substrate 127 for controlling connected cordless telephone subsets; a bottom plate 128 formed by a sheet metal with the control substrate 125 and the power supply attached thereof.

The reading section B will next be described.

The reading section B is constituted of a sheet conveying section E disposed on the recording section C, and an image forming section F disposed on a sheet discharge path serving also as a document conveying path U, so that the document S is conveyed on the recording section C toward the front of the device from the rear.

The image forming section F is constituted of a white reference 131 attached to the upper document guide 129 described later and a hand scanner 132, and by detachably attaching the hand scanner 132 to the body, the following two operation modes are realized. One is sheet reading while the hand scanner 132 is attached to the body, and the other is hand scanner reading which comprises removing the hand scanner 132, and tracing on medium by a user to read image. The sheet reading is effective in the case where a plurality of cut document sheets are read or where the reading requires precision, and the hand scanner reading is effective for reading the magazine and other media which cannot be conveyed by the sheet conveying device.

The hand scanner 132 is constituted of a color contact sensor 133 for reading the image from the medium; a discharging roller 134 for, during the document reading, holding the document with a discharging roller described later to discharge the document to the outside of the device, or, during the hand scanner reading, pressure-contacting the medium, for example, the document to enhance straight advancing property by manually moving the hand scanner; a control substrate 135 for performing a conversion/compression processing on image data read by the color contact sensor 133 and subsequently storing the data in a memory; a battery 136 for supplying electric power to the color contact sensor 133 and the control substrate 135; an actuator (not shown) connected to the discharging roller 134 for detecting the movement amount of the hand scanner from the rotation angle of the discharging roller 134; an encoder constituted of a photointerruptor 137; a cover 138 for accommodating the above-described components; and the like.

The sheet conveying section E is constituted of a slider 139 movably attached onto a document passing face in a sheet width direction for regulating the setting position of the document of an arbitrary sheet width and suppressing oblique advancing; the upper document guide 129 forming an upper guide of document conveying path, and constituting a support member for members described later; a lower document guide 140 attached to the upper document guide 129 for forming a lower guide of document conveying path; a separating section described later for separating and conveying the set document sheet by sheet; conveying rollers 141, 142 for holding and conveying the document to the reading position; a discharging roller 143 for discharging the document to the outside of the body; and the like.

The separating section is constituted of a separating roller 144 rotatably supported by the upper document guide 129 via a bearing; a separating piece holder 145 attached to the upper document guide 129; a separating piece 146 attached to the separating piece holder; and the like. The separating piece 146 is pressed onto the separating roller 144 via the separating piece holder 145 by a spring 147. The conveying roller 142 is rotatably attached to a shaft vertically movably supported by a rib formed on the upper document guide 129.

Moreover, since the shaft is pressed in K direction by a pressing spring 148 fixed with screws onto the upper document guide 129, the conveying roller 142 is pressed onto the conveying roller 141. The conveying roller 141 is attached via bearings to a drive substrate and a side plate (not shown) which are attached onto the frame outside the document conveying path. The discharging roller 143 is pressed to the discharging roller 134 via a cylindrical discharging roller bearing 149 passed through the shaft by the pressing spring 148. Moreover, since the discharging roller bearing 149 is held between the ribs (not shown) of the upper document guide 129, it is vertically movably supported.

The document reading operation will next be described.

First, the tip end of the document is set, along the slider 139 set along the document width, onto a wedge portion 150 formed by the separating roller 144 and the separating piece 146. Moreover, when the document is set, a document presence/absence sensor 151, and a document width sensor 152 are turned on, and the sheet conveying device is placed in a reading standby state. When a reading start signal is sent by the user's operation, the separating roller 144, conveying roller 141, and discharging roller 143 start rotating by a motor (not shown). Then, the document is separated sheet by sheet by the separating section, and fed to the conveying roller 141, so that a document end detecting sensor disposed on the downstream side of the conveying roller 141 is turned on. The document is further conveyed, pressed onto the surface of the color contact sensor 133 by the weight of the white reference 131 formed of the sheet metal and white sheet-like member, fed to the discharging roller 143 with image data being read, and discharged to the outside of the device.

The roller drive system of the sheet conveying section E will next be described (see FIGS. 1, 3, 4).

The drive system of the sheet conveying section E is largely divided into two parts: from a motor 155 to the conveying roller 141; and from the conveying roller 141 to the discharging roller 134.

First, the drive system from the motor to the conveying roller 141 will be described.

The conveying roller 141 is constituted of a metal shaft 141a, a rubber portion 141b, and the like, and a first conveying roller gear 153 is attached to one end of the metal shaft 141a to rotate integrally with the shaft.

The first conveying roller gear 153 is connected to the reading motor 155 via a reduction gear 157 attached to a shaft 156 caulked to a drive substrate 154, and a pinion gear 158 of the reading motor 155 attached to the drive substrate 154, so that the gear rotates at a reduction ratio N with respect to the step angle of the motor 155.

As described above, since three shafts of the pinion gear 158, reduction gear 157 and conveying roller gear 153 are supported by one member, that is, the drive substrate, not via any other member, the transmission efficiency and precision of the gears can be enhanced, and the feeding precision of the conveying roller 141 to determine the conveying speed for the document conveying precision can be enhanced.

Figure 5:
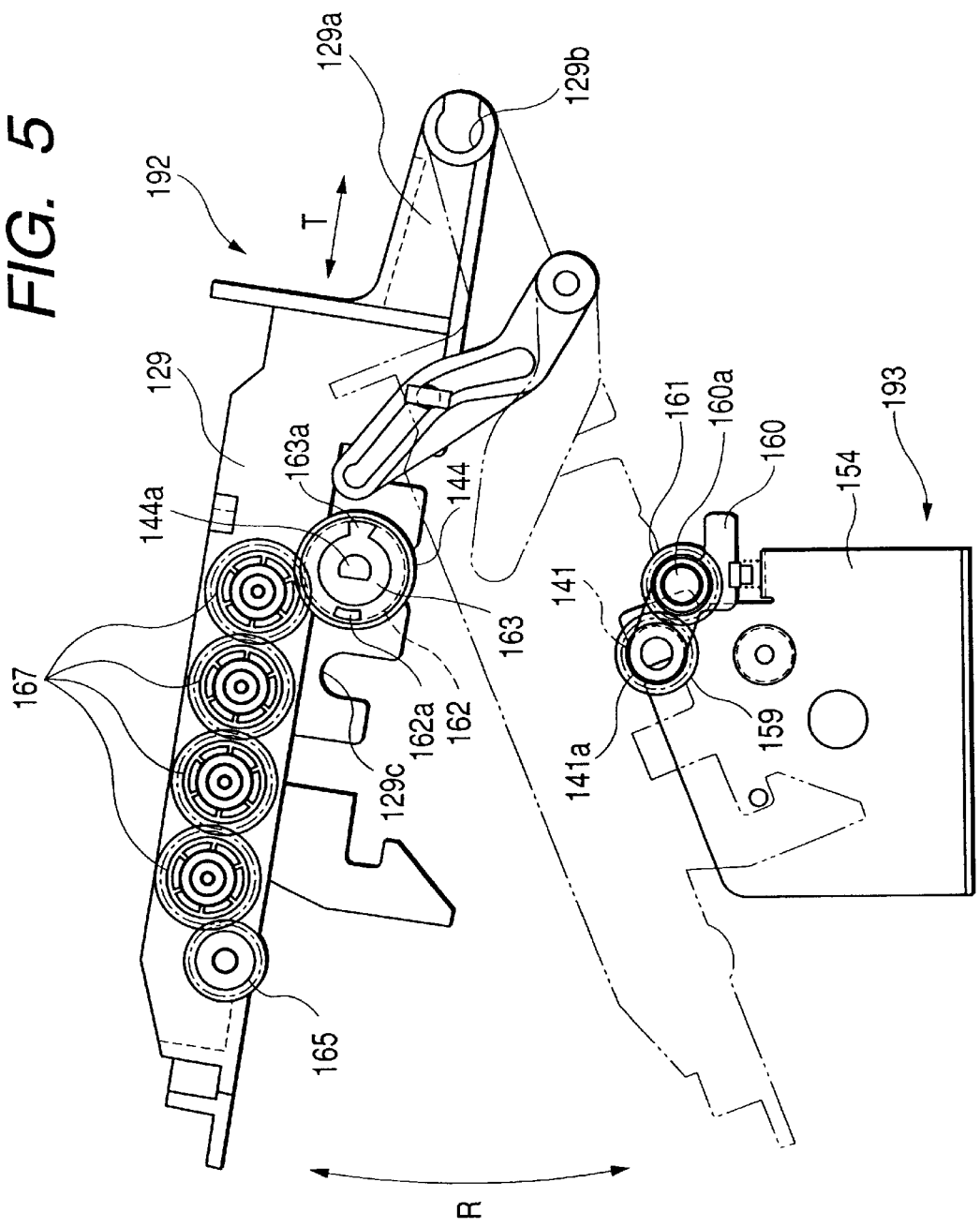
FIG. 5 is a front view showing one part of the drive system of the reading section in the facsimile device of FIG. 1.

As shown in FIG. 5, when the upper document guide 129 is opened, the conveying roller 141 and the separating roller 144 are separated from each other. The drive transmission from the conveying roller 141 to the separating roller 144 is performed by a pendulum described later to enhance the engagement precision of the gears separated into two groups in a drive transmission path.

Specifically, a second conveying roller gear 159 is attached outside the first conveying roller gear 153 (see FIG. 3) to rotate integrally with the shaft 141a, and a pendulum arm 160 is rotatably attached between the first conveying roller gear 153 and the second conveying roller gear 159.

A shaft 160a is integrally formed on the pendulum arm 160, and a pendulum gear 161 is rotatably attached to the shaft to engage with the second conveying roller gear 159, so that the pendulum arm 160 and the pendulum gear 161 can rotate around the second conveying roller gear 159 while engaging with the second conveying roller gear 159.

On the other hand, the separating roller 144 is constituted of a metal shaft 144a, a rubber portion 144b, and the like, and the rubber portion 144b is pressed into the shaft 144a to integrally rotate with the shaft 144a. A separating roller gear 162 is rotatably attached to the shaft 144a. A protrusion 162a is attached to one end surface of the separating roller gear 162. A mechanical timer 163 is constituted of a disk, and a protrusion 163a (see FIG. 5) extended from the disk in radial direction, and attached so that it rotates integrally with the shaft 144a. The protrusions 162a and 163a are formed so that they are located in the same position in the radial and width directions.

Figure 9:
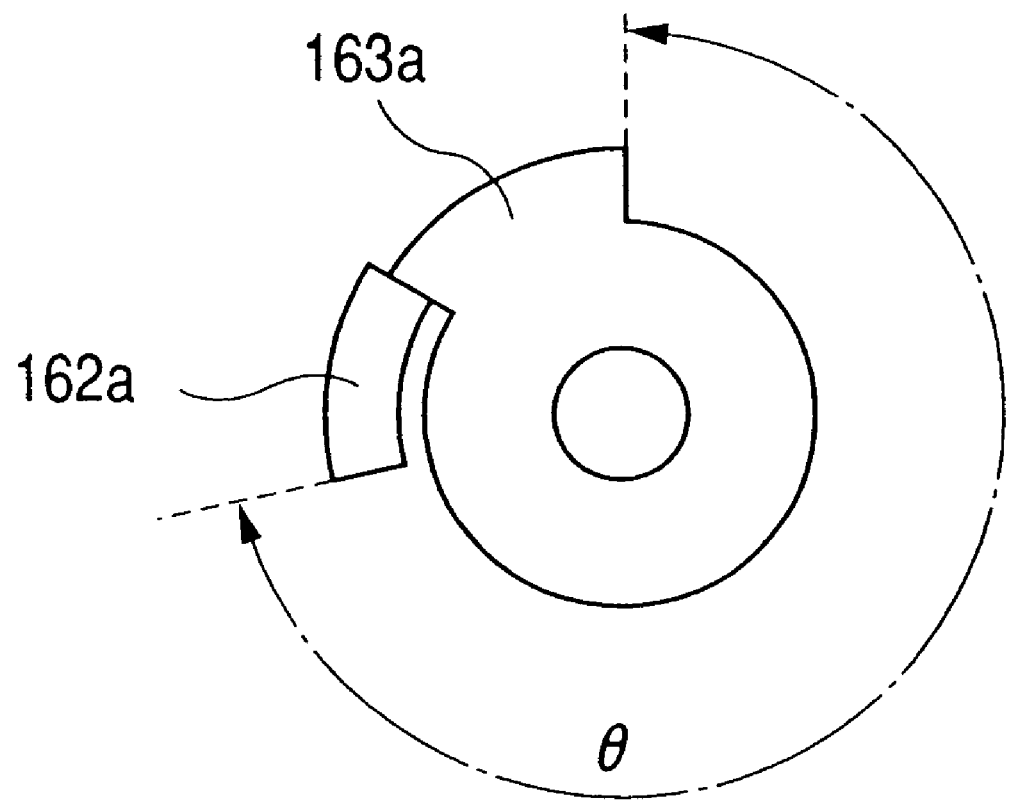

In the constitution, when the separating roller 144 and the separating roller gear 162 are rotated, a play θ is formed by a constant angle as shown in FIG. 9. When the upper document guide 129 is closed, the position of the separating roller deviates by the lock state of the upper document guide 129 and dimension errors. Even in this case, by the movement of the pendulum gear 161, the pendulum gear 161 and the separating roller gear 162 allow the deviation, and engage with each other between adequate shafts.

Figure 6:
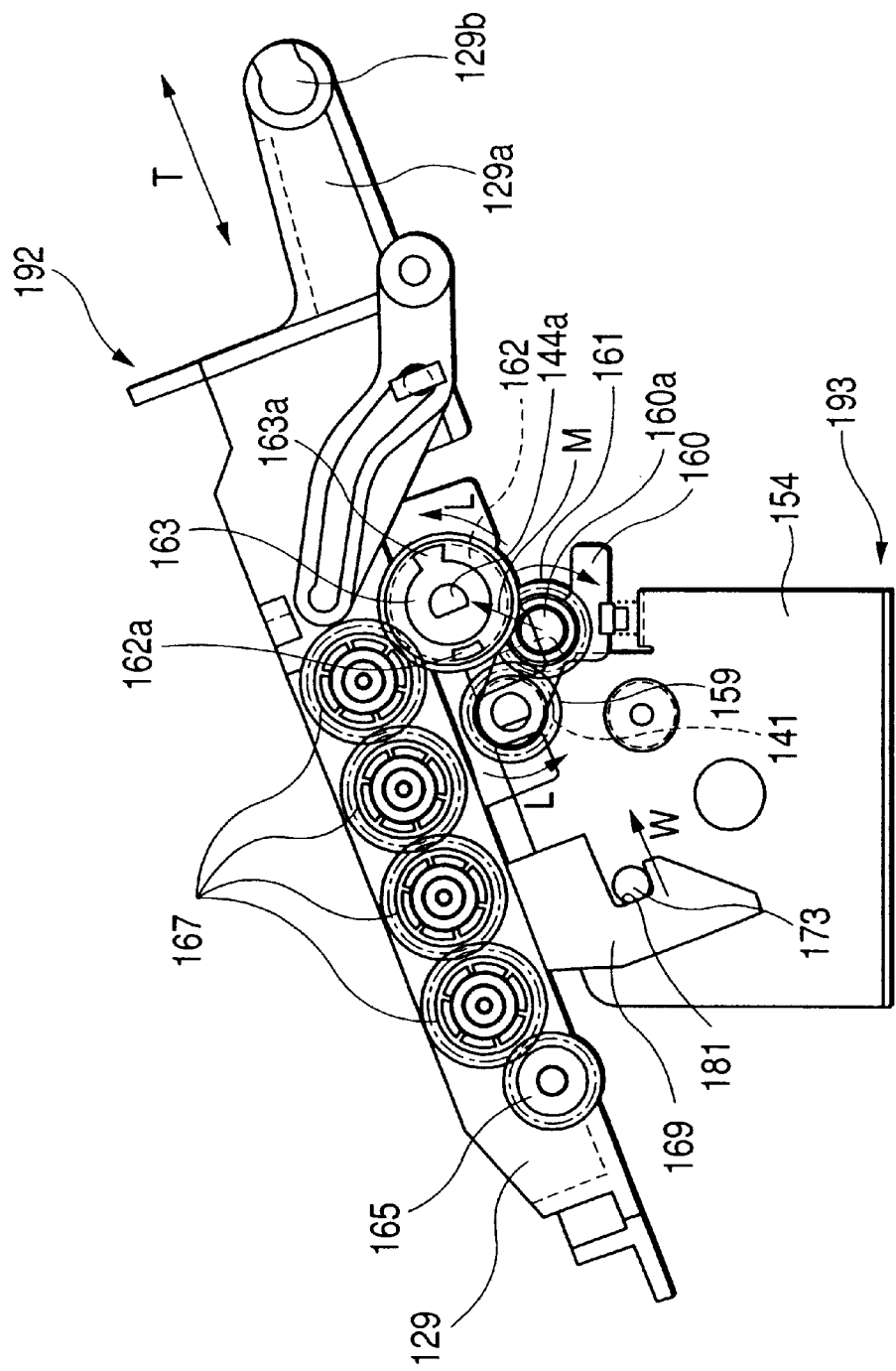
FIG. 6 is a front view showing one part of the drive system of the reading section in the facsimile device of FIG. 1.

Furthermore, when the conveying roller 141 rotates in sheet feeding direction, the second conveying roller gear 159, pendulum gear 161, and separating roller gear 162 rotate in a direction of arrow L as shown in FIG. 6, and forces are added to the shafts in the direction indicated by a pressure angle. Then, the pendulum arm 160 which is the shaft of the pendulum gear 161 moves in a direction of arrow M so that the gears bite one another, and drive can be transmitted to the separating roller 144 from the conveying roller 141 without allowing any gear to escape.

Figure 3:
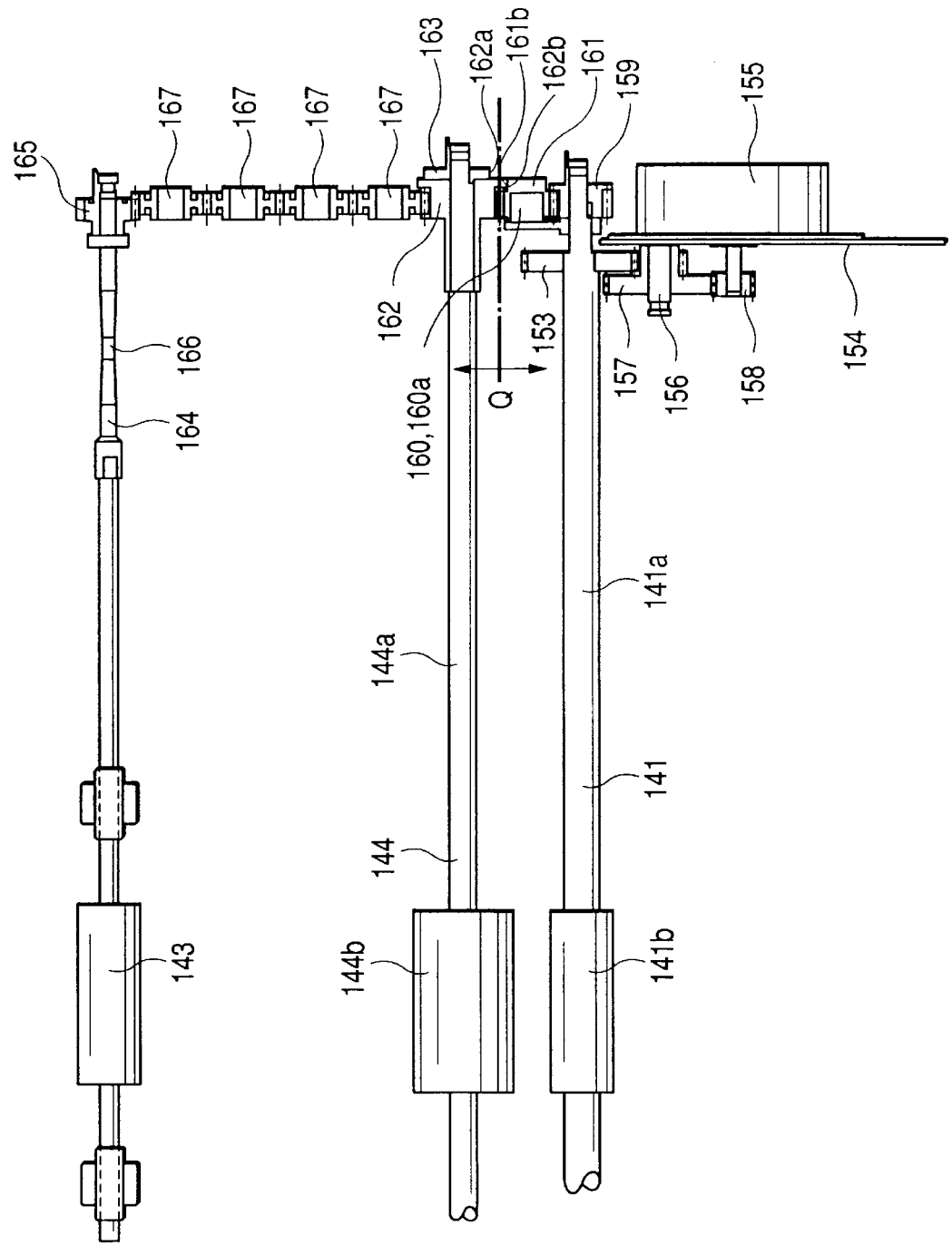
FIG. 3 is a sectional plan view schematically showing a transmission path of a drive system of a reading section in the facsimile device of FIG. 1.
Figure 4:
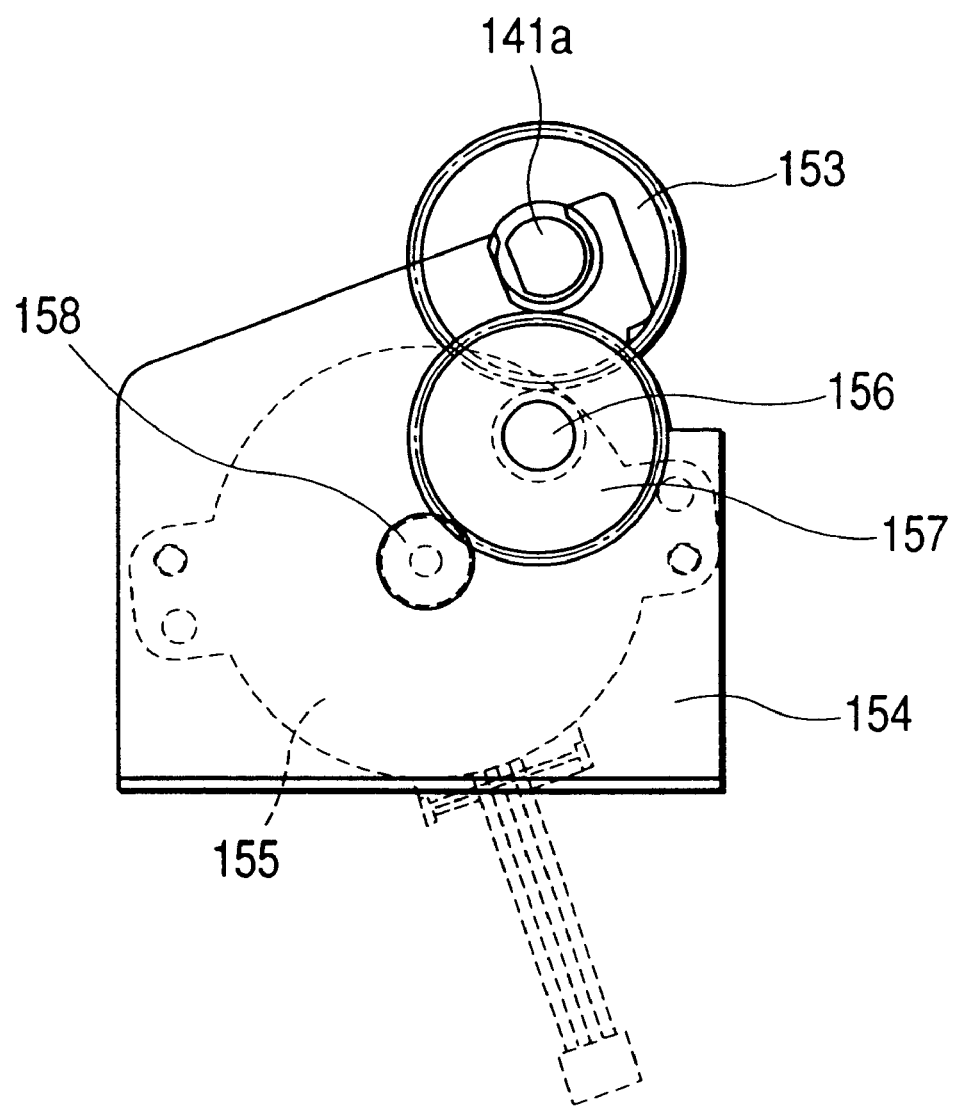
FIG. 4 is a front view showing one part of the drive system of the reading section in the facsimile device of FIG. 1.

Moreover, for the pendulum gear 161 and the separating roller gear 162, in order to prevent a load from increasing when the shafts are too close to each other, as shown in FIG. 3, gear flanges 161b and 162b are allowed to abut on each other to determine positions.

The drive system from the separating roller 144 to the discharging roller 143 will next be described with reference to FIG. 3. A discharging roller joint shaft 164 is attached to one end of the shaft of the discharging roller 143 to integrally rotate with the shaft. To the opposite end of the discharging roller joint shaft 164, a discharging roller gear 165 is attached so as to integrally rotate. The discharging roller gear 165 is rotatably supported on the upper document guide 129. Moreover, the outer diameter of a part of the discharging roller joint shaft 164 is smaller than that of the other part. Even when the position of the discharging roller 143 is vertically moved, shaft center deviation is absorbed by a constricted part 166, and the drive of the discharging roller gear 165 can be transmitted to the discharging roller 143 without increasing the load.

Moreover, drive is transmitted to the discharging roller 143 from the separating roller 144 by four transmission gears 167 which are rotatably attached to the side surface of the upper document guide 129. Here, the module of the gears from the conveying roller 141 to the separating roller 144 is set to be larger than the module from the motor 155 to the conveying roller 143 in order to eliminate transmission mistakes by the pendulum.

In the first embodiment, the module from the motor 155 to the conveying roller 141 is set to 0.5, and the module from the conveying roller 141 to the discharging roller 143 is set to 0.8. As described above, the part to the conveying roller gear 153 from the pinion gear 158 of the motor 155 is supported on the drive substrate 154, and the downstream part from the separating roller 144 to the discharging roller 143 is supported by the upper document guide 129. Specifically, by managing the center distance between the gears of the transmission path divided into two parts by a broken line Q with one member shape, the error of the center distance is minimized, and high transmission efficiency and precision between the paths can be realized.

Furthermore, by connecting the two divided transmission paths with high efficiency and precision with the pendulum gear 161, the error of the relative positions of the drive substrate 154 and the upper document guide 129 is absorbed at maximum, and the drive transmission system with highest performance can be realized.

Figure 7:
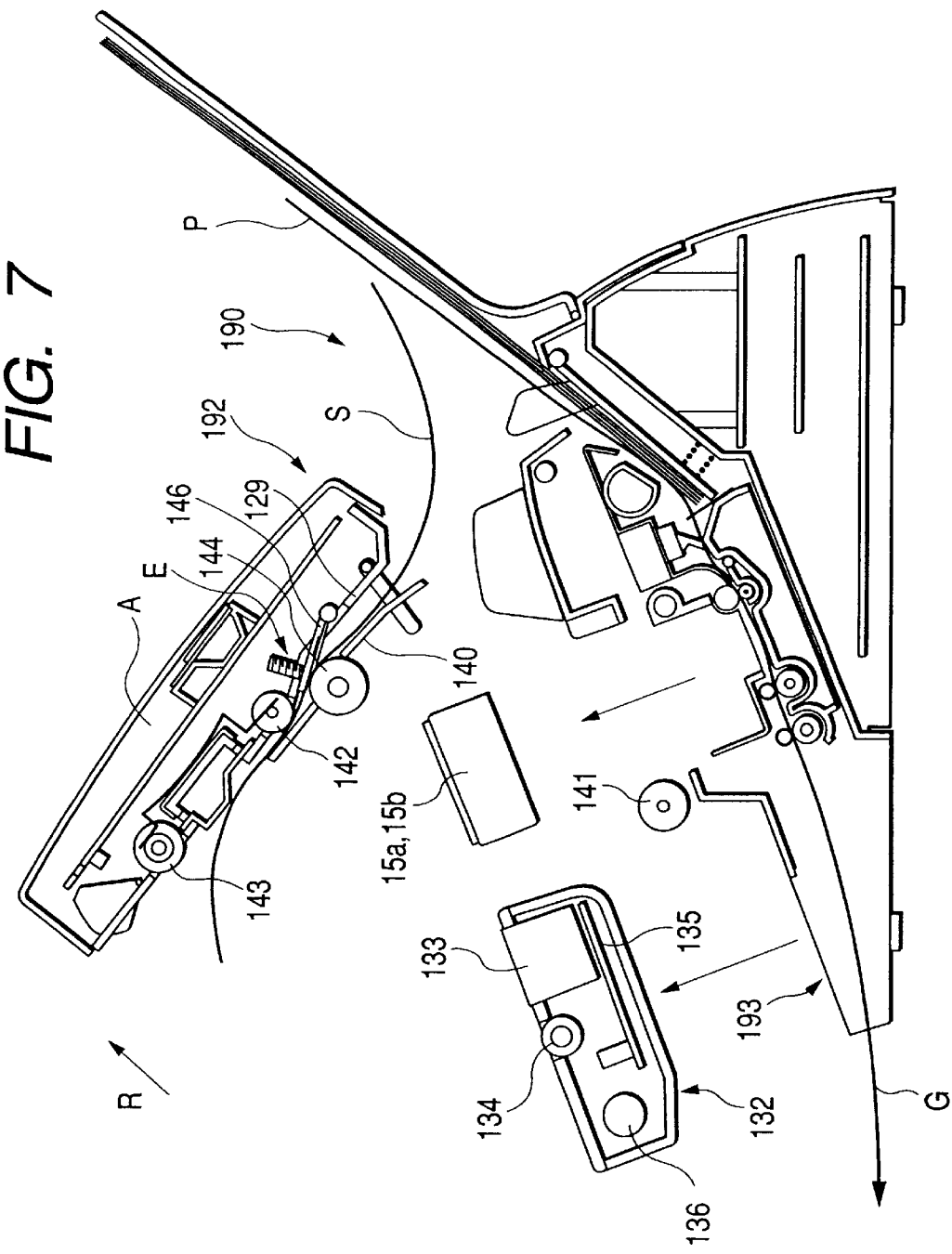
FIG. 7 is a sectional front view when an operating section is opened in the facsimile device of FIG. 1.

For the device of the first embodiment, by releasing the document spring so that it is vertically divided as shown in FIG. 7, the device is divided into a first unit 192 and a second unit 193, so that the jam handling of the document S and recording sheet P, the detachment/attachment of the hand scanner 132, the cleaning of the surface of color contact sensor 133 and the rollers, and the replacement of the ink jet head 15a and ink tank 15b can be performed.

Specifically, the operating section A and the upper document guide 129 can integrally be opened/closed in R direction. FIG. 7 is a diagram showing the opened state. By the above-described constitution of the sheet conveying section E, since the lower document guide 140 and separating roller 144 disposed above the recording section C are opened upward with the upper document guide 129, the user can access the recording section C, so that the jam handling of the recording sheet P, and the replacement of the ink jet head 15a and ink tank 15b can be performed.

Moreover, for the document jam handling, two cases are considered. In one case, as shown in the drawing, the document S is held between the separating piece 146 and the separating roller 144 and jammed. In the other case, the document rear end goes beyond the separating section, and is then jammed In the former case, when the upper document guide 129 is opened, the document S held between the separating roller 144 and the separating piece 146 is lifted up as it is. Therefore, by extracting the document to the front or rear, the jam handling can be performed. In this case, as described above, since the drive transmission on the downstream side of the separating roller 144 is cut from the motor by opening/closing the upper document guide 129 (FIG. 5), there is no load by detent torque of the motor 155, and the separating roller 144 can rotate with no load. Sheets such as thin paper which are easily torn can be extracted without being damaged.

Moreover, in the latter case, by opening/closing the upper document guide 129, the conveying rollers 141 and 142, or the discharging rollers 143 and 134 are separated from each other, so that the jammed document can easily be removed.

An opening/closing mechanism will next be described. An elongated round groove 129b formed in a tip end 129a of an arm extended from the upper document guide 129 so that the document passing direction becomes longitudinal, and a protrusion (not shown) formed on the frame are opposite to each other with a gap therebetween in a document conveying direction T in the upper document guide 129, and the upper document guide 129 is rotatably supported on the protrusion.

Moreover, when the upper document guide 129 is closed, by engaging a U-shaped groove 129c formed in the upper document guide 129 with the shaft 141a of the conveying roller 141, the position of the upper document guide 129 in T direction is managed. In this case, parallelism of the conveying roller 141 and the upper document guide 129 can directly be managed, and by compensating for demerits resulting from the supporting of the conveying roller 141 and separating roller 144 with separate members, the deviation of parallelism of the conveying roller 141 and separating roller 144 is eliminated to prevent the oblique advancing.

A lock mechanism for closing the upper document guide 129 will next be described.

Figure 8:
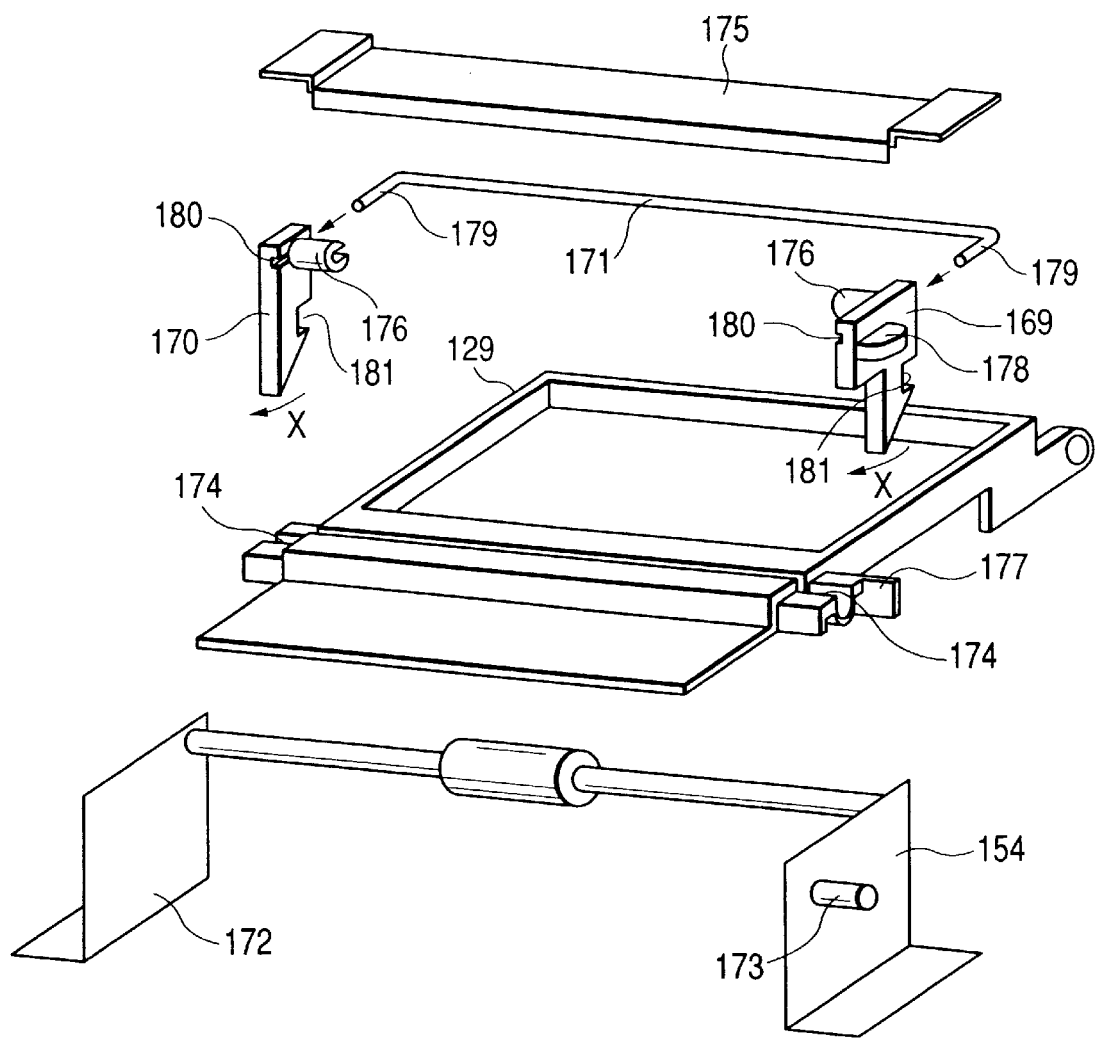
FIG. 8 is a perspective view showing a lock section in the operating section of the facsimile device of FIG. 1.

In FIG. 8, the lock mechanism is constituted of a pair of lock arms 169, 170 rotatably attached to both sides of the upper document guide 129, a lock arm shaft 171 for connecting and synchronously rotating the pair of lock arms 169, 170, and protrusions 173 attached to the drive substrate 154 and a side plate 172.

The lock arms 169, 170 are rotatably supported by holding a shaft 176 formed on the lock arms between a U-shaped groove 174 formed in the upper document guide 129 and a reinforcing plate 175 attached to increase the strength of width direction of the upper document guide 129.

Moreover, one of the lock arms 169, 170 is constantly pushed toward a stopper portion 177 formed in the upper document guide 129 by a spring in the direction of arrow W (FIG. 6). On the lock arm on the side of the spring, a release lever 178 is integrally formed for manually rotating the lock arm, and can be accessed, in a combined state with the operating section, from a notch in the side surface of the panel cover.

The lock arm shaft 171 is formed by bending a metal bar material in U-shape, and bent portions 179 on both ends are engaged in grooves 180 formed in the lock arms. Moreover, the center of the shaft portion of the lock arm shaft 171 for connecting both lock arms is aligned with the rotating center of the lock arm.

As described above, since the bar material is used in the lock arm shaft 171, and the lock arm shaft is disposed in the rotating center of the lock arm, the space occupied in the device is minimized, and maximum strength can be obtained. Specifically, when the second moment of area of a conventional U-shaped metal sheet and bar material (not shown) is calculated, the bar material has a larger torsional strength per sectional area in the device. When the same strength is provided, the sectional area can further be reduced. Moreover, by aligning the rotating center, even when the lock arm is rotated, the occupant area is unchanged.

Furthermore, since the bar material requires no molding metal, it is advantageously very inexpensive. Since the lock arm shaft is extended over the entire area in the width direction of the device body, needless to say, a smaller sectional area is preferable. With regard to attachment of the lock arms and the lock arm shaft 171, when shaft materials and members are attached (press-inserting, D cutting) as in the attachment of usual gears and shafts, the torsional strength is weakened because of excessively thin shafts. Moreover, rattling is increased. Since the synchronous rotation to the pair of lock arms cannot be performed, opening/closing defects could be generated.

Therefore, both ends of the shaft are bent so that torsional forces are received by the bent portions. Nibs 181 on which the protrusions 173 are caught are formed on the lock arms 169, 170, and locked with the frame when the upper document guide 129 is closed and pressed by several millimeters. In this case, the conveying roller 142 and the discharging roller 143 contact the conveying roller 141 and the discharging roller 134 under pressure, and the document is conveyed with spring force of the pressing spring 148. The lock is released by rotating the lock arm in X direction by the release lever 178.

The image reading device of the present invention is divided into the first and second units in the sheet conveying path as the boundary, constituted so that the units can be opened/closed, and provided with the sheet separating rotating member and sheet separating member in one of the units. Therefore, the following effects are provided.

When jam occurs in the sheets, in order to perform the jam handling which comprises removing the jammed sheet or recovering the sheet to a normal state, the first and second units are separated to open the sheet conveying path. In this case, the sheet separating rotating member and the sheet separating member fail to be separated. Dispersions of the relative positional relation of the sheet separating rotating member and the sheet separating member necessary to enhance the sheet separating performance, and the biasing forces of the members can be minimized, and the sheet separating function can be enhanced.

In the image reading device of the present invention, since the second unit is provided with the drive source for operating the sheet separating rotating member, the pair of conveying rollers and the pair of discharging rollers, the following effects are provided.

During the sheet jam handling, when the sheet conveying path is opened to perform the sheet jam handling, the drive transmission system of the sheet separating rotating member is cut off from the drive source, and the sheet separating rotating member can be placed in a free rotatable state. When the sheet held between the sheet separating rotating member and the sheet separating member is extracted toward the upstream or downstream side of the sheet conveying direction, the sheet separating rotating member rotates substantially without applying any burden. Without damaging the sheet, the sheet jam can be handled.

In the image reading device of the present invention, the second unit is provided with the other roller which is a drive-side roller of the pair of the conveying rollers, and the other roller is a drive roller operatively connected to the drive source, which provides the following effects.

In the constitution, since the other roller as the drive-side roller of the pair of the conveying rollers and the drive source are arranged on the same side with respect to the sheet conveying path, the drive source, reduction gear and conveying roller can be supported by one member, which facilitates management of the relative position, realizes, for example, a highly efficient and precise gear transmission, and enhances the rotating precision of the conveying roller to determine the document feeding precision.

In the image reading device of the present invention, since the attachable/detachable image reading means is mounted on the second unit, and the first unit is provided with the drive-side roller of the pair of the discharging rollers, drive force can easily be transmitted to the drive-side roller via the sheet separating rotating member, so that the structure with the reduced number of components, saved space and reduced cost can be formed.

(b) Second Embodiment

A second embodiment of the present invention will be described hereinafter with reference to the drawings.

Figure 10:
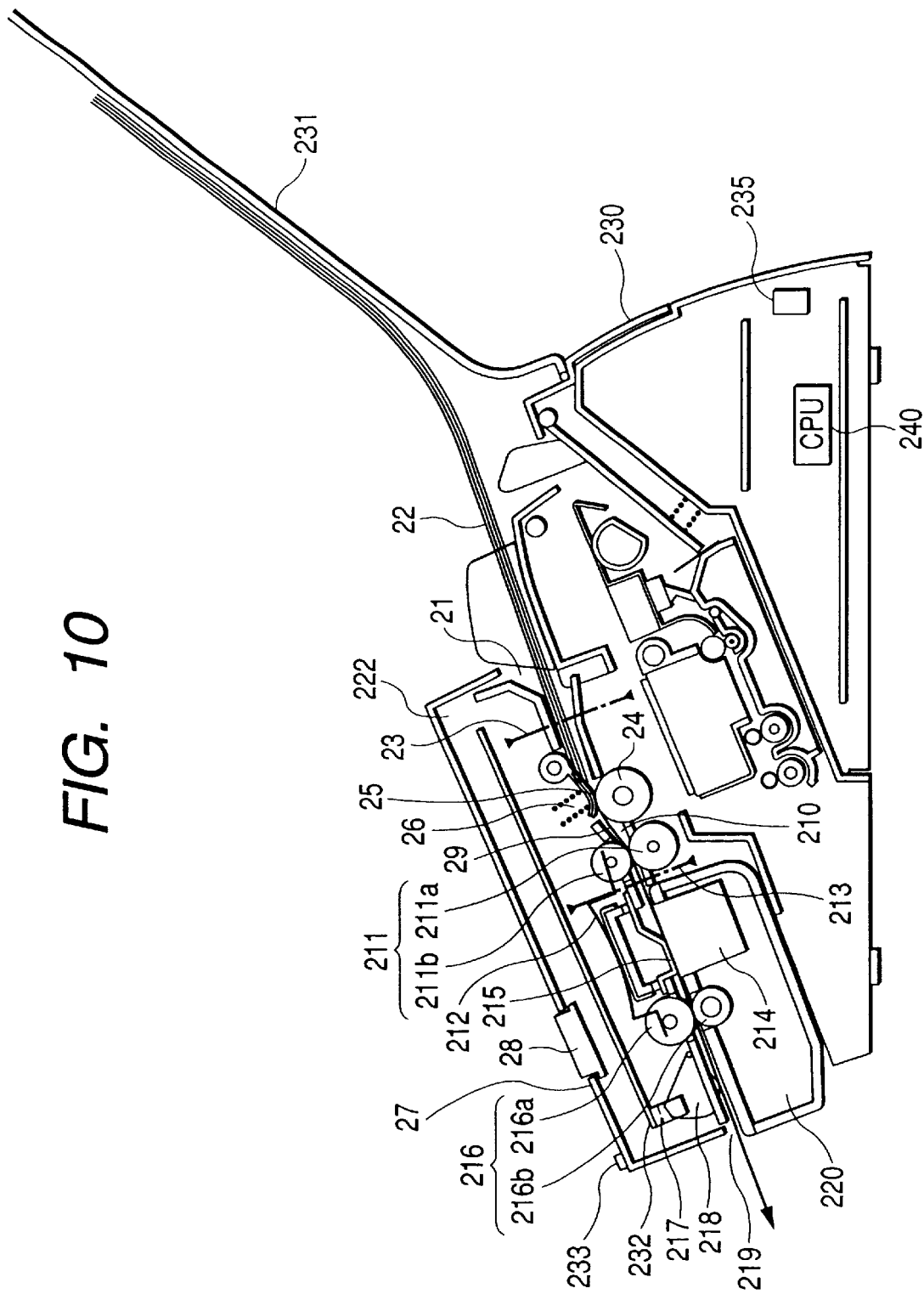
FIG. 10 is a longitudinal sectional front view of the facsimile device according to a second embodiment of the present invention.

FIG. 10 is a schematic sectional view of the facsimile device as the image reading device of the second embodiment of the present invention.

In FIG. 10, the device is provided with a document inserting port 21; a document bunch 22; a schematically shown document presence/absence detecting sensor 23; a separating roller 24; a separating piece 25; a separating piece pressing spring 26; an operation panel 27; keys 28 on the operation panel 27; a separated sheet of document 29; a document conveying path 210 of the document 29; feeding rollers 211a, 211b; a feeding roller pair 211 formed of feeding rollers 211a, 211b; a pressing spring 212 for the feeding and discharging rollers; a schematically shown document tip/rear end detecting sensor 213; a reading sensor (reading means) 214 which is an adhesion type image sensor; a white reference member 215 which is a reading sensor opponent member; discharging rollers 216a, 216b; a discharging roller pair 216 formed of the discharging rollers 216a and 216b; a photointerruptor sensor (mounting detecting sensor) 217 for detecting attachment/detachment of a reading section and opening/closing of an operating section; a reading section attachment/detachment and operating section opening/closing detecting sensor actuator (operating member) 218; a document discharge port 219; and a reading section 220 including a reading sensor 14 and discharging roller 216b.

The detecting sensor 217 and operating member 218 constitute mounting detecting means 217, 218 which detect the opened/closed state of an operating section 222 and the attachable/detachable state (mounted state) of the reading section 220.

Numeral 231 denotes a stacking tray on which the document bunch 22, or recording sheets (not shown) are stacked. The document conveying path 210 is formed by a reading section guide 221a as an upper guide including the separating roller 24, feeding roller 211b, discharging roller 216a, and the like which are disposed on the side of the operating section 222; a lower guide including the discharging rollers 211a and 216b, and the like which are disposed on the side of a device body 230; and the like. The operating section 222 is provided with the operation panel 27 including the operating keys 28. The operation panel 27 is provided with a display section (display means) 233 as transmission means for informing a user of the opened state of the operating section 222, or the detached state of the reading section 220.

(1) Reading Operation When Reading Section is Attached to Device Body

Here, document conveying flow in the operation which comprises attaching the reading section 220 to the device body 230, conveying the sheet document 29 through the document conveying path 210 in the device body 230, and reading image information of the document 29 by the reading sensor 214 will be described with reference to FIG. 10 (referred to as the sheet through reading operation).

In FIG. 10, when the document bunch 22 is inserted to the document inserting port 21 of the device, the document presence/absence detecting sensor 23 transmits a signal to a control section (CPU) 240, and the device recognizes that there is a document. Furthermore, the document bunch 22 is inserted so as to reach a document separating section which is provided with the separating roller 24 and the separating piece 25 disposed opposite to the separating roller 24 to the document conveying path 210. The separating piece 25 is subjected to a biasing force in a direction in which the separating roller 24 is pressed by the separating piece pressing spring 26. Here, by depressing the key 28 on the operation panel 27, a reading drive system (not shown) is operated, and the separating roller 24 rotates in a direction in which the document bunch 22 is conveyed.

The document bunch 22 is separated sheet by sheet when held between the rotating separating roller 24 and the separating piece 25 pressed onto the separating roller 24 by the separating piece pressing spring 26. The separated document 29 is conveyed through the document conveying path 210 by the rotating separating roller 24, and conveyed to the position of the feeding roller pair 211 of the feeding rollers 211a and 211b. The feeding roller 211b is subjected to a biasing force in a direction in which the feeding roller 211a is pressed by the pressing spring 212, and the pressing spring 212 is adjusted so that the document 29 is conveyed with an adequate conveying force by rotation of the feeding roller 211a.

For the document 29 conveyed by the feeding roller pair 211, a document tip end is detected by the schematically shown document tip/rear end detecting sensor 213. After the document tip end is detected, the reading drive system (not shown) rotates by a certain number of steps S1, so that the document 29 is conveyed by a certain constant distance T1. Here, the reading sensor 214 performs a reading operation to read the white reference face of the white reference member 215 which is disposed opposite to the reading sensor 214 to the document conveying path 210 and pressed by its own weight to the reading sensor 214.

In this case, the conveying distance T1 of the document 29, that is, the number of steps S1 of the drive system is adjusted so that the tip end of the document 29 should not reach the reading point of the reading sensor 214, or the tip end of the document 29 should not lift upward the white reference face of the white reference member 215 in FIG. 10.

Data obtained by reading the white reference face of the white reference member 215 is used as density reference data in a series of reading operations. In white/black reading, the data is used as the reference data of shades of white/black, and in color reading, the data is used as the reference data of shades of white/black, red, green, and blue.

When the white reference reading is completed, the reading drive system (not shown) rotates by a certain constant number of steps S2, so that the document 29 is conveyed by a certain constant distance T2. Here, the image information reading operation of the document 29 is started. As the reading operation of document image information advances, the document 29 is conveyed to the left in FIG. 10, and the document 29 is then conveyed by the feeding roller pair 211 and the discharging roller pair 216. The discharging roller 216a is subjected to the biasing force in the direction in which the discharging roller 216b is pressed by the pressing spring 212. The conveying force of the discharging roller pair 216, that is, the pressing force of the pressing spring 212 for the feeding/discharging rollers is adjusted, so that even when the document 29 is conveyed by the feeding roller pair 211 and the discharging roller pair 216, or even when the document is conveyed only by the discharging roller pair 216 as described later, excellent conveying property is held.

As the reading operation of document image information advances, the document 29 is further conveyed toward the left in FIG. 10, and a document rear end is detected by the schematically shown document tip/rear end detecting sensor 213. After the detection of the document rear end, the reading drive system (not shown) rotates by a certain constant number of steps S3, and the document is conveyed by a certain constant distance T3. Here, the reading operation of image information of the document 29 is completed. Additionally, after the rear end of the document 29 passes through the feeding roller pair 211, the document 29 is conveyed only by the conveying force of the discharging roller pair 216.

When the image information reading operation is completed, the document 29 is further conveyed toward the left in FIG. 10 by the discharging roller pair 216, and discharged to the outside of the device via the document discharge port 219.

Additionally, after the completion of the image information reading operation of the document 29, when the document presence/absence detecting sensor 23 still detects that there is a document, the device starts its reading operation of a second sheet of document. Here, regardless of the detection result of the document presence/absence detecting sensor 23, during the reading operation of a first sheet of document 29, the reading drive system (not shown) rotates. Therefore, when the first sheet of document 29 passes out of the document separating section formed of the separating roller 24 and the separating piece 25, the second sheet of document starts to be conveyed. In this case, the rotating speed of the feeding roller 211a or the separating roller 24, and the drive section of the separating roller 24 are adjusted, so that an adequate interval is made between the first and second sheets of document 29, and excellent reading operation of a plurality of sheets can be performed.

By repeating this procedure, the reading operation of image information of all document sheets in the document bunch 22 inserted via the document inserting port 21 is performed. Subsequently, when the reading operation of the last sheet of the document bunch 22 is completed, and the last sheet of document is securely discharged to the outside of the device, a series of sheet through reading operations are completed.

Additionally, the above-described white reference reading operation is performed before the image information reading of the first sheet of document 29, not before the image information reading of the second and subsequent sheets of document.

(2) Description of Reading Section Attachment/Detachment and Operating Section Opening/Closing Detecting Sensor The reading section attachment/detachment and operating section opening/closing detecting sensor will next be described with reference to FIGS. 11 to 13.

Figure 11:
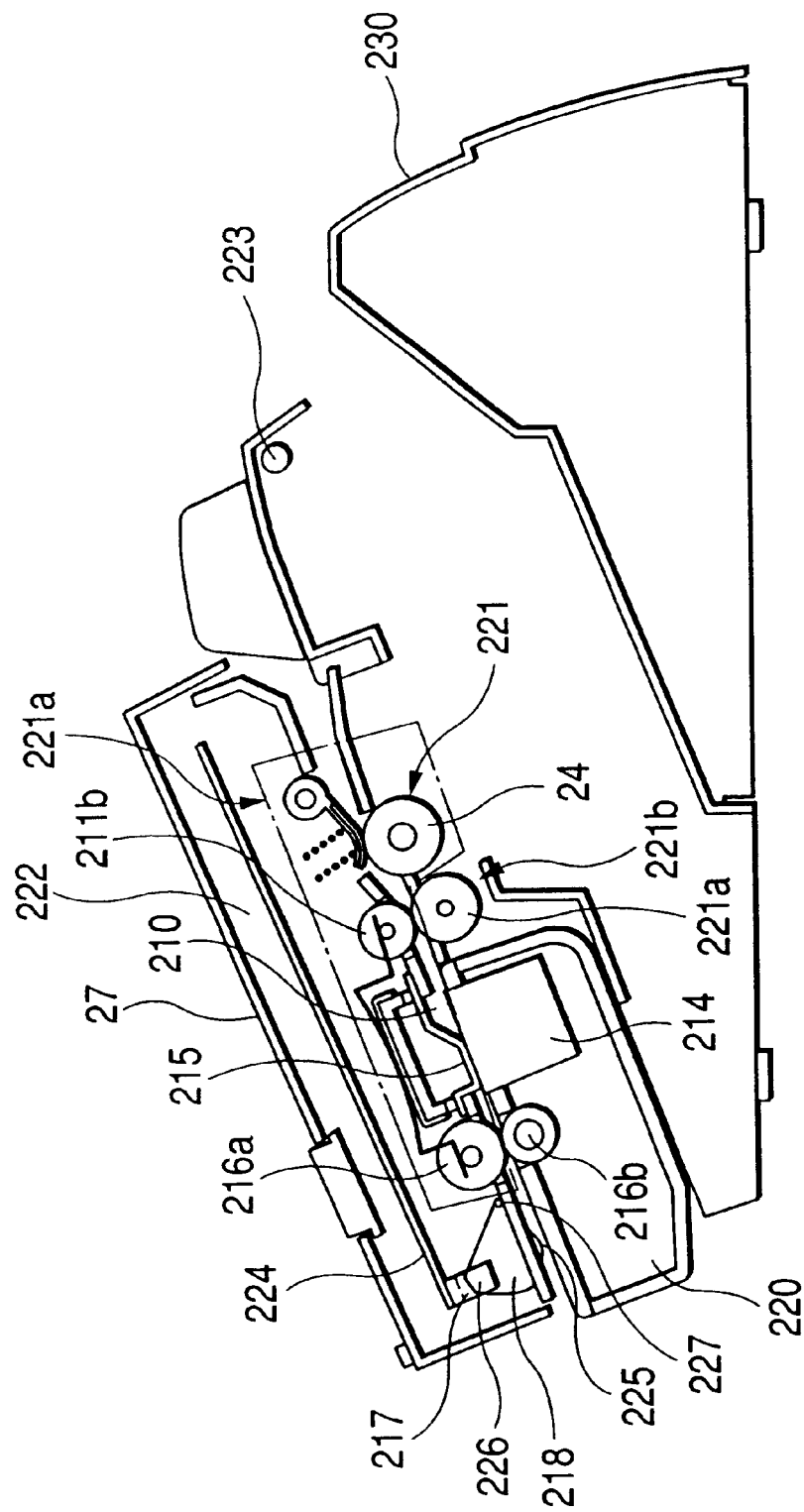
FIG. 11 is a longitudinal sectional front view in the vicinity of the reading section while in FIG. 10 the reading section is attached to the facsimile device body and the operating section is closed.

FIG. 11 is a schematic sectional view in the vicinity of the reading section, while the reading section is mounted on the facsimile device body 230 and the operating section 222 is closed in the facsimile device according to the embodiment of the present invention. FIG. 12 is a schematic sectional view in the vicinity of the reading section, while the reading section is mounted on the facsimile device body 230 and the operating section is opened in the above-described facsimile device. FIG. 13 is a schematic sectional view in the vicinity of the reading section, while the reading section is detached from the facsimile device body 230 and the operating section 222 is closed in the facsimile device.

Figure 12:
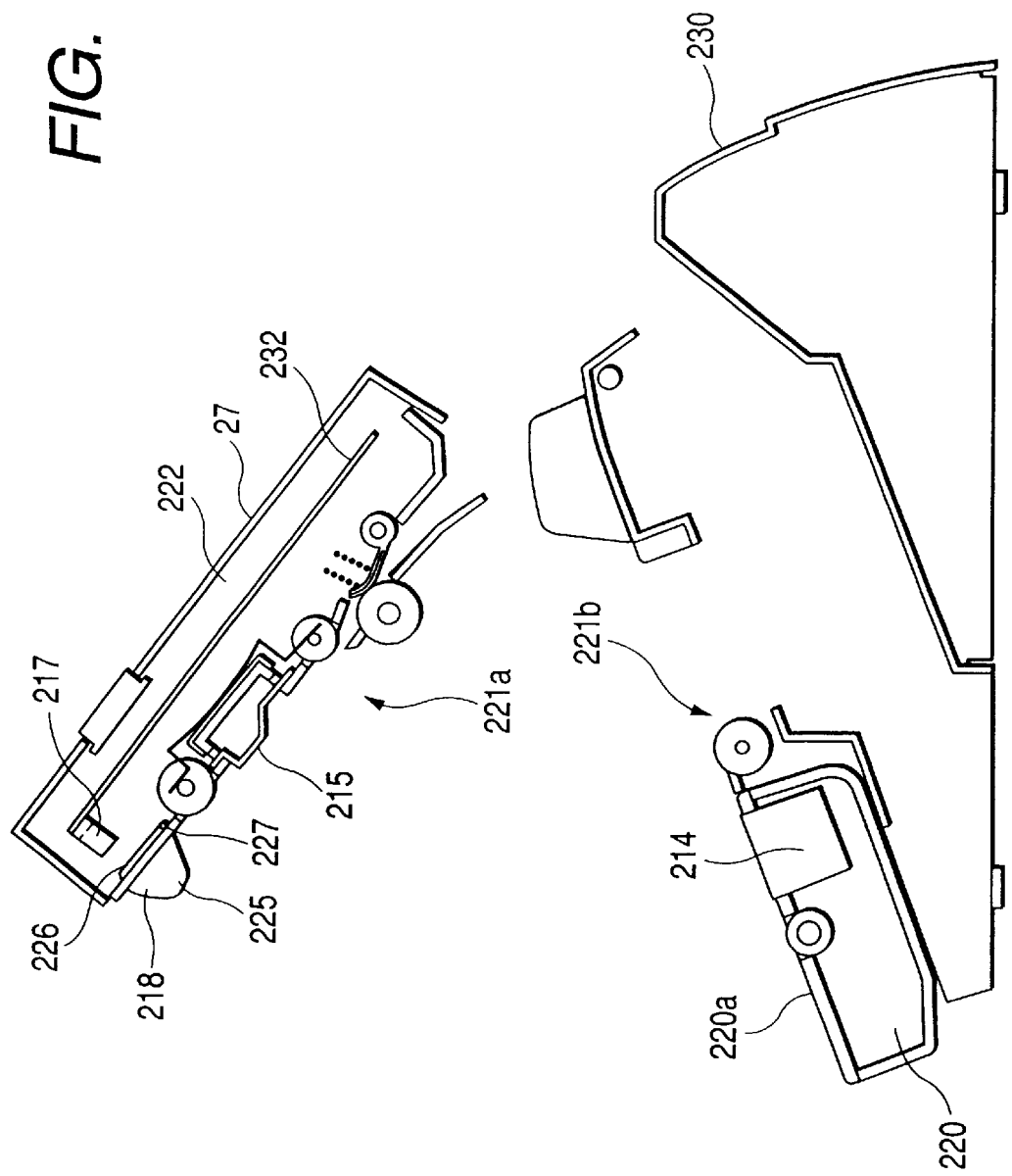
FIG. 12 is a longitudinal sectional front view in the vicinity of the reading section while in FIG. 10 the reading section is attached to the facsimile device body and the operating section is opened.
Figure 13:
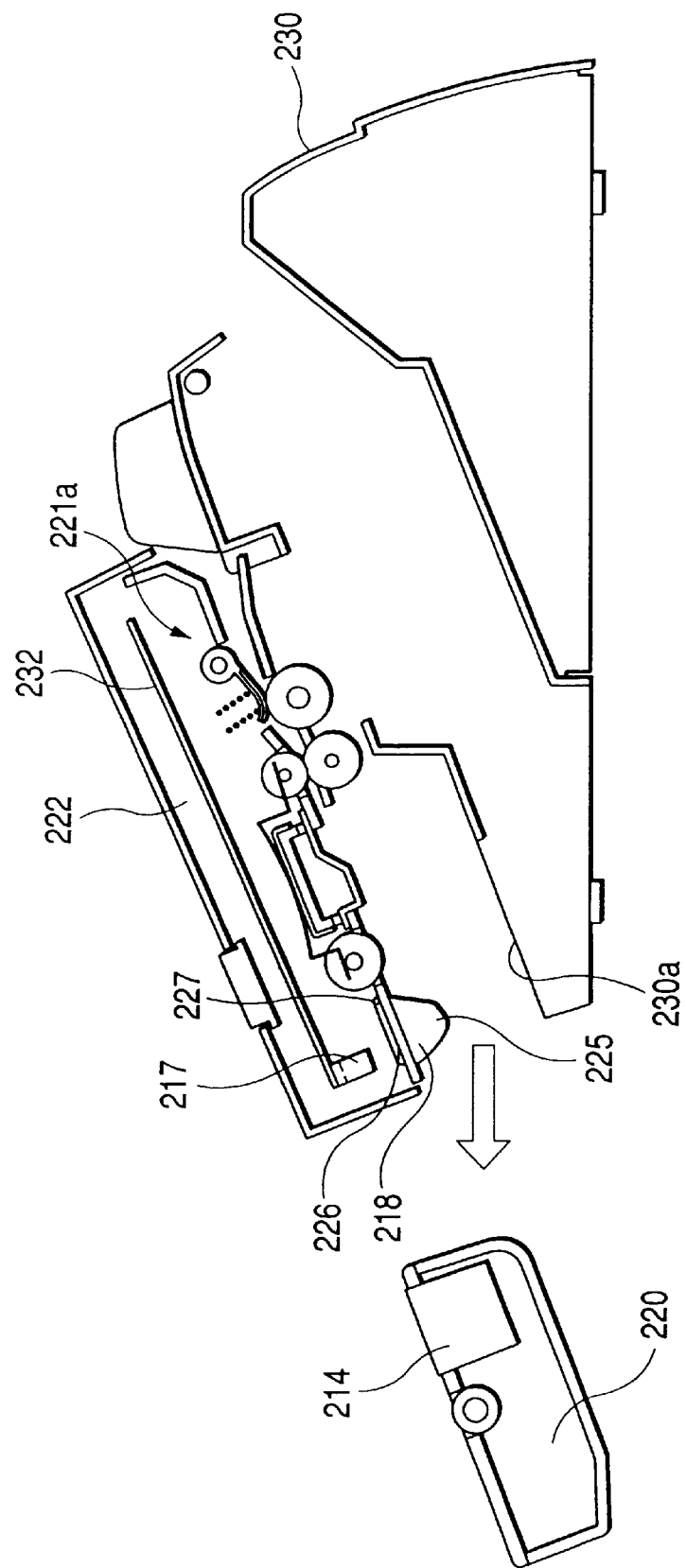
FIG. 13 is a longitudinal sectional front view in the vicinity of the reading section while in FIG. 10 the reading section is detached from the facsimile device body and the operating section is closed.

In FIGS. 11 to 13, since the reading sensor 217 comprises an adhesion type image sensor, which contributes to the compactness of the reading section 220 and further to the compactness of the device body 230.

Moreover, the sensor 217 for detecting the attachment/detachment of the reading section 220 and the opening/closing of the operating section is an inexpensive transmission type photointerruptor, which contributes to cost reduction of the device body 230. Moreover, the sensor 217 for detecting the attachment/detachment of the reading section and opening/closing of the operating section is mounted on an end portion 232 on an operation control electric substrate 224. Therefore, an electric circuit around the sensor can be disposed on the operation control electric substrate 224. Moreover, wiring for transmitting ON/OFF signal of the sensor 217 for detecting the attachment/detachment of the reading section 220 and opening/closing of the operating section becomes unnecessary. This contributes to the cost reduction and compactness of the device body 230, and additionally to enhancement of assembling property.

Furthermore, the sensor actuator 218 for detecting the attachment/detachment of the reading section 220 and opening/closing of the operating section turns on/off the sensor 217 for detecting the attachment/detachment of the reading section 220 and opening/closing of the operating section, by transmitting/intercepting infrared rays of the photointerruptor.

Moreover, a reading guide section 221 includes the separating roller 24, feeding roller 21b, white reference member 215, and discharging roller 216a, and the operating section 222 including the operation panel 27 and the reading guide section 221 is constituted to be rotatable on an operating section rotating center 223 as a support point. Therefore, as shown in FIG. 12, by rotating the operating section 222 in a clockwise direction in FIG. 12, the feeding rollers 211a and 211b, the reading sensor 214 and the white reference member 215, and the discharging rollers 216a and 216b can be detached from each other, and the document conveying path 210 can be opened. As described above, by opening/closing the operating section 222 disposed in the upper front of the device body 230 which is an easily operating place, the reading guide section 221 can be opened/closed, which is a constitution superior in operating property.

Additionally, numeral 225 denotes an abutment section on the reading section 220 of the sensor actuator (operating member) 218 for detecting the attachment/detachment of the reading section 220 and opening/closing of the operating section; 226 denotes an infrared ray shielding section of the sensor actuator 218 for detecting the reading section attachment/detachment and operating section opening/closing, for intercepting the infrared rays of the photointerruptor sensor 217 for detecting the attachment/detachment of the reading section 220 and opening/closing of the operating section; and 227 denotes a rotating center of the sensor actuator 218 for detecting the attachment/detachment of the reading section 220 and opening/closing of the operating section.

In FIG. 11, the reading section 220 is mounted on the device body 230, and the operating section 222 is closed. In this case, when the reading section abutment section 225 of the sensor actuator 218 for detecting the attachment/detachment of the reading section 220 and opening/closing of the operating section abuts on a guide face 220a of the reading section 220, the sensor actuator 218 for detecting the attachment/detachment of the reading section 220 and opening/closing of the operating section rotates about the rotating center 227 as the support point in the clockwise direction in FIG. 11. The infrared ray shielding section 226 of the sensor actuator 218 for detecting the attachment/detachment of the reading section 220 and opening/closing of the operating section intercepts the infrared rays of the photointerruptor sensor 217.

Therefore, the photointerruptor sensor 217 for detecting the reading section attachment/detachment and operating section opening/closing is turned on, and the device body 230 is constituted to recognize that the reading section 220 is mounted the device body 230 and the operating section 222 is closed.

In FIG. 12, the reading section 220 is mounted on the device body 230, and the operating section 222 is opened. In this case, the reading section abutment section 225 of the sensor actuator 218 for detecting the attachment/detachment of the reading section 220 and opening/closing of the operating section is detached from the guide face 220a of the reading section 220. Then, the sensor actuator (operating member) 218 for detecting the reading section attachment/detachment and operating section opening/closing rotates by its own weight using the rotating center 227 as the support point in a counterclockwise direction in FIG. 12. The infrared ray shielding section 226 of the sensor actuator 218 for detecting the reading section attachment/detachment and operating section opening/closing moves, so that the infrared rays of the photointerruptor sensor 217 are transmitted without being intercepted.

Therefore, the photointerruptor sensor 217 for detecting the reading section attachment/detachment and operating section opening/closing is turned off, and the device body 230 is constituted to recognize that the reading section 220 is detached from the device body 230 or the operating section 222 is opened.

In FIG. 13, the reading section 220 is detached from the device body 230, and the operating section 222 is closed. In this case, the abutment section 225 of the sensor actuator 218 for detecting the reading section attachment/detachment and operating section opening/closing fails to abut on the reading section 220. In the same manner as in FIG. 12, the sensor actuator 218 for detecting the reading section attachment/detachment and operating section opening/closing rotates by its own weight using the rotating center 227 as the support point in the counterclockwise direction in FIG. 13. Then, the infrared ray shielding section 226 of the sensor actuator 218 for detecting the reading section attachment/detachment and operating section opening/closing moves, and the infrared rays of the photointerruptor sensor 217 are transmitted without being intercepted.

Therefore, the photointerruptor sensor 217 for detecting the reading section attachment/detachment and operating section opening/closing is turned off, and the device body 230 is constituted to recognize that the reading section 220 is detached from the device body 230 or the operating section 222 is opened.

Here, even in the case where the operating section 222 is opened as shown in FIG. 12, or where the reading section 220 is detached from the device body 230 as shown in FIG. 13, the sensor actuator 218 for detecting the reading section attachment/detachment and operating section opening/closing rotates by its own weight in the counterclockwise direction in FIGS. 12, 13, and the infrared ray shielding section 226 moves, so that the infrared rays of the photointerruptor sensor 217 are securely transmitted.

(3) Reading Operation When Reading Section 220 is Detached From Body

A reading operation which comprises detaching the reading section 220 from the body, and scanning on the image information face of the document 29 to perform reading will next be described (this reading operation is called the hand scanner reading operation).

Figure 14:
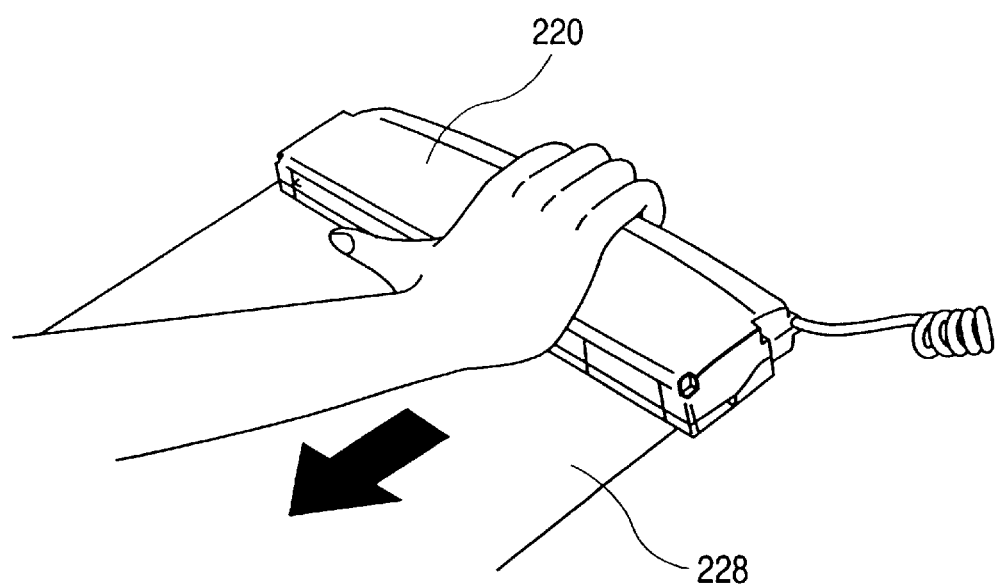
FIG. 14 is a perspective view of the reading section when in FIG. 10 the reading section attachable to/detachable from the device body is detached from the device body and used as a hand scanner.

FIG. 14 is a schematic perspective view when the attachable/detachable reading section 220 is detached from the device body 230, and used as the hand scanner.

As shown in FIG. 14, the reading section 220 is removed from the device body 230, and the reading section 220 is placed so that the reading face of the reading sensor 214 turns to the image information face of a document 228. In this case, since the device body 230 is in the mode shown in FIG. 13, it is recognized that the reading section 220 is detached from the device body 230.

Here, when the key (not shown in FIG. 14) on the operation panel is depressed, an image information reading standby state is obtained. Subsequently, when the reading section 220 scans on the image information face of the document 228 in FIG. 14 by the user's manual operation, the discharging roller 216b rotates. This is detected by an encoder incorporated in the reading section 220, and the image information reading operation starts. Subsequently, by depressing the key on the operation panel, the image information reading operation is completed, thereby ending a series of hand scanner reading operations.

(4) White Reference Data When Hand Scanner Reading Operation is Performed

As described in (1), in the sheet through reading operation, since the white reference member is disposed opposite to the reading sensor, by reading the white reference face of the white reference member every time the series of reading operations are performed, white reference data can be taken. However, in the hand scanner reading operation, since the white reference member 215 is attached to the device body 230, the white reference face cannot be read.

Therefore, in the embodiment, the white reference data before the reading section 220 is removed from the body is used as the white reference data during the hand scanner reading operation.

First, when the power supply of the device body 230 is turned on, the device body 230 confirms that the photointerruptor sensor 217 for detecting the reading section attachment/detachment and operating section opening/closing is in ON state, and confirms that, as shown in FIG. 11, the reading section 220 is mounted on the device body 230, and the operating section 222 is closed. Subsequently, by reading the white reference face of the white reference member 215, the reading sensor 214 takes in the white reference data.

Thereafter, when the hand scanner reading operation is performed, the above-described white reference data when the power supply is ON is used.

Moreover, when the sheet through reading operation described in (1) is performed before performing the hand scanner reading operation, the white reference data is read during the sheet through reading operation, and the white reference data is overwritten. Therefore, when the hand scanner reading operation is performed later, the white reference data read during the sheet through reading operation is used.

Here, when the reading section 220 is removed from the device body 230 and the power supply is ON, the white reference data before the reading section 220 is removed from the body does not exist. In this case, as shown in FIG. 13, the sensor actuator 218 for detecting the reading section attachment/detachment and operating section opening/closing rotates in the counterclockwise direction in FIG. 13, and the photointerruptor sensor 217 is in OFF state. The device body 230 is constituted to inform the device user by display of LCD 233 (display means) on the operation panel 27 that the reading section 220 is removed from the device body 230. Subsequently, when the device user mounts the reading section 220, the white reference data is normally taken.

Moreover, as shown in FIG. 12, when the reading section 220 is mounted on the device body 230, but the operating section 222 is opened, and the power supply is ON, the reading sensor 214 is apart from the white reference member 215, so that the white reference data cannot be taken. Even in this case, the photointerruptor sensor 217 for detecting the reading section attachment/detachment and operating section opening/closing is in OFF state. Therefore, the device body 230 is constituted to inform the device user by the LCD display on the operation panel that the operating section 222 is opened. Subsequently, when the device user closes the operating section 222, the white reference data is normally taken.

Additionally, in the embodiment, as the means for allowing the device user to recognize that the reading section 220 is removed from the device body 230, or the operating section 222 is opened when the power supply is ON, the LCD display on the operation panel has been described, but even when other transmission means such as display on the operation panel by LED lighting, voice of message from a speaker device 235 (see FIG. 10) incorporated in the device body 230, and message recording onto the recording sheet by the recording device disposed on the device body are used, the similar effects can be obtained.

As described above, according to the present invention, the operating member of detecting means provided on the openable/closable operating section in the device body is moved by the reading section attachable to/detachable from the device body to turn ON/OFF the detecting sensor, and the released state of the operating section, and the detached state of the reading section can be recognized. Therefore, the releasing of the operating section and the removing of the reading section from the device body can be recognized by one detecting means, which realizes the reduction of the device body in cost and size. Additionally, excellent document reading can constantly be performed, and the image reading device superior in assembling property can be realized.

(c) Third Embodiment
<First Implementation>

An implementation of the image reading device of ink jet recording according to a third embodiment of the present invention will be described hereinafter with reference to the drawings. Additionally, for a first implementation, the application to the facsimile device will be described.

Figure 15:
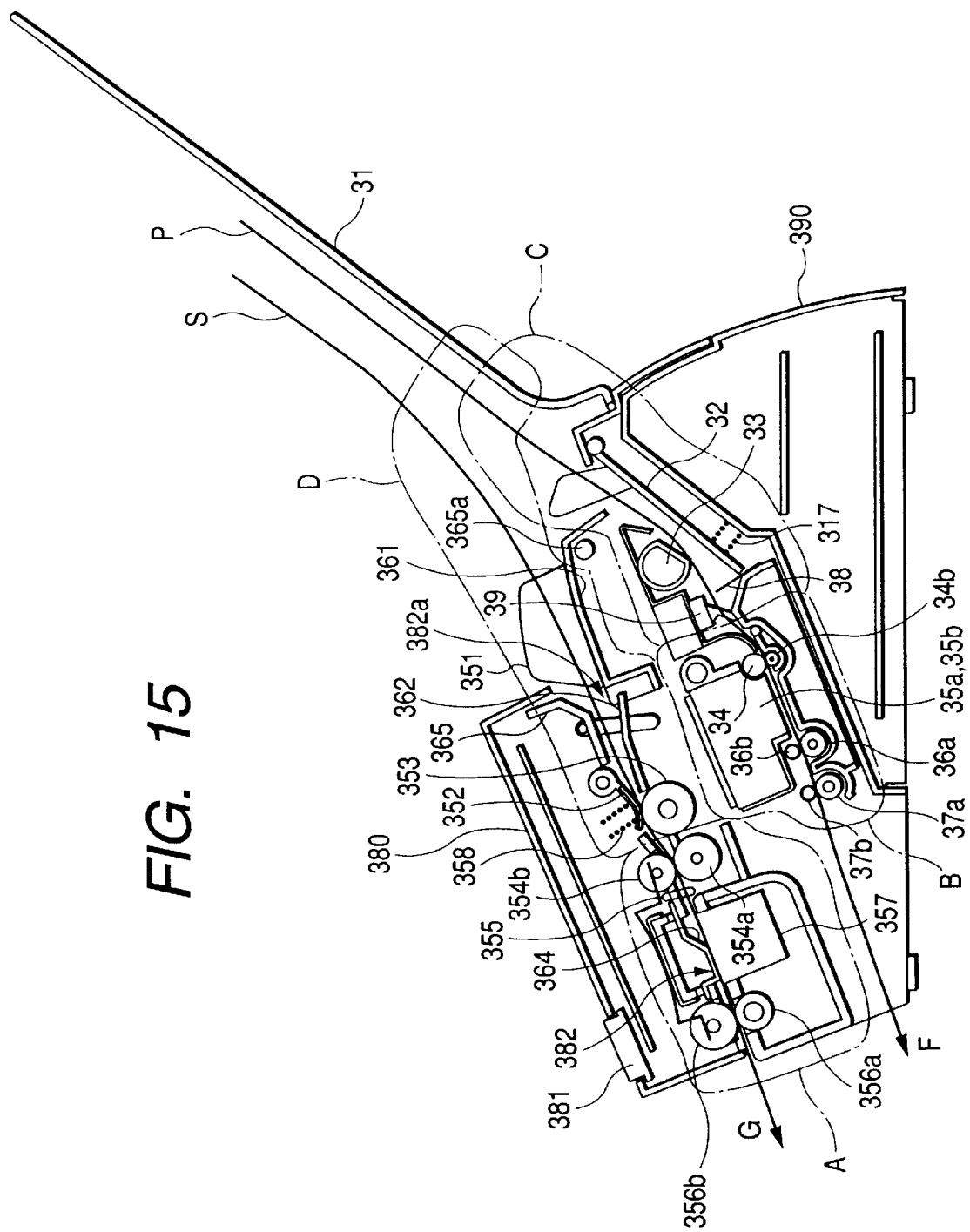
FIG. 15 is a longitudinal sectional side view of the facsimile device of a first implementation according to a third embodiment of the present invention.

First, the schematic constitution of the facsimile device will be described with reference to FIGS. 15 and 17. In FIG. 15, character A denotes a reading section for optically reading the document; B denotes a recording section as an ink jet recording device; C denotes a recording sheet feeding section for separating stacked recording sheets and feeding the sheets to a recording unit; and D denotes a document feeding section for separating stacked document sheets and conveying them to a reading unit. On the other hand, in FIG. 17, E denotes an operating unit which operates functions, and which is opened during the jam handling of document S, the cleaning operation of a photoelectric conversion sensor 357, reading white base 364, and the like in the reading section A, the jam handling of recording sheet P, and the replacement of an ink jet head (recording means) 35, and ink tank 35b in the recording section B.

First, the flow of recording sheet P will be described. A recording sheet conveying path is shown as an arrow G. Specifically, the recording sheet P stacked on a stacking tray 31 and a pressure plate 32 of the recording sheet feeding section C is picked up by a feeding roller 33, and fed into the recording section B by a pair of feeding rollers 34a, 34b.

In the recording section B, recording is performed by the ink jet head 35a as the recording means. After the sheet is conveyed by a certain distance in the device, it is discharged/stacked by a pair of discharging rollers 36a, 36b, and a pair of discharging rollers 37a, 37b as discharging means.

The concrete constitution of the recording sheet feeding section C and recording section B will next be described.

First, the recording sheet feeding section C will be described. In FIG. 15, numerals 31 and 32 denote the stacking tray and pressure plate for stacking a plurality of recording sheets P. The stacking tray 31 also plays a role of stacking the document S described later. The pressure plate 32 is pressed upward by pressure plate springs 317 which are disposed on both sides of the feeding roller 33 described later and pressure plate 32 in the sheet width direction. The pressure plate 32 is pressed downward by cams (not shown) when waiting for sheet supply, which provides a structure easily refilled with the recording sheets P when the recording sheets P are reduced, or eliminated.

On the other hand, when the recording signal is detected, and sheet feeding operation starts, the downward depression of the pressure plate 32 by the cams (not shown) is released, and the recording sheet P is picked up by the feeding roller 33. Numeral 38 denotes a bank sheet as an elastic member. When the picked up recording sheet P deflects the bank sheet 38, it is separated from its topmost position sheet by sheet by the action of resisting force. The separated/supplied recording sheet P is detected by a paper edge sensor 39, conveyed to the pair of feeding rollers 34a, 34b, and further conveyed to the recording section B by the pair of feeding rollers 34a, 34b.

The concrete constitution of the recording section B will next be described with reference to FIG. 16.

Figure 16:
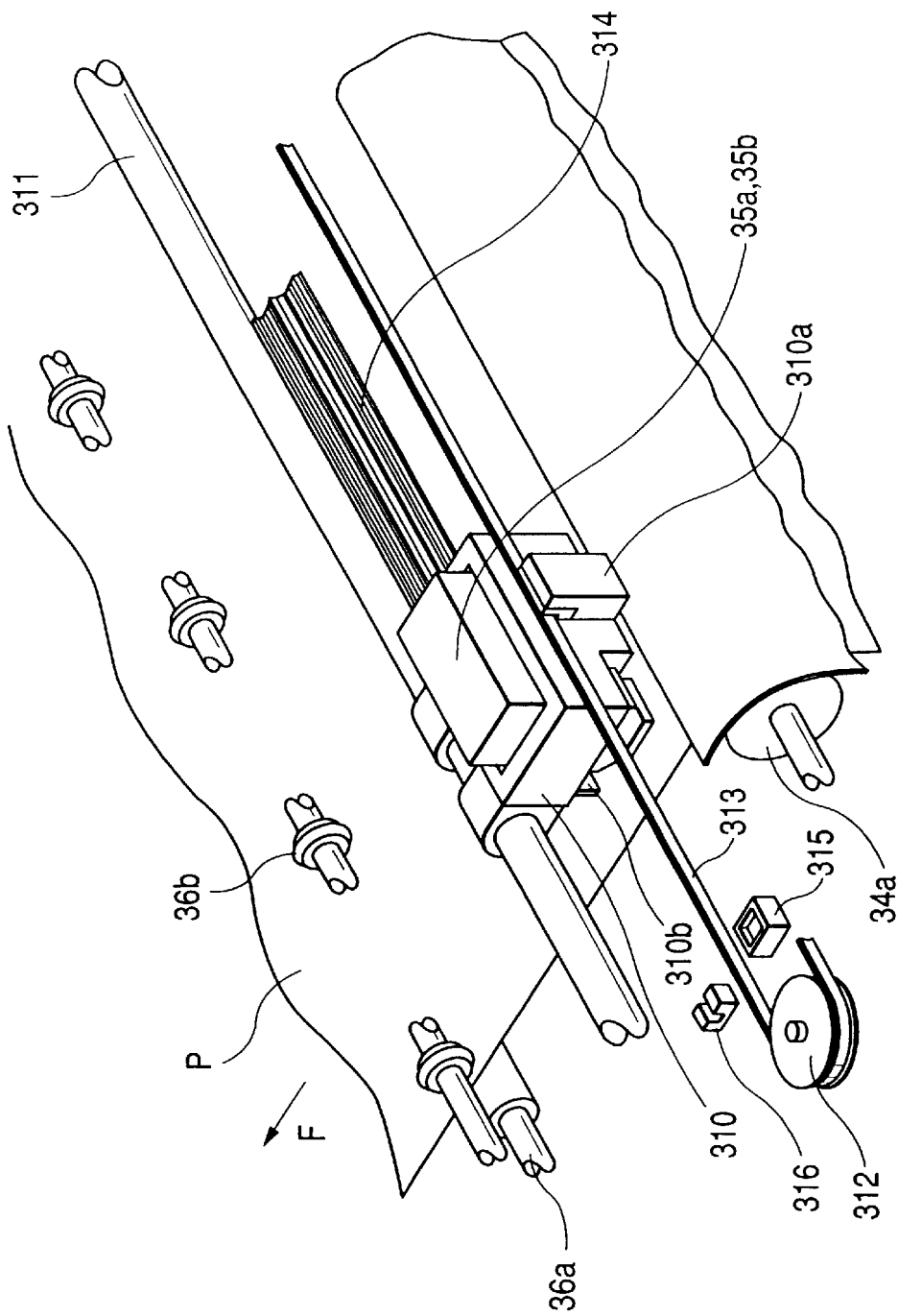
FIG. 16 is a perspective view showing the recording section of the facsimile device of FIG. 15.

In FIG. 16, used as the ink jet recording means of the embodiment is a cartridge type integrally provided with the ink jet head 35a and ink tank 35b which can be separated from each other. If necessary, only the ink jet head 35a, or only the ink tank 35b can be replaced.

However, this is merely one example, and as the ink jet recording means of the present invention, a constitution incorporating the ink tank and comprising the ink jet head may be used, in which the entire recording head can be replaced with a new one when ink is missing.

The ink jet head 35a for use in the first implementation may be either one of a monochromatic ink jet head and a color ink jet head, or can appropriately be replaced with the other one. For example, the monochromatic ink jet head has a resolution of 360 dpi, and has a nozzle string formed of 128 nozzles (discharge ports) arranged in one row, in which the ink is spouted from the discharge port of a nozzle tip end by a film boiling pressure generated in the ink by the heating of an electrothermal converting element provided in the nozzle.

On the other hand, in the color ink jet head, black nozzles and color nozzles are separately arranged. A black head has 64 nozzles, a color head has 24 nozzles each for three colors, cyan, magenta, and yellow, and the nozzles are arranged in one row. This color ink jet head is structured so that two ink tanks of black ink and color ink can be replaced.

A carriage 310 precisely holds the ink jet head 35a, additionally reciprocates the head in a main scanning direction orthogonal to the conveying direction (sub-scanning direction, direction of arrow F) of the recording sheet P, and is slidably held by a guide bar 311 and a thrust portion 310a. The reciprocating movement of the carriage 310 is performed by a pulley 312 driven by a carriage motor (not shown) and a timing belt 313. In this case, the recording signal and electric power are supplied to the ink jet head 35a via a flexible cable 314 from the electric circuit of a device body 390.

Moreover, a cap 315 functioning as ink receiving means is disposed in a predetermined standby position (home position) of the carriage 310, and is elevated/lowered as occasion demands. When the cap is elevated, it closely covers the ink discharge port section of the ink jet head 35a to prevent ink evaporation or dust adhesion.

In the implementation, to relatively position the ink jet head 35a and the cap 315 in opposite positions, a carriage home position sensor 316 disposed on the device body and a shielding plate 310b disposed on the carriage 310 are used. A transmission type photointerruptor is used in the carriage home position sensor 316. When the carriage 310 moves to the standby position, the transmission of light radiated from a part of the carriage home position sensor 316 is intercepted by the shielding plate 310b. This is used by the sensor to detect that the ink jet head 35a and the cap 315 are relatively positioned opposite to each other. Thereby, the carriage 310 is moved, and can be set in the predetermined standby position.

The recording sheet P is conveyed in a direction parallel with the ink jet head 35a by the pair of feeding rollers 34a, 34b, and conveyed in the direction of arrow G (sub-scanning direction). The feeding roller 34a and discharging rollers 36a, 37a are driven by a motor (not shown), and the recording sheet P is conveyed in the sub-scanning direction highly precisely in cooperation with the reciprocating movement of the carriage 310 as required. Spurs 36b, 37b are made of highly water repellent materials, and contact the recording sheet P only at the recording sheet surface and blade-shaped circumferential portions. The spurs 36b, 37b are arranged opposite to the discharging rollers 36a, 37a, apart from one another at predetermined lengths by bearing members (not shown) in the main scanning direction, and in a plurality of places. The spurs are constituted to guide and convey the recording sheet P so that they exert no influence on the image even when contacting the non-fixed image on the recording sheet immediately after recording.

Next, the flow of document S will be described.

A document conveying path is shown by an arrow G. In FIG. 15, the document feeding section D has a lower document guide face 361 on which the document S is stacked with its image facing downward. In this case, even when the document S is longitudinal, it can be held by the stacking tray 31. Specifically, the stacking tray 31 has a role of stacking both the recording sheet and the document thereon. The document S stacked on the lower document guide face 361 is positioned by a document slider 351 which is disposed on the lower document guide face 361 and which is movable in width direction. One or a plurality of sheets of document S are struck and set onto a portion surrounded by a friction piece 352 disposed on an upper document guide 365 and a separating roller 353. The friction piece 352 is pressed downward from above by a friction piece spring 358, and is on standby while the separating roller 353 is pressed.

The separating piece 352 and the separating roller 353 constitute separating means for separating the document sheet by sheet. The separating means 358, 353 are disposed above the ink jet head 35a of the recording section B for performing recording on the recording sheet P. Moreover, a lower document guide 362 for guiding the document S to the separating means 358, 353 is disposed above the ink jet head 35a so as to cover a part of the ink jet head 35a.

When the signal for conveying the document S is sensed, the separating roller 353 rotates by drive of a motor (not shown). By cooperating action with the friction piece 352 only the bottom document S is conveyed in the direction of arrow G and successively conveyed to the reading section A sheet by sheet. The document S conveyed to the reading section A is conveyed to a document edge sensor 355 and photoelectric conversion sensor 357 by the cooperating action of feeding rollers 354a and 354b. The photoelectric conversion sensor 357 is energized along a reading line by the reading white base 364, so that the image of the conveyed document S closely abuts on the reading line. Furthermore, the feeding roller 354a determines the reading speed in the sub-scanning direction of the document S, and additionally conveys the document to discharging rollers 356a and 356b. Subsequently, the read document S is discharged by the discharging rollers 356a and 356b.

The constitution of the operating unit E will next be described with reference to FIGS. 17 and 18.

Figure 17:
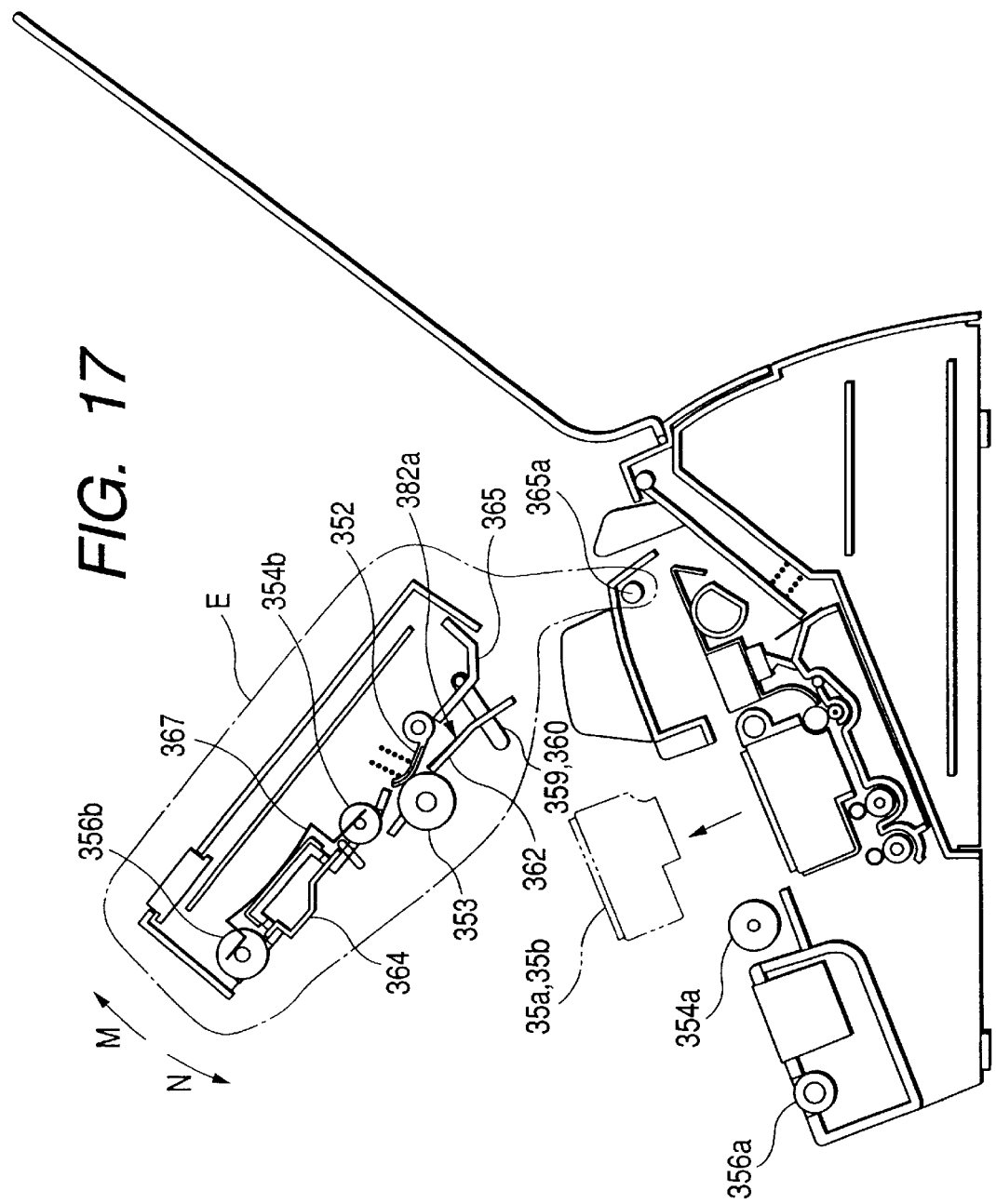
FIG. 17 is a diagram showing the operation of the facsimile device during maintenance of the facsimile device of FIG. 15.

As shown in FIG. 17, the top surface of the operating unit E is provided with keys and slide SWs (not shown) for operating functions, and display elements (not shown) of LED and LCD. Moreover, the under surface of the operating unit E is provided with the upper document guide 365 to form the conveying path of the document S. For the upper document guide 365, in the document feeding section D, the lower document guide 362 is attached below, so that the conveying path of the document S is formed. The lower document guide 362 covers the upper part of the recording means 35a and ink tank 35b. Furthermore, on the upstream side of the separating roller 353, a sensor 359 for detecting the presence/absence of document S, and a sensor 360 for detecting the size of document S are attached.

On the other hand, in the reading section A of the upper document guide 365, the feeding roller 354b and the discharging roller 356b are attached and pressed downward from above by a roller pressing spring 367. Moreover, as described above, the reading white base 364 is disposed between the feeding roller 354b and the discharging roller 356b to serve as white reference during document reading.

Figure 18:
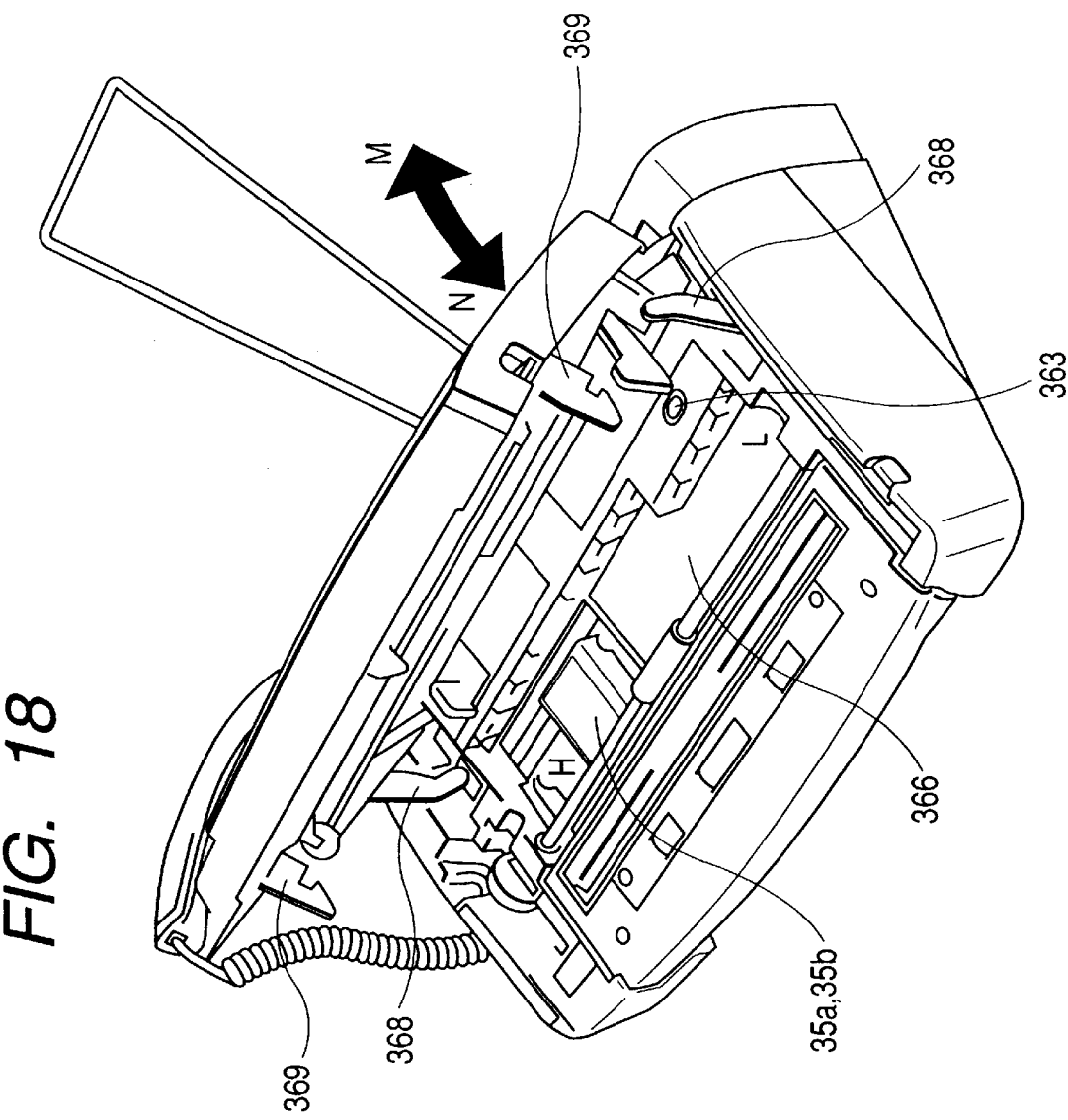
FIG. 18 is an appearance perspective view of the facsimile device during the maintenance of the facsimile device of FIG. 15.

The operating unit E constituted as described above can be opened in a direction shown in FIG. 17 (front to rear) using a hinge portion (rotating shaft) 365a as a rotating center which is a part of the upper document guide 365 and positioned in the rear of the body, and the opened operating unit E is held by an operating section support arm 368 shown in FIG. 18. When the operating unit E rotates, the separating means 358, 353 and the lower document guide 362 rotate together, so that a space is opened/formed above the recording section B.

Moreover, when the operating unit E is closed, the operating unit E is locked in a normal position by a lock arm 369 shown in FIG. 18 to maintain the pressing forces of the feeding rollers 354*a* and 354*b* and the discharging rollers 356*a* and 356*b* at constant values. Furthermore, according to the first implementation, the separating roller 353 and lower document guide 362 in the operating unit E are disposed just above the recording section B to cover the recording section B when the operating unit E is in a usual operation state (state of FIG. 15), but they are constituted to form a space for facilitating access to the recording section B from the front side when the operating unit E is opened (state of FIG. 17). Because the separating roller 353 and the lower document guide 362 integrally rotate.

The replacing operation of the ink jet head or the ink tank will next be described with reference to the sectional view of FIG. 17 and the perspective view of FIG. 18.

In the case where the entire ink jet head is changed from the monochromatic head to the color head or vice versa, or where only the ink tank is replaced with a new ink tank because of the decrease of the remaining amount of ink in the ink tank, as shown in FIG. 18, the user first rotates the operating unit E centering on the hinge portion 365*a* in the direction of arrow M, until the operating section support arm 368 holds the operating unit E in the open position, so that the part above the recording section B is opened.

Subsequently, in order to move the ink jet head 35*a* to an opening section H of a recording cover section 366, a cartridge replacement key 363 disposed on the surface of the recording cover section 366 is depressed. Usually, the ink jet head 35*a* is on standby in the home position as the predetermined standby position, that is, L section on the right side of the device body front face in FIG. 18.

When the ink jet head 35*a* is on standby in the L section, as clearly seen from FIG. 18, the upper part of the ink jet head 35*a* in the standby position is covered with the recording cover section 366, so that the user cannot easily touch the ink jet head 35*a*. For the head section of the ink jet head 35*a* immediately after the jetting of a large amount of ink, particularly when the head has a large number of nozzles, the head section has a high temperature in some cases. Since it is dangerous to touch such head, the head is covered not to be easily touched.

According to the first implementation, when the cartridge replacement key 363 is depressed, in response to a drive signal, the carriage 310 is driven/moved via the drive circuit, and a carriage motor (not shown). Accordingly, the operator moves the ink jet head 35*a* to the position where cartridge replacement can be performed, that is, the position below the opening section H of the recording cover section 366. In this state, the user can replace the entire ink jet head, or only the ink tank. Additionally, when the head section of the ink jet head 35*a* has a high temperature, by detecting the temperature by a temperature sensor (not shown), the ink jet head 35*a* is prevented from moving to the replacement position.

A method of placing the ink jet head 35*a* in a recording standby state will next be described.

After the attachment of the ink jet head 35*a* to the carriage 310 is completed, the cartridge replacement key 363 is depressed to transmit a signal to a control section, the control section drives the carriage motor via the motor drive circuit based on the signal, and the carriage 310 is moved toward the standby position from the position below the opening section. As described above, it can be detected by the carriage home position sensor 316 that the carriage 310 has moved to the predetermined standby position, and the movement of the carriage 310 stops. In this case, the ink jetting section of the ink jet head 35*a* is capped by the cap 315. After ink suction/discharge operation is performed by a suction pump (not shown), and the like, the standby state is obtained.

Therefore, the ink jetting section (nozzle string) of the ink jet head 35*a* is shielded from exterior air by the cap 315 until recording is started. The thickening or adhesion of the ink in the ink jetting section, the mixing of foreign materials, and the like can be prevented, so that the subsequent recording operation can securely be performed.

Moreover, according to the first implementation, when the control section detects that the cartridge replacement key 363 is depressed to move the ink jet head 35*a* to the replacement position, a timer (not shown) starts counting time. Additionally, even in the case where after the replacement the user forgets to depress the cartridge replacement key 363 to move the ink jet head 35*a* again to the standby position, when the control section detects that a predetermined time elapses after the timer is started, the control section automatically moves the carriage 310 to the recording standby position.

Subsequently, the user rotates and closes the operating unit E in the direction of arrow N, and places the operating unit E into the usual operation state (state of FIG. 15) by the lock arm 369.

The jam handling of the document and recording sheet will next be described.

As shown in FIG. 17, in the above-described cartridge replacing operation, the operating unit E is opened. In this case, the separating means 358, 353 and lower document guide 362 also rotate in the same direction.

In this state, the document S held between the separating roller 353 and the friction piece 352, and the remaining document S stacked on the upstream side are lifted up with the rotation of the operating unit E. By extracting the document in the downstream or upstream direction, the jam handling of the document S can be performed.

Moreover, when the rear end of the document S is beyond the separating roller 353, the pressing of the pair of feeding roller 354*a*, 354*b* and the pair of discharging rollers 356*a*, 356*b* is released, and the jam handling is facilitated in the state.

On the other hand, for the recording sheet P, in the opened sate of the operating unit E, the opening section H of the recording cover section 366 of the recording section B is opened, so that the jam handling of the recording sheet P can easily be performed.

Specifically, according to the implementation, the access method is common to the cartridge replacement, document jam handling, and recording sheet jam handling, and device maintenance is simple and plain for the user.

<Second Implementation>

A second implementation of the image reading device according to the third embodiment of the present invention will next be described with reference to the drawings.

Figure 19:
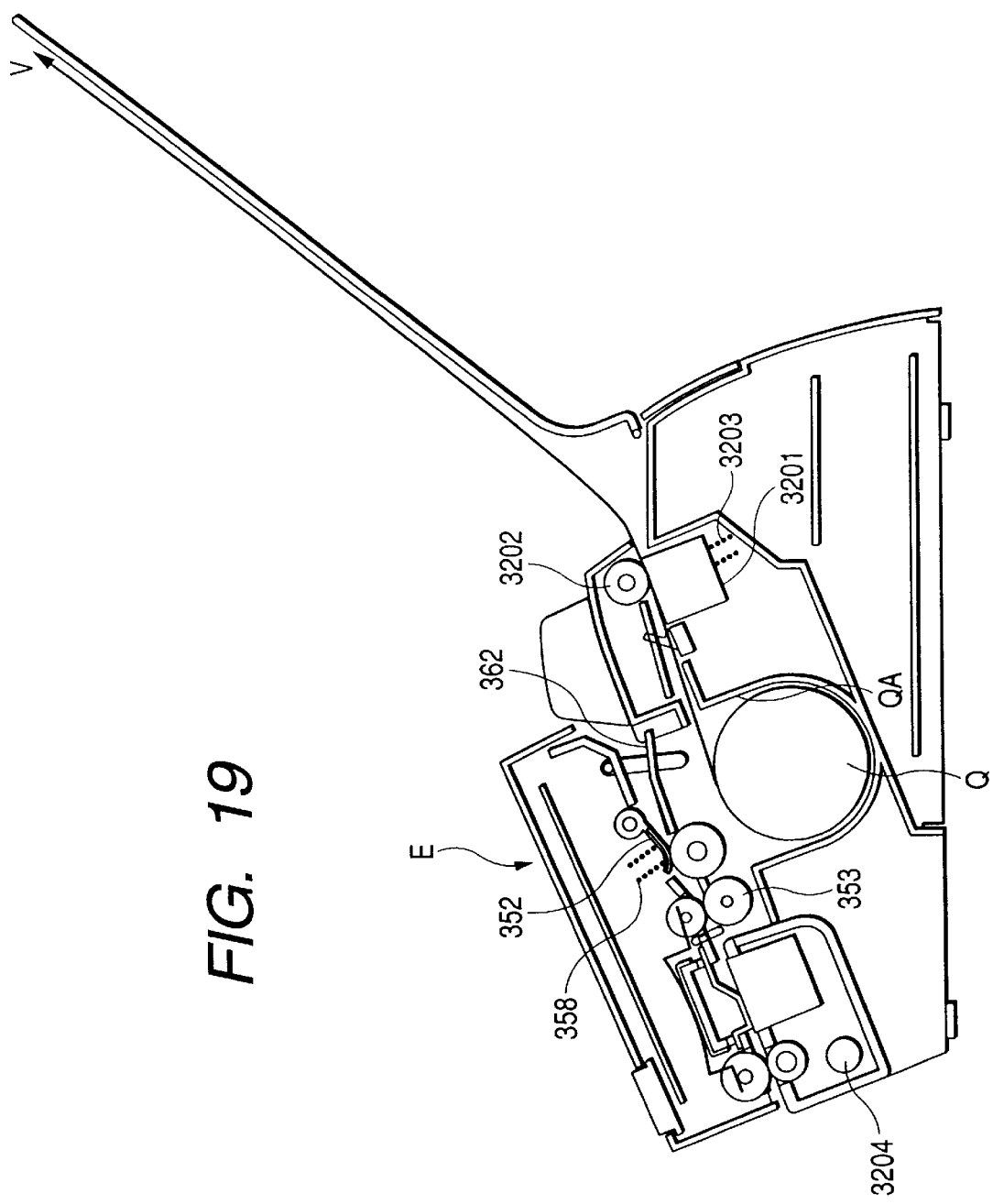
FIG. 19 is a longitudinal sectional front view of the facsimile device of a second implementation according to the third embodiment of the present invention.

FIG. 19 is a sectional view of the second implementation, showing usual operation. Only respects different from those of the first implementation will briefly be described. Instead of the recording sheet P, a recording rolled sheet Q is used, and the recording rolled sheet Q is conveyed in a direction of arrow V.

The recording rolled sheet Q is accommodated in a rolled sheet storage section QA in which the recording section B described in the first implementation is positioned. Behind the section, a thermal head 3201 and a platen roller 3202 as recording means are arranged. Moreover, the thermal head 3201 presses the platen roller 3202 disposed above by a spring 3203 from below.

Figure 20:
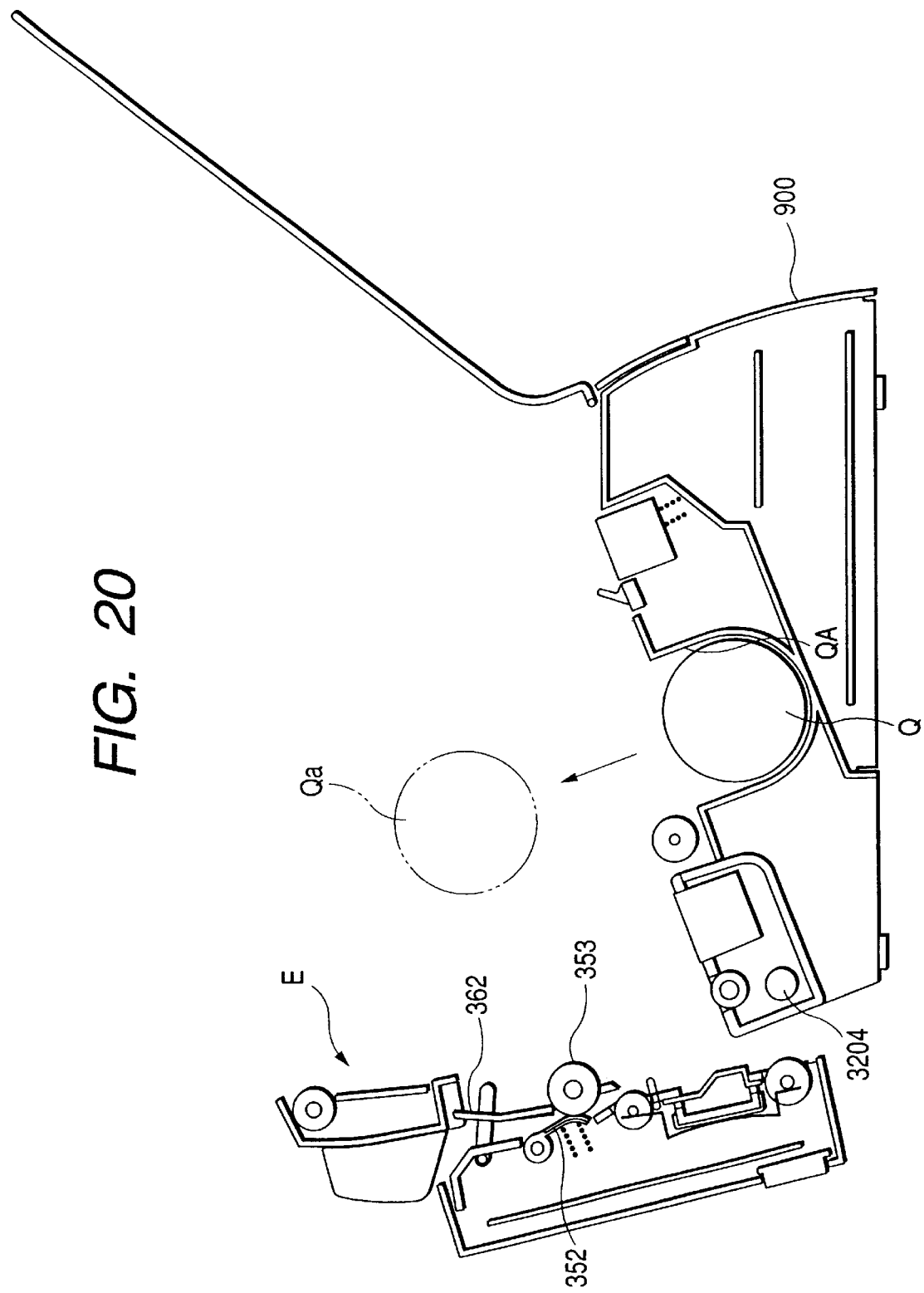
FIG. 20 is a longitudinal sectional front view of the facsimile device showing operation during the maintenance of the facsimile device of FIG. 19.

FIG. 20 is a sectional view showing the second implementation, in which an operating unit W is opened, and the attachment/detachment of the recording rolled sheet Q and the jam handling operation of document S and recording sheet are performed. Only portions different from those of the first implementation will briefly be described. A hinge portion 3204 as a rotating center during the opening/closing of the operating unit is disposed on the device front side, and is constituted to rotate the operation unit to the front side from the rear side of the device to open the unit. In the state in which the separating means 358, 353 and lower document guide 362 are retreated, the section above the recording rolled sheet Q is opened, which can facilitate the attachment/detachment of the recording rolled sheet and the jam handling operation of document and recording sheet.

As described above, according to the present invention, when the maintenance of the recording means in the recording section is performed, or when the jammed recording sheet is generated in the recording means section, the document separating means and the lower document guide disposed above the recording means are rotated using the rotating shaft as the support point. Therefore, the section above the recording means is opened, and the replacement of the recording means, the handling of the jammed recording sheet, and the like can easily be performed.

Moreover, since the separating means for separating the document is disposed above the recording means, the distance between the recording means for performing recording on the recording sheet and the reading means for reading the document, that is, the front to rear distance of the device body is shortened, and the depth of the device body is shortened, so that the reduction of device installation area can be realized.

Moreover, in the case where the recording sheet to be recorded by the recording means is rolled, since the separating means for separating the document is disposed above the rolled sheet storage section for accommodating the rolled sheet, maintenance operations such as the refilling of the rolled sheet to the rolled sheet storage section, the jam handling of the rolled sheet, and the replacement of the recording means can easily be performed.

(d) Fourth Embodiment

<First Implementation>

Figure 21:
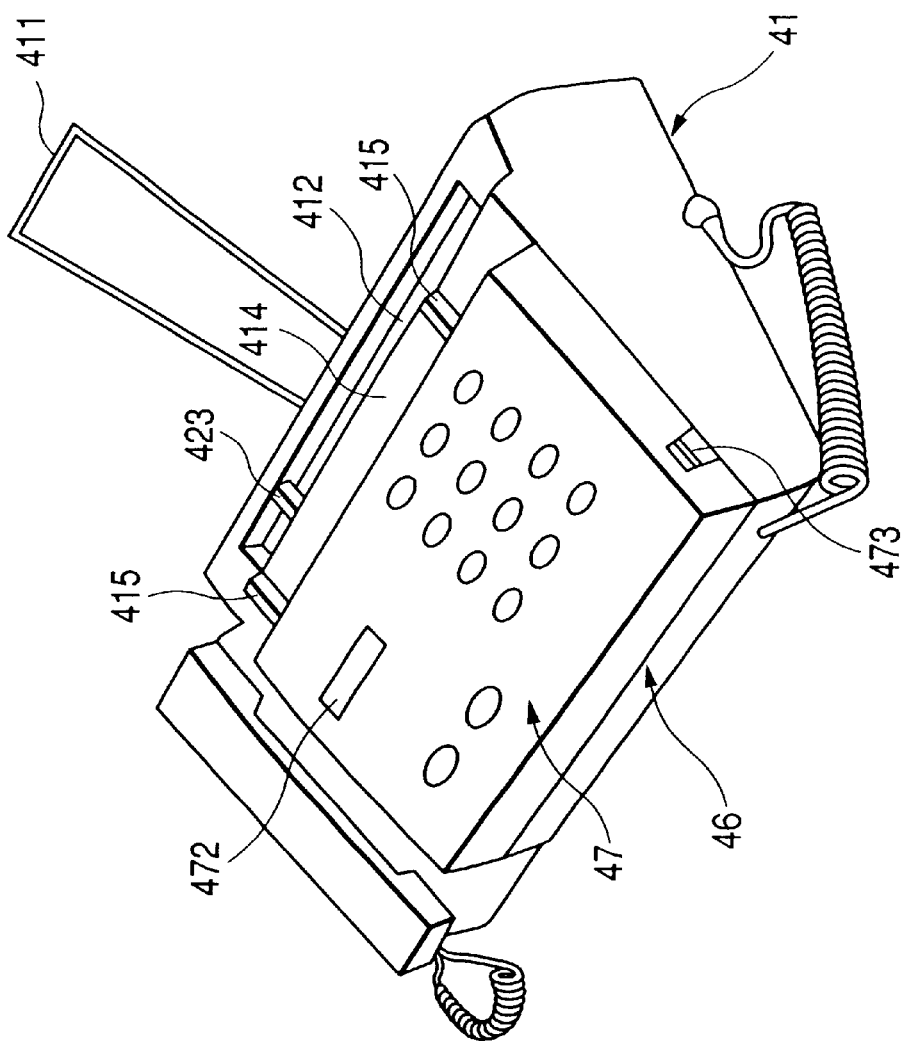
FIG. 21 is a perspective view showing the appearance of the facsimile device according to a first implementation of a fourth embodiment of the present invention.
Figure 22:
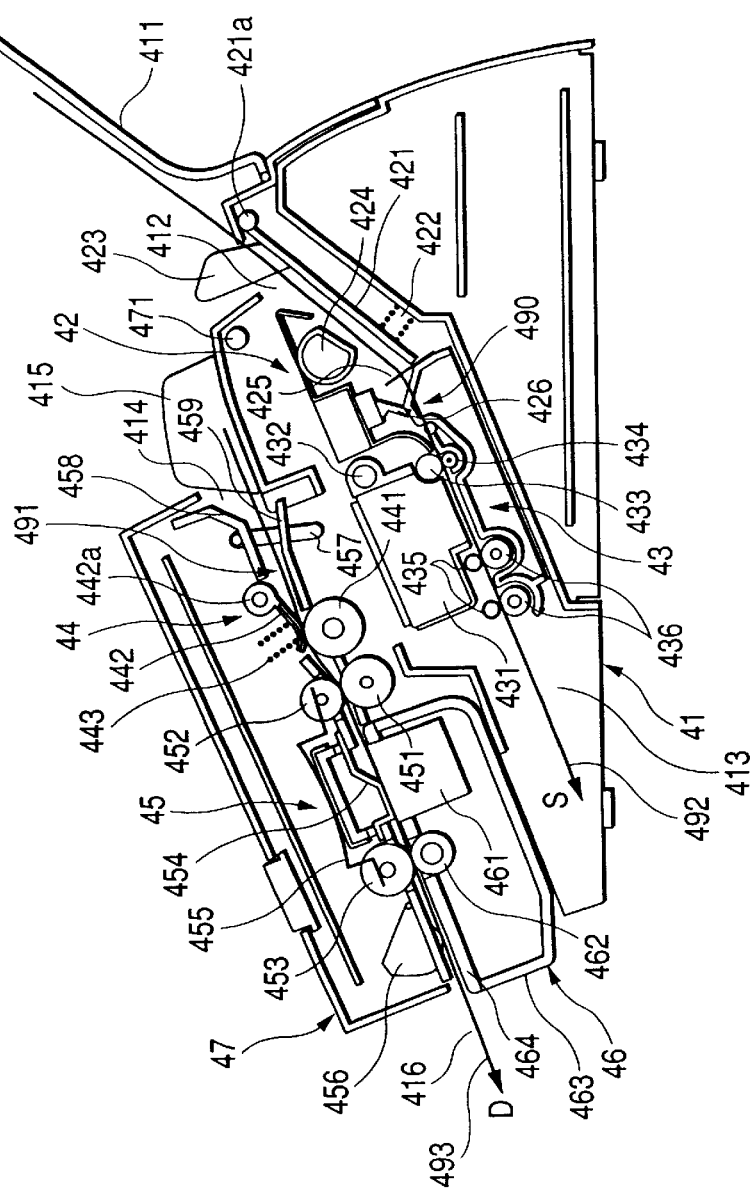
FIG. 22 is a longitudinal sectional side view of the facsimile device of FIG. 21.

A first implementation of a fourth embodiment in which the present invention is applied to the facsimile device will be described hereinafter. FIGS. 21 and 22 are a perspective view and a sectional view to describe the implementation.

In the drawings, numeral 41 denotes a facsimile device body. Numeral 42 denotes an ASF (Auto Sheet Feeder) section for separating/feeding recording sheets 492 sheet by sheet; 43 denotes a recording section for recording image on the recording sheet conveyed from the ASF section 42; 44 denotes an ADF (Auto Document Feeder) section for separating/feeding document sheet by sheet; and 45 denotes a reading section for reading the image of document 493 conveyed from the ADF section 44, which is disposed on the downstream side of the recording section 43. A hand scanner section 46 is constituted so that it can be attached to/detached from the device body 41, and forms a part of the reading section 45 when mounted on the device body 41. An operation panel section 47 is provided with buttons for operating the device body 41, and a display section 472 which indicates the state of the device.

First, the recording operation of the recording section 43 will be described.

Arrow S indicates the conveying direction of the recording sheet 492. A tray 411 is detachably attached to the device body 41 to support the recording sheet 492 set onto the ASF section 42 so that a sheet rear end should not hang down. The tray 411 is also used as a tray of document 493 set onto the ADF section 44. Numeral 412 denotes an opening (recording sheet inserting port) via which the recording sheet 492 is inserted/stacked in the device body 41.

A pressure plate 421 is constituted to be vertically rotatable centering on a support point 421a, on whose top surface a plurality of recording sheets 492 are accumulated. Numeral 422 denotes a pressing spring to pressurize/rotate the pressure plate 421 upward. In the initial state, the pressure plate 421 is held downward against the pressing force of the pressing spring 421. Numeral 423 denotes a recording sheet width slider to regulate the movement of the recording sheet 492 in width direction. Numeral 424 denotes a recording sheet pickup roller, and 425 denotes a separating sheet for separating the recording sheets 492 sheet by sheet. Numeral 428 denotes a sensor for detecting the tip end of the recording sheet 492 which is separated/fed sheet by sheet.

An ink cartridge 431 is attachable/detachable with respect to the device body 41 for spouting ink to the recording sheet 492 to record image. Numeral 432 denotes a guide shaft to serve as a guide when the ink cartridge 431 reciprocates/operates in the width direction of the recording sheet 492. Numeral 433 denotes a feeding roller, and a pinch roller 434 is pressed onto the feeding roller 433 by a spring (not shown) to follow the movement of the feeding roller. Numeral 435 denotes a spur, and a discharging roller 436 is pressed into contact with the spur.

When a signal for starting recording is sent, a recording sheet conveying motor (not shown) rotates, the held state of the pressure plate 421 is released, and the tip end of the recording sheet inserted/stacked in the opening 412 is lifted up. Additionally, the pickup roller 424 is rotated in the clockwise direction. The top layer portion of the recording sheets 492 stacked on the pressure plate 421 are in contact with the pickup roller 424, conveyed in a direction of arrow S, and the lower-layer recording sheets are intercepted by the separating sheet 425. The uppermost recording sheets are separated sheet by sheet and conveyed to the recording section 43.

After the tip end of one separated recording sheet is sensed by a sensor 426, the motor is rotated by a predetermined number of steps, the recording sheet 492 is held by the feeding roller 433 and the nip portion of the pinch roller 434, and the tip end of the recording sheet is conveyed to a printing position under the ink cartridge 431 and once stopped.

In this case, the pressure plate 421 is held in the initial state and placed in the standby state. Subsequently, the ink cartridge 431 is driven by a motor (not shown), and reciprocated once in the width direction of the recording sheet 492, so that ink is spouted to the recording sheet 492 conveyed to the printing position to record the image. The ink cartridge 431 is provided with several lines of ink jetting nozzles in the recording sheet conveying direction, so that several lines of images can be recorded with one reciprocation of the ink cartridge 431.

When the reciprocating operation of the ink cartridge 431 is completed, the recording sheet conveying motor is rotated, the recording sheet 492 is conveyed by the number of lines recorded with one reciprocation of the ink cartridge 431, and the next image data is newly recorded. Thereafter, by successively repeating the reciprocating operation of the ink cartridge 431 and the conveying operation of the recording sheet 492, the image is recorded on the recording sheet 492. One page of image data is finished, or the sensor 426 detects the rear end of the recording sheet 492. Then, the recording sheet 492 is conveyed by the predetermined number of steps. Thereafter, when the rear end of the recording sheet reaches the printing position, the recording operation for one page of the recording sheet 492 is completed, and the sheet is discharged to an opening (recording sheet discharge port) 413 disposed below the front face of the device body 41, thereby completing a series of operations. If there is image data for the next page, the series of operations are repeated to perform recording.

The reading operation of the recording section 43 will next be described.

An arrow D indicates the conveying direction of the document 493. Numeral 414 denotes an opening (document inserting port) for setting the document 493, and 415 denotes a document slider for regulating the width direction of the set document 493. Numeral 457 denotes a sensor for detecting the presence/absence of the document 493. Numeral 441 denotes a separating roller, a friction piece 442 is disposed rotatably centering on a support point 442a, and the friction piece 442 is pressed in the counterclockwise direction by a spring 443, which is constituted to press the friction piece 442 into contact with the separating roller 441.

Numeral 451 denotes a feeding roller, and a feeding roller 452 is disposed opposite to the feeding roller 451 and pressed to contact the feeding roller 451 by a leaf spring 455. Numeral 461 denotes a contact image sensor (CIS) for reading image information of the document 493, and a reading white reference plate 454 is disposed opposite to the CIS 461. The CIS 461 reads the white reference plate 454 before reading the document 493, corrects an output level of reading signal, and during the reading of the document 493, rides on the document 493 from above (back) by its own weight to prevent the document 493 from rattling. On the downstream side of the CIS 461, a discharging roller 453 and a follower roller 462 are arranged to form a pair. The discharging roller 453 is pressed to contact the roller 462 by the leaf spring 455. Numeral 456 denotes a sensor for detecting the attached/detached state of the hand scanner 46 to the device body 41.

When the document 493 is set to the opening 414, the sensor 457 detects that the document 493 is set, and an operator depresses a reading start button (not shown) provided on the operation panel section 47, the reading motor (not shown) rotates to drive the separating roller 441 in the counterclockwise direction. The document 493 is handled by the separating roller 441 rotating counterclockwise and the separating piece 442 in pressure contact and conveyed in the downstream direction. Only one sheet of the lowermost layer is separated, and conveyed to the document reading section 45. The document 493 separated by the ADF section 44 is guided to the feeding roller 451 and the nip portion of the feeding roller 452, and held/conveyed. When the tip end of the document 493 is detected by a sensor (not shown) disposed in the vicinity of the feeding roller 451, the reading motor rotates by the predetermined number of steps, then stops, so that the document 493 is stopped in a predetermined position before the CIS 461.

Thereafter, the CIS 481 reads shading data of the white reference plate 454, and corrects the output level of reading signal. Then, the reading motor is again rotated, and the document 493 is conveyed by the predetermined number of steps. After the document reaches the reading line of the CIS 461, the under surface of the document is successively read line by line. The read document 493 is guided, held and conveyed by the discharging roller 453 and the nip portion of the roller 462, and discharged to the outside of the device via the opening (document discharge port) 416 disposed in the device front surface. When a plurality of sheets of document 493 are set, the reading motor is rotated to repeat the operation comprising separating/conveying the document 493 sheet by sheet by the ADF section 44 and successively reading the image data by the CIS 461, until the sensor 457 detects that there is no document 493.

The entire constitution of the device will next be described.

Figure 23:
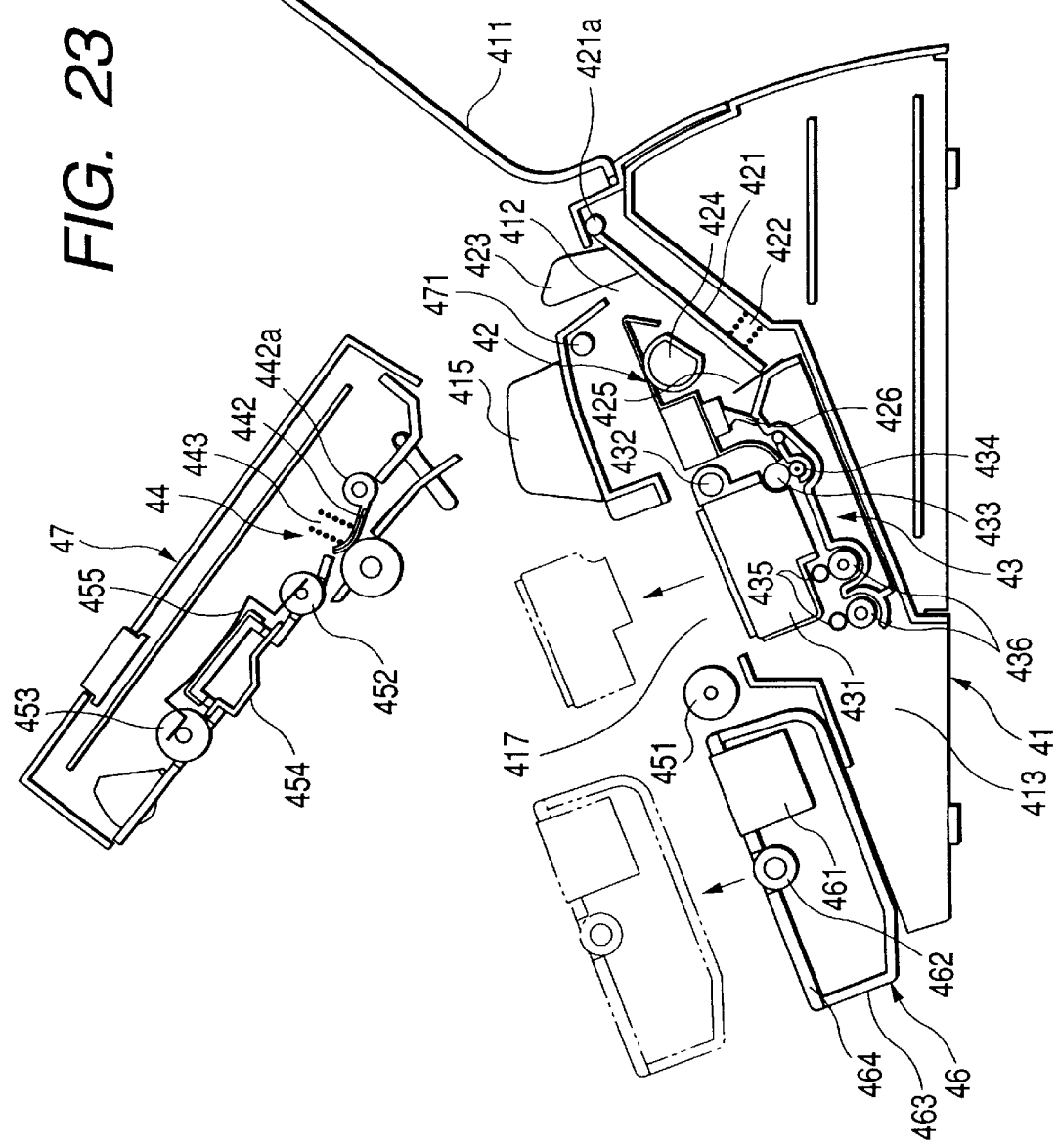
FIG. 23 is a longitudinal sectional side view of the facsimile device showing that an operation panel section is opened in the facsimile device of FIG. 22.
Figure 24:
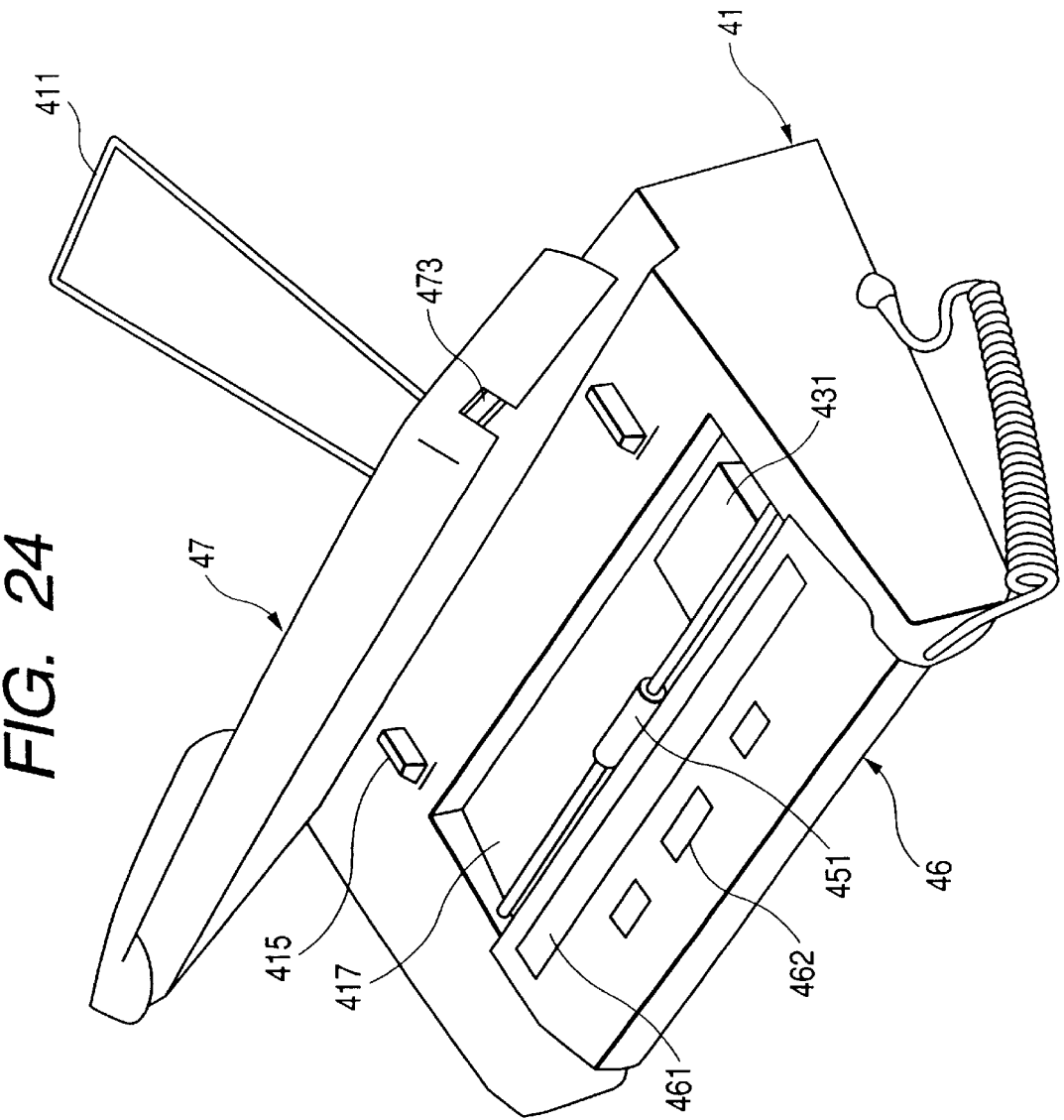
FIG. 24 is an appearance perspective view of the facsimile device when in FIG. 21 an operation panel is opened.
Figure 25:
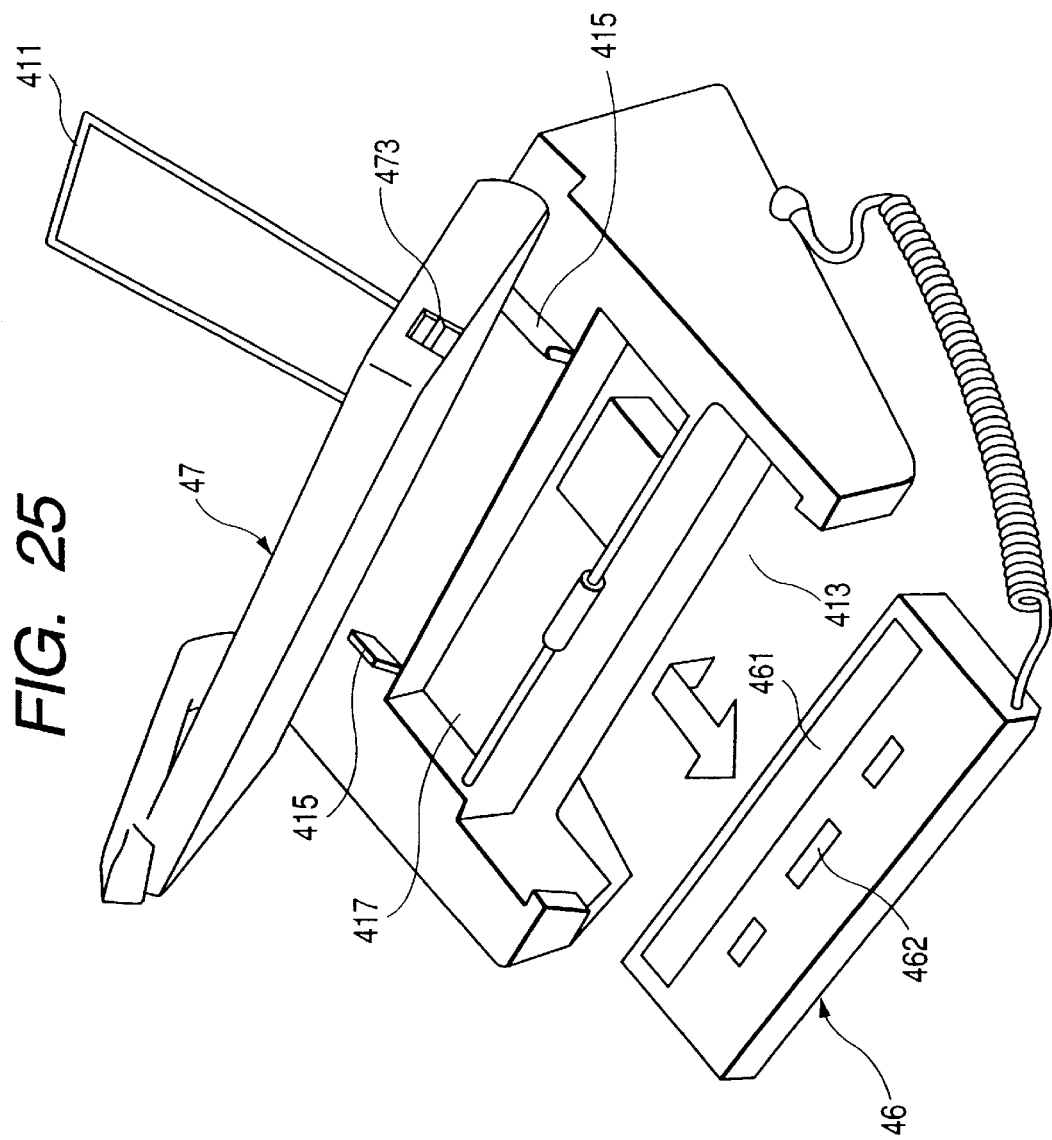
FIG. 25 is an appearance perspective view of the facsimile device showing the operation of removing the hand scanner in FIG. 21.

FIGS. 23 and 24 are a sectional view and a perspective view showing that the operation panel section 47 is opened. FIG. 25 is a perspective view showing the operation of removing the hand scanner. The CIS 461 and the roller 462 are supported in housings 463, 464, and detachably attached as the hand scanner section 46 integrally to the device body 41. The housing 464 serves as a guide member for guiding the under surface of the document 493, and the housing 463 serves as a guide member for guiding the top surface of the recording sheet 492.

Moreover, numerals 458, 459 denote guide members for guiding the top and under surfaces of document 493, and the ADF section 44, feeding roller 452, discharging roller 453, white reference substrate 454, and sensors 456, 457 are supported by the guide member 458. Moreover, the guide member 459 is also supported by the guide member 458 to form the opening 414. The guide member 458 is fixed to the operation panel section 47, and the operation panel section 47 is constituted to be vertically rotatable integrally with the guide member 458 centering on the support point 471.

A recording sheet conveying path 490 for conveying the recording sheet 492 is disposed below and substantially parallel with a document conveying path 491 for conveying the document 493. The conveying direction S of the recording sheet 492 is the same as the conveying direction D of the document 43. In the rear of the device body 41 (on the right side in FIG. 22) the recording sheet inserting port 412 and the document inserting port 414 are disposed, and on the front side the recording sheet discharge port 413 and the document discharge port 416 are disposed.

Thereby, the similar paper handling can be performed on both the recording sheet 492 and the document 493, the defect of mistaking the discharge port of the recording sheet 492 for that of the document 493 is eliminated, and the operating property is enhanced.

Numeral 473 denotes a release lever for releasing a lock (not shown) by which the operation panel section 47 is held/fixed in the predetermined position of the device body 41. By pushing up the release lever 473, the lock is released, so that the operation panel section 47 can rotate centering on the support point 471.

By pushing the operation panel section 47 upward, the document conveying path is exposed, and the document jam handling can be performed. Additionally, the hand scanner 46 can be removed. Moreover, in this case, the opening 417 for replacing the ink cartridge 431 is exposed, so that the ink cartridge can be accessed via the opening 417. When ink is eliminated, the ink cartridge 431 can be replaced.

When the hand scanner 46 is removed from the device body 41, the section above the opening 413 forming the recording sheet discharge port is opened, and the jam handling of the recording sheet 492 is facilitated. According to the implementation, since the recording sheet 492 is discharged toward the front face of the device, defects such as difficulty in removing the recording sheet 492 are eliminated.

Moreover, since the hand scanner section 46 is disposed above the recording sheet conveying path 490, the attachment/detachment of the hand scanner section 46 to the device body 41 is facilitated. Furthermore, the hand scanner section 46 is disposed on the downstream side of the recording section 43. Therefore, when the hand scanner section 46 is mounted, the under surface of the hand scanner section 46 functions as the guide of the recording sheet 492 being discharged. When the hand scanner section 46 is removed, the space of the recording sheet discharge port 413 is enlarged, which facilitates the recording sheet jam handling.

<Second Implementation>

A second implementation of the present invention applied to the facsimile device will next be described hereinafter. Here, the components having the same reference numerals as those in the first implementation are considered to be provided with the same names and functions as those in the first implementation, and the description thereof is omitted.

Figure 26:
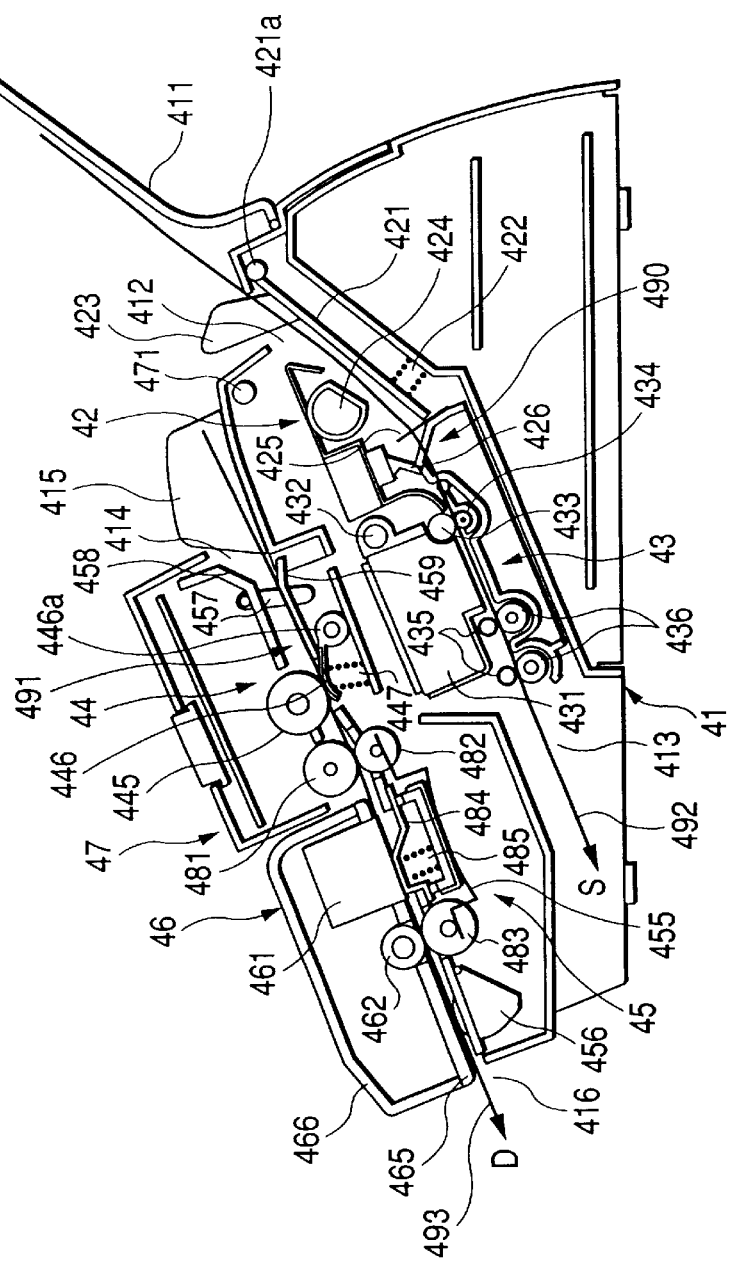
FIG. 26 is an appearance perspective view of the facsimile device according to a second implementation of the fourth embodiment of the present invention.

FIG. 26 is a sectional view showing the second implementation. Numeral 41 denotes a facsimile device body. Numeral 42 denotes an ASF (Auto Sheet Feeder) section for separating/feeding recording sheets 492 sheet by sheet; 43 denotes a recording section for recording image on the recording sheet 492 conveyed from the ASF section 42; 44 denotes an ADF (Auto Document Feeder) for separating/feeding the document 493 sheet by sheet; and 45 denotes a reading section for reading the image of document 493 conveyed from the ADF section 44, which is disposed on the downstream side of the recording section 43.

A hand scanner section 46 is constituted so that it can be attached to/detached from the device body, and forms a part of the reading section when mounted on the body. An operation panel section 47 is provided with buttons for operating the device body 41 and a display section 472 indicating the state of the device.

An arrow D indicates the conveying direction of the document 493. Numeral 445 denotes a separating roller, a friction piece 446 is disposed to be rotatable centering on a support point 446a, and the friction piece 446 is pressed in the clockwise direction by a spring 447, which is constituted to press the friction piece 446 into contact with the separating roller 445.

Numeral 481 denotes a feeding roller, and a feeding roller 482 is disposed opposite to the feeding roller 481 and pressed to contact the feeding roller 481 by a leaf spring 455. Numeral 461 denotes a contact image sensor (CIS) for reading image information of document 493, and a reading white reference plate 484 is disposed opposite to the CIS 461 and pressed upward by a spring 485. The CIS 461 reads the white reference plate 484 before reading the document 493, corrects the output level of reading signal, and during the document reading, presses the document 493 from below (back) to prevent the document 493 from rattling. On the downstream side of the CIS 461, a discharging roller 483 and a follower roller 462 are arranged to form a pair.

The discharging roller 483 is pressed to contact the roller 462 by the leaf spring 455.

When the document 493 is set to the opening 414, the sensor 457 detects that the document 493 is set, and the operator depresses the reading start button (not shown) provided on the operation panel section 47, the reading motor (not shown) rotates to drive the separating roller 445 in the clockwise direction. The document 493 is handled by the separating roller 445 rotating clockwise and the separating piece 446 in pressure contact and conveyed in the downstream direction. Only one sheet of the lowermost layer is separated, and conveyed to the document reading section 45. The document 493 separated by the ADF section 44 is guided to the feeding roller 481 and the nip portion of the feeding roller 482, and held/conveyed.

When the tip end of the document 493 is detected by the sensor (not shown) disposed in the vicinity of the feeding roller 481, the reading motor rotates by the predetermined number of steps, then stops, to stop the document 493 in the predetermined position before the CIS 461. Thereafter, the CIS 461 reads the white reference plate 484, and corrects the output level of reading signal. Then, the reading motor is again rotated, and the document 493 is conveyed by the predetermined number of steps. After the document reaches the reading line of the CIS 461, the top surface of the document 493 is successively read line by line. The read document 493 is guided, held and conveyed by the discharging roller 483 and the nip portion of the roller 462, and discharged to the outside of the device via the opening 416 disposed in the device front surface. When a plurality of sheets of document 493 are set, the reading motor is rotated to repeat the operation comprising separating/conveying the document 493 sheet by sheet by the ADF section 44 and successively reading the image data by the CIS 461, until the sensor 457 detects that there is no document 493.

The entire constitution of the device will next be described.

Figure 27:
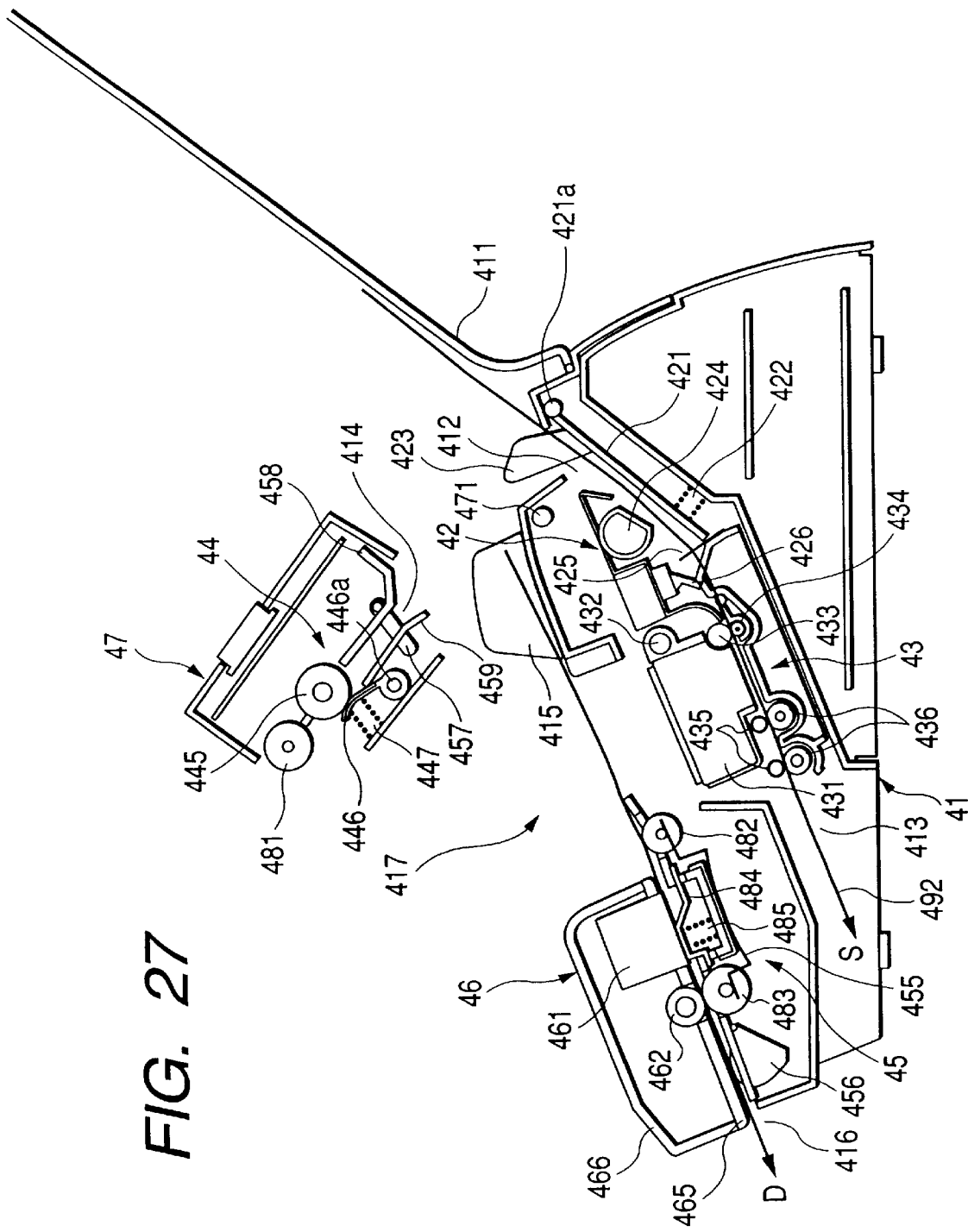
FIG. 27 is a longitudinal sectional side view of the facsimile device when the operation panel is opened in the facsimile device of FIG. 26.
Figure 28:
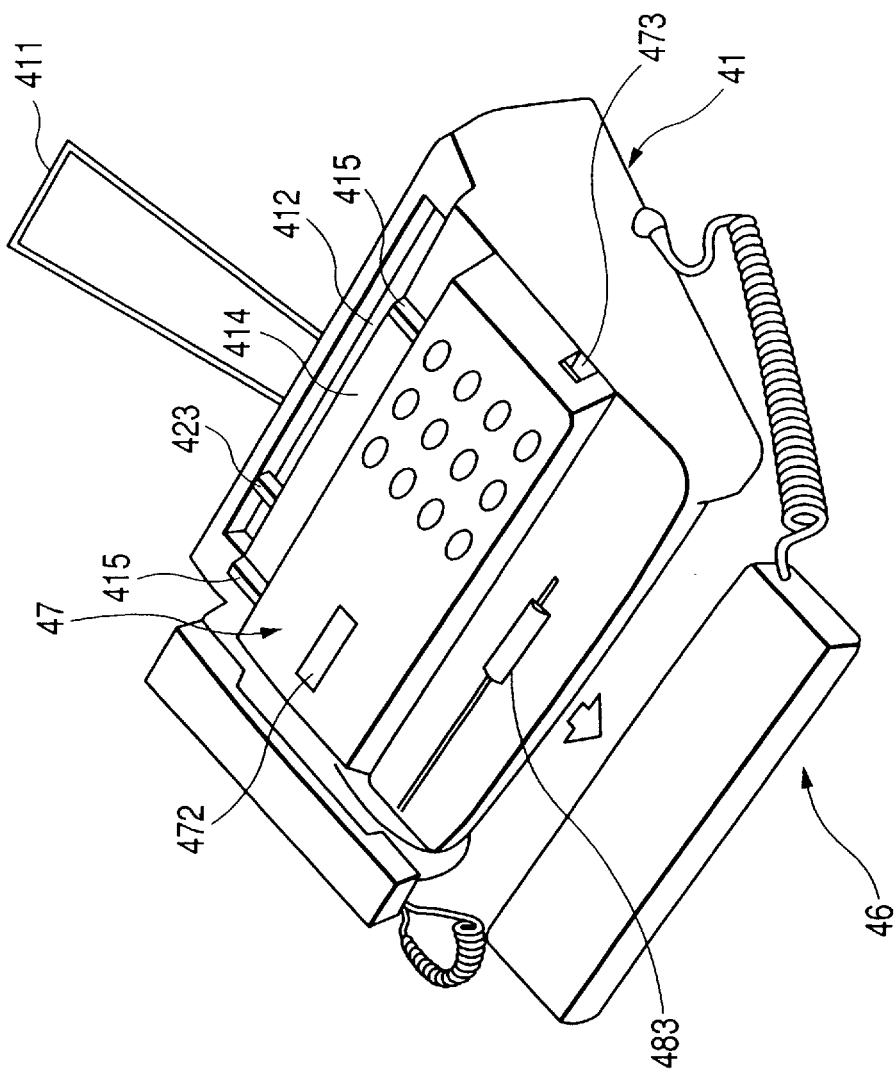
FIG. 28 is an appearance perspective view of the facsimile device showing the operation of removing the hand scanner in FIG. 26.

FIG. 27 is a sectional view showing that the operation panel section 47 is opened. FIG. 28 is a perspective view showing the operation of removing the hand scanner. The CIS 461 and the roller 462 are supported in housings 465, 466, and detachably attached as the hand scanner section 46 integrally to the device body 41. The housing 465 serves as a guide member for guiding the top surface of the document 493, and the housing 466 forms a part of an armor when mounted on the device.

Moreover, numerals 458, 459 denote guide members for guiding the top and under surfaces of document 493, and the ADF section 44, feeding roller 481, and sensor 457 are supported by the guide member 458. Moreover, the guide member 459 is also supported by the guide member 458 to form the opening 414. The guide member 458 is fixed to the operation panel section 47, and the operation panel section 47 is constituted to be vertically rotatable integrally with the guide member 458 centering on the support point 471.

Numeral 473 denotes a release lever for releasing the lock (not shown) by which the operation panel section 47 is held/fixed in the predetermined position of the device body 41. By pushing up the release lever 473, the lock is released, so that the operation panel section 47 can rotate centering on the support point 471. By pushing the operation panel section 47 upward, and removing the hand scanner 46, the document conveying path is exposed, and the document jam handling can be performed. Additionally, the opening 417 for replacing the ink cartridge 431 is exposed, and the ink cartridge can be accessed via the opening 417. For example, when ink is eliminated, the ink cartridge 431 can be replaced.

Also in the second implementation, since the recording sheet 492 is discharged toward the front face of the device, defects such as difficulty in removing the recording sheet 492 are eliminated in the same manner as in the first implementation. Furthermore, in the second implementation, the surface to be read of the document 493 is on the upper side. Therefore, even when the document 493 is discharged onto the recording sheet 492 whose surface ink is insufficiently dry, the surface of the document 493 fails to be contaminated. Therefore, the defects feared for when the recording sheet 492 and document 493 are discharged in the same direction can be solved.

In the second implementation, the ink jet system of spouting ink to the recording sheet 492 to record the image is employed in the recording section, but even when other systems such as a thermal sensitive system, a thermal transfer system, and an LBP system are applied to the recording section, the similar effects can be obtained.

Moreover, even when the present invention is applied to the image reading/recording device having the reading and recording sections, such as a copying machine and a scanner printer, in addition to the facsimile device, the similar effects can be obtained.

As described above, according to the present invention, the conveying direction of the recording sheet is set to be the same as the conveying direction of the document. Additionally, the recording sheet conveying path is disposed below the document conveying path. Therefore, the inserting and discharging sides of the recording sheet are the same as those of the document. The similar paper handling can be performed on both the recording sheet and the specific document. The defect of mistaking the discharge port of the recording sheet for that of the document, or the inconvenience in handling the recording sheet and document because of the difference of the discharge port can be solved.

Furthermore, since the reading means for reading the document is positioned above the recording sheet conveying path, the attachment/detachment of the reading means to the device body can be facilitated. Additionally, by removing the reading means, the space is formed around the recording sheet discharge port of the recording sheet conveying path, so that the recording sheet jam handling at the recording sheet discharge port section can easily be performed.

Moreover, the document conveying path is disposed above the recording sheet conveying path, and the reading face of the reading means turns downward. Therefore, even when the document is discharged onto the recording sheet having insufficiently dry ink thereon, there is no fear that the surface of the document (document face) is contaminated.

(e) Fifth Embodiment

<First Implementation>

Figure 29:
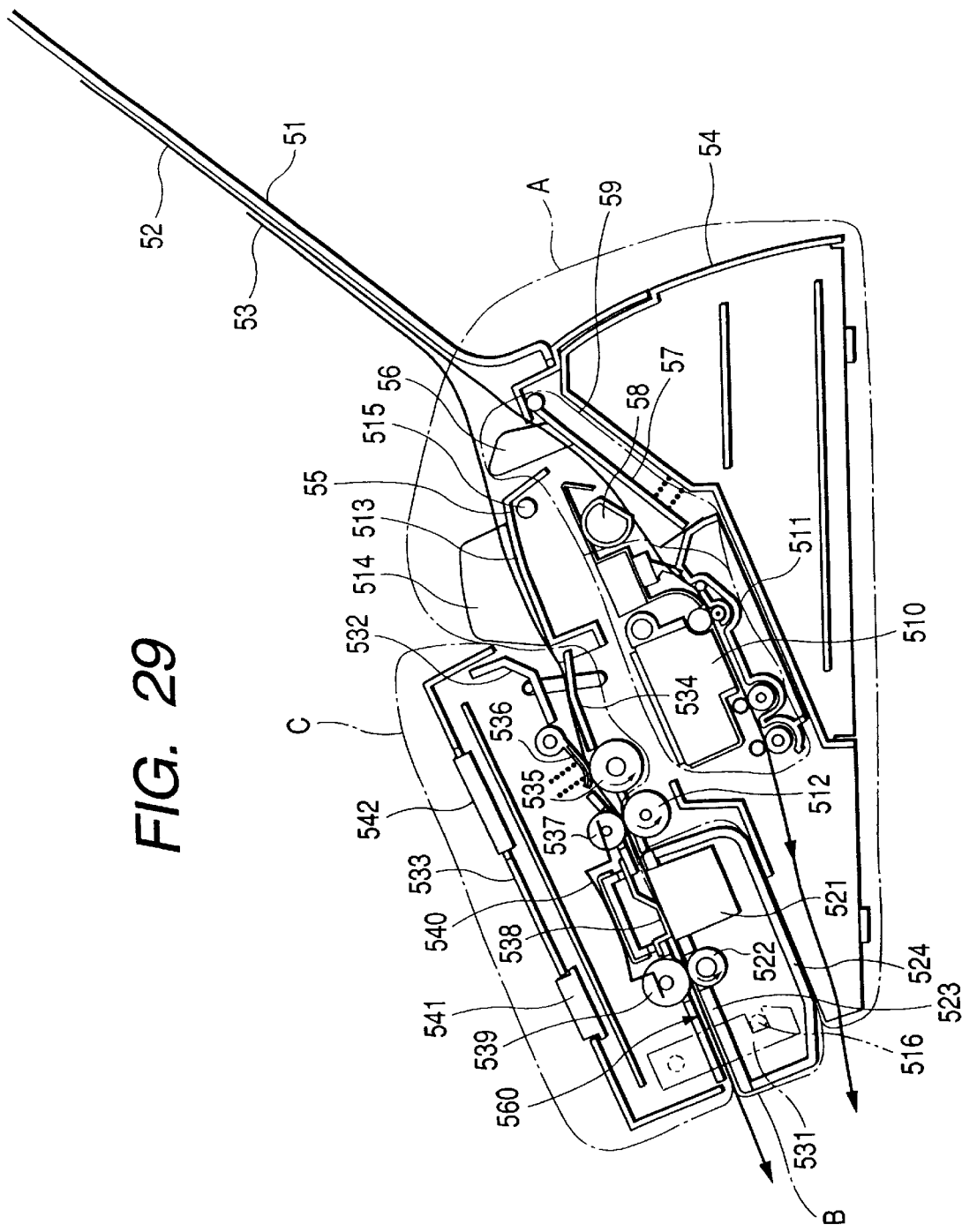
FIG. 29 is a longitudinal sectional side view of the facsimile device according to a first implementation of a fifth embodiment of the present invention.
Figure 30:
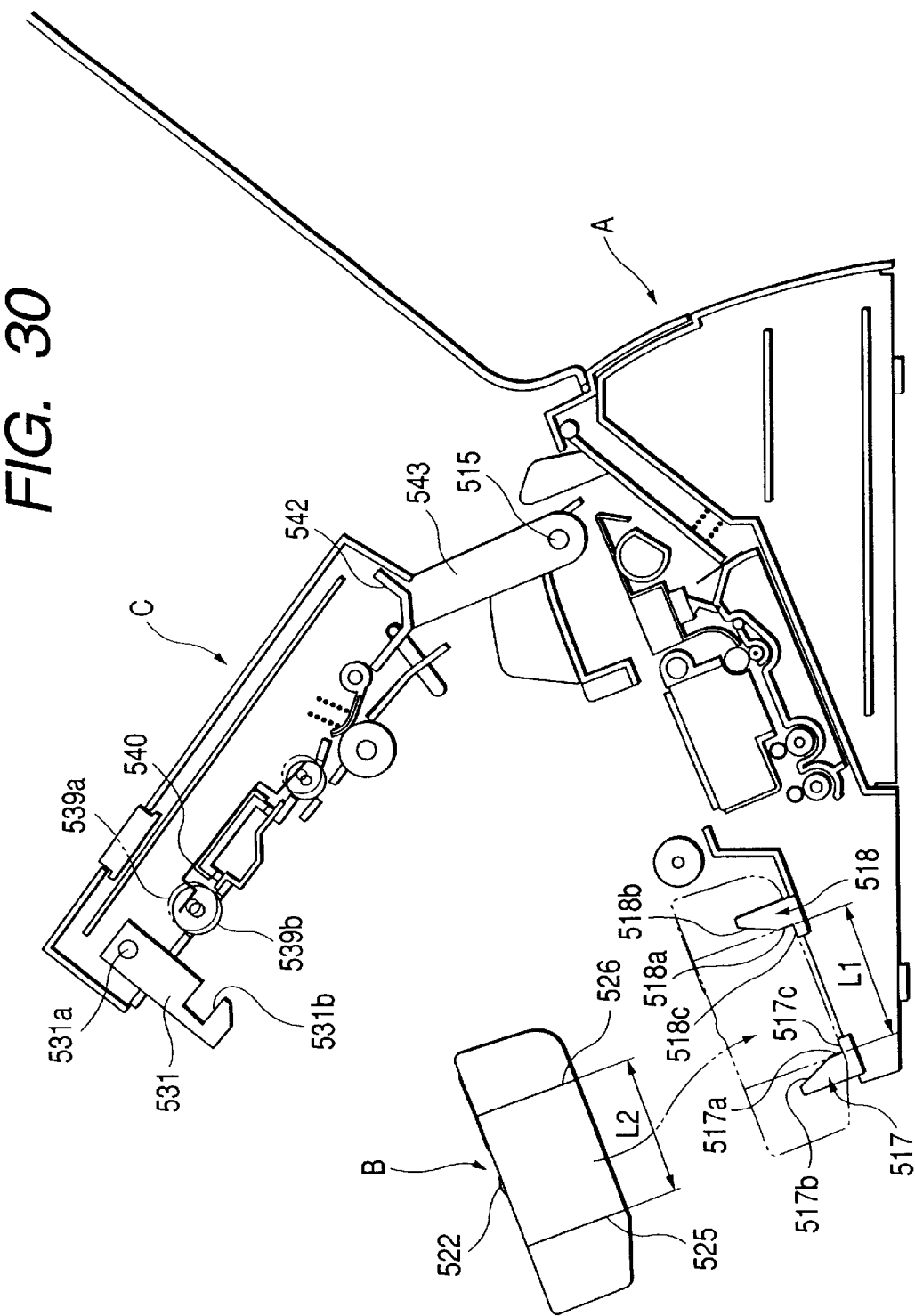
FIG. 30 is a longitudinal sectional front view of the attaching action of a document reading section in the facsimile device of FIG. 29.
Figure 31:
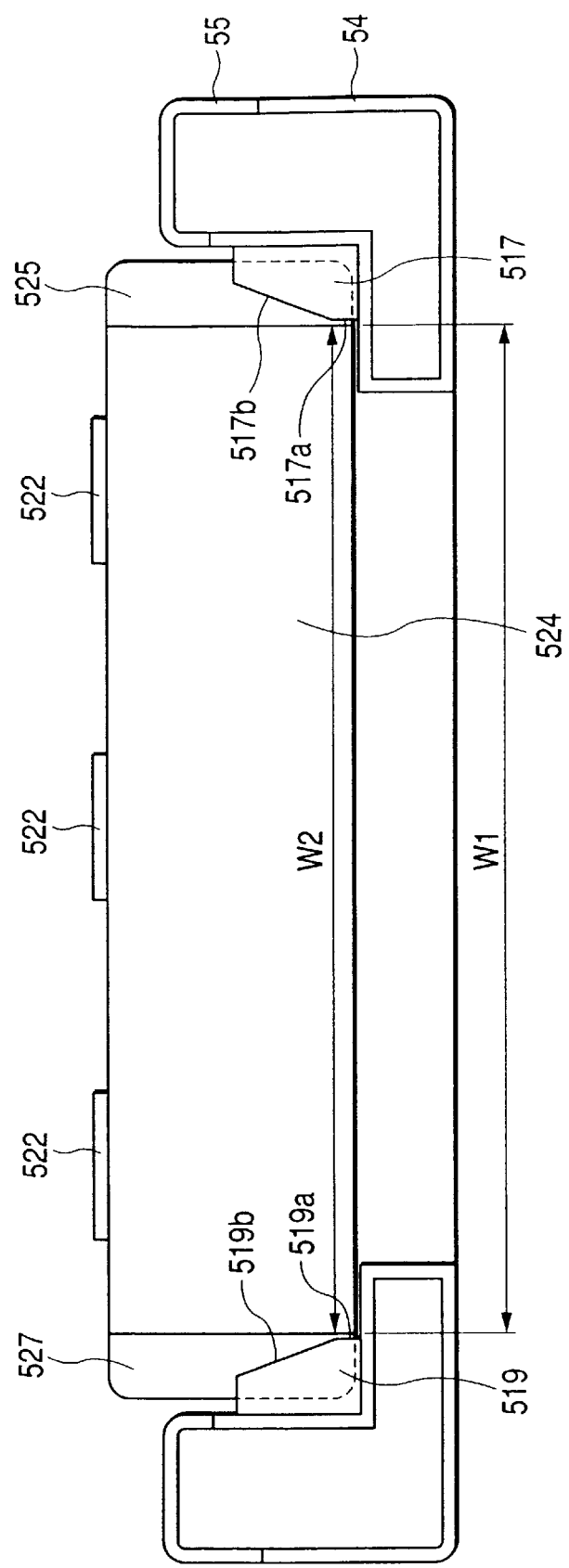
FIG. 31 is a front view showing a positioning section in the document reading section of FIG. 29.
Figure 32:
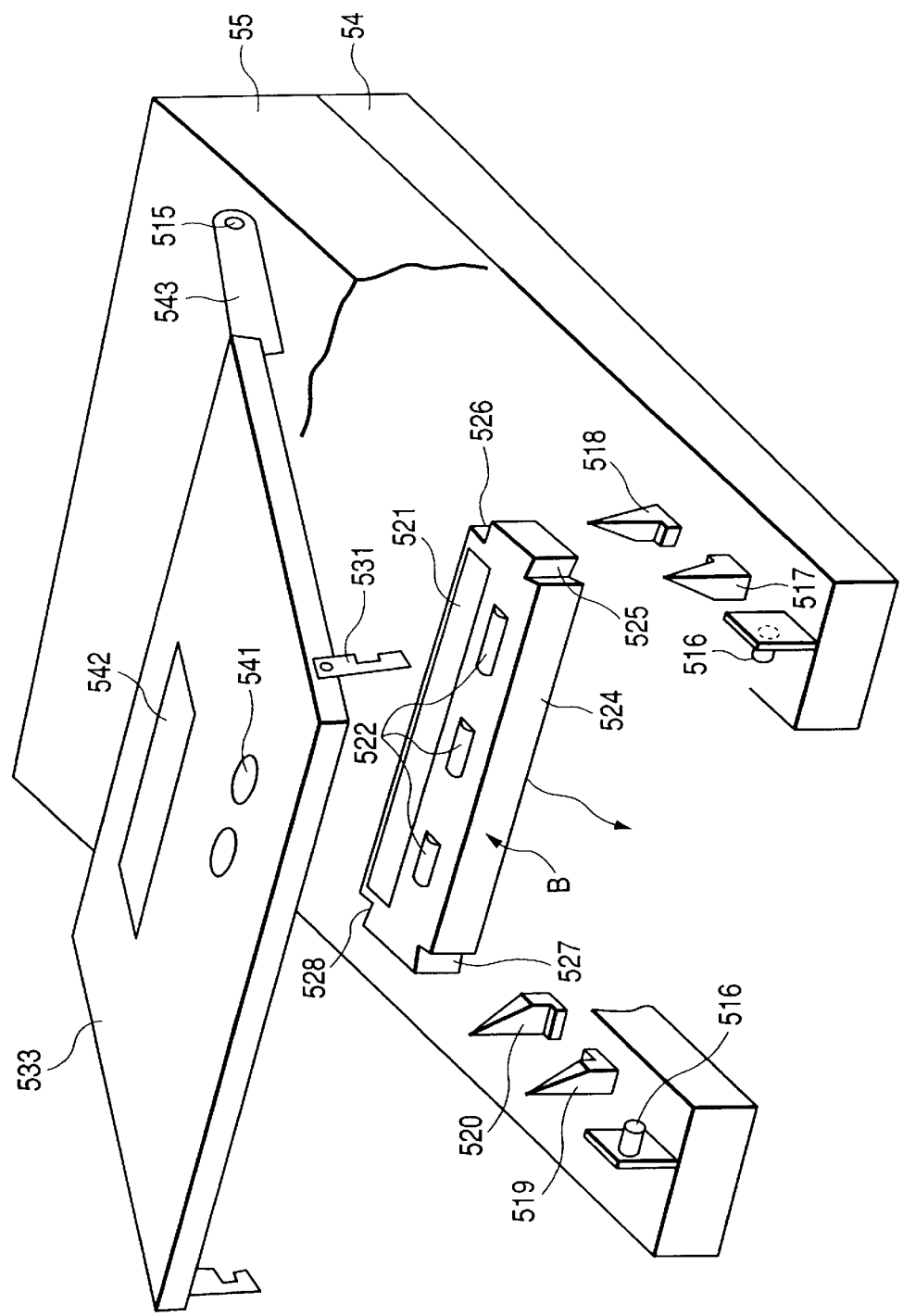
FIG. 32 is a perspective view showing the device body, the document reading section and the positioning section.

A first implementation of a fifth embodiment in which the present invention is applied to the facsimile device will be described hereinafter. FIG. 29 is a sectional view of the entire facsimile device, and FIGS. 30 to 32 are diagrams showing the positional relation, constitution and attaching/detaching operation of the device body, document reading section, reading cover section, and operating section.

First, the entire constitution of the device will be described with reference to FIG. 29. The facsimile device is largely divided into a device body section A, document reading section B, reading cover section C, and the like.

The constitution of the body section (device body) A will first be described. In the body section A, a tray 51 is disposed to hold a recording sheet 52 and a document 53. Moreover, an armor is formed by top and under covers 54 and 55. The under cover 54 is provided with a feeding section 59 for separating/feeding a plurality of recording sheets 52 aligned by a slider 56 on a pressure plate 57 by a feeding roller 58, a recording section 511 for forming an image on the recording sheet 52 by a recording head including an ink cartridge 510, and a reading feeding roller 512 for feeding the document 53 to the document reading section B. Numeral 560 indicates a document conveying path.

Moreover, a lock shaft 516 is disposed on the under cover 54 for engaging with a lock member 531 rotatably supported by a support shaft 531a on the reading cover section C, to hold the reading cover section C in a predetermined position to the body section A. Moreover, the top cover 55 is provided with a document guide 513 for staking the document 53, a document slider 514, a rotating support point 515 which is the rotating center of the reading cover section C, and the like.

Additionally, the document reading section B is held in the predetermined position in the device by an attachment/detachment constitution described later, to read image information of document 52. Numeral 521 denotes a contact sensor (reading means) for converting the document image to an electric signal, and 522 denotes an encoder loader for reading the feeding amount of the document and also serving as a discharging roller. The contact sensor 521 and encoder loader 522, together with the armor formed of a reading guide 523 for guiding the under surface of the document and a housing 524, are attachable to/detachable from the body section A, as the integral unit constituting the document reading section B.

Moreover, the reading cover section C constitutes an integral unit of an upper document guide 532 and a reading cover 533, and a part of the constitution for feeding the document is disposed on the upper document guide 532. Specifically, the document 53 is guided by upper and lower document guides 532 and 534, separated by a separating roller 535 and a separating piece 536, and fed to the reading feeding roller 512.

Additionally, a pinch roller 537 is disposed opposite to the reading feeding roller 512, a white base 538 is opposite to the contact sensor 521, and a discharging roller 539 is opposite to the encoder roller 522. The pinch roller 537 and the discharging roller 539 are pressed by a leaf spring 540 to hold the document 53 therebetween. Moreover, the reading cover 533 serving also as an operation panel includes operation keys such as a start key 541 and display sections such as LCD 542.

The discharging roller 539 and the leaf spring 540 for pressing the roller constitute a second regulating member for pressing and positioning the document reading section B onto the body section A.

The operation of the device constituted as described above will next be described.

The recording sheet 52 is extracted from the feeding section 59, the image is formed in the recording section 511, then the sheet is discharged to the outside of the device from below the reading section B. Moreover, the document 53 is passed through the separating roller 535 and reading feeding roller 536, the image is taken into the document reading section B, then the document is discharged to the outside of the device. Furthermore, for the document reading section B removed from the body A, the contact sensor 521 is brought in close contact with the document, and by manual operation, the read image is taken.

The attachment/detachment constitution of the document reading section B will next be described with reference to FIGS. 30 to 32.

The upper document guide 532 is provided with a hinge 543, and its base portion is supported by the support point 515 and rotated between the positions of FIGS. 29 and 30. Moreover, for the lock member 531 supported by the support shaft 531a on the reading cover 533, by a release lever (not shown), the engagement of a concave portion 531b of the lock member 531 with the lock shaft 516 is released. Therefore, the constitution holds the reading cover section C in the predetermined position to the body section A.

On the other hand, in the document reading section B, notches 525 to 528 (FIG. 32) are formed in four corners of the housing 524. When the notches are engaged with positioning ribs 517 to 520 formed on the under cover 54 of the body section A, the document reading section B is held in the predetermined position to the body section A.

The document reading section B will be described in more detail. FIG. 30 shows the positioning of the document reading section B to the body section A in the document feeding direction. Specifically, a length L2 formed between the notches 525 and 526 of the document reading section B is constituted to be the same as or slightly smaller than a length L1 formed between a vertical portion 517a of the positioning rib 517 and a vertical portion 518a of the positioning rib 518. Moreover, for the positioning ribs 517, 518, inclined faces are formed on the upper inner sides, and L1 is enlarged upward along the ribs.

Therefore, when the document reading section B is inserted to the body section A, inclined faces 517b, 518b serve as rough guides to naturally guide the document reading section B toward the device body. Furthermore, the document reading section B slides down toward the body section A by its own weight, and is held over flat portions 517c, 518c.

Moreover, FIG. 31 shows the positioning of the reading section B to the body section A in the document width direction. Specifically, a width W2 formed between the notches 525 and 527 is constituted to be the same as or slightly smaller than a width W1 formed between a root 517a of the positioning rib 517 and a root 519a of the positioning rib 519. Furthermore, for the positioning ribs 517, 519, inclined faces are formed so that W1 is enlarged upward.

Therefore, when the document reading section B is inserted to the body section A, the inclined faces 517b, 519b serve as rough guides to naturally guide the document reading section B toward the device body. Furthermore, the document reading section B slides down toward the body section A by its own weight, and positioning in the document width direction is performed with the vertical portions 517a, 519a.

As described above, a plurality of positioning ribs 517 to 520 constitute a first regulating member for positioning the document reading section B in the document conveying direction, or performing positioning in a direction intersecting the document conveying direction.

Furthermore, the upward direction of the document reading section B is regulated by the pressing force of the discharging roller 539 (second regulating member) by the leaf spring 540.

As described above, the document reading section B is positioned to the body section A which is the device body, so that stable document conveying of the document 53 is performed. Moreover, since the reading cover section C is locked to the body section A by the lock member 531 and the lock shaft 516, the mounted position of the document reading section B is held without being detached from the body section A.

Moreover, in order to insert the document reading section B into the body section A, by dropping the document reading section B into the positioning ribs 517 to 520 from above, the document reading section B is naturally positioned. Conversely, in order to remove the document reading section B, simply by manually accessing large spaces above and below the document reading section B, the section is easily removed. Furthermore, since the reading feeding roller 512 and positioning ribs 517 to 520 are disposed in the same under cover 54, the positional relation between the reading feeding roller 512 and the contact sensor 521 is maintained with good precision, and the image quality of read image information of the document 53 is enhanced.

<Second Implementation>

Figure 33:
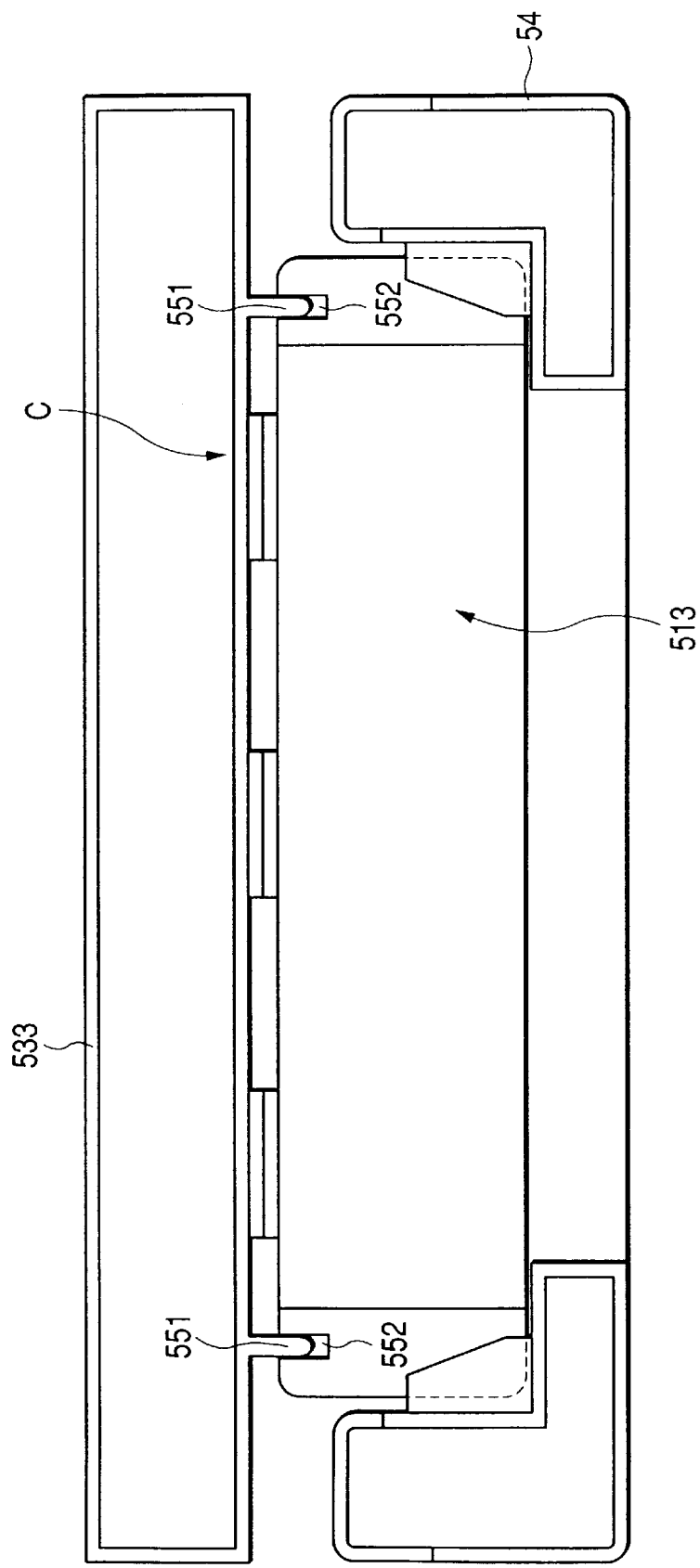
FIG. 33 is a longitudinal sectional front view of the document reading section and positioning section according to a second implementation of the fifth embodiment of the present invention.

In the implementation, the above-described length L1 is set to be sufficiently larger than L2, and the width W1 is also set to be sufficiently larger than the width W2, so that position regulation of the reading section to the body section A is moderated. On the other hand, as shown in FIG. 33, positioning bosses 551 are formed on the upper document guide 532, and additionally, positioning holes 552 to engage with the bosses are formed in the housing 524 of the document reading section B.

Therefore, the document reading section B is positioned to the reading cover section C with high precision. When the reading feeding roller 512 is disposed in the reading cover section C, the read image quality of the document 53 can be enhanced.

<Third Implementation>

Figure 34:
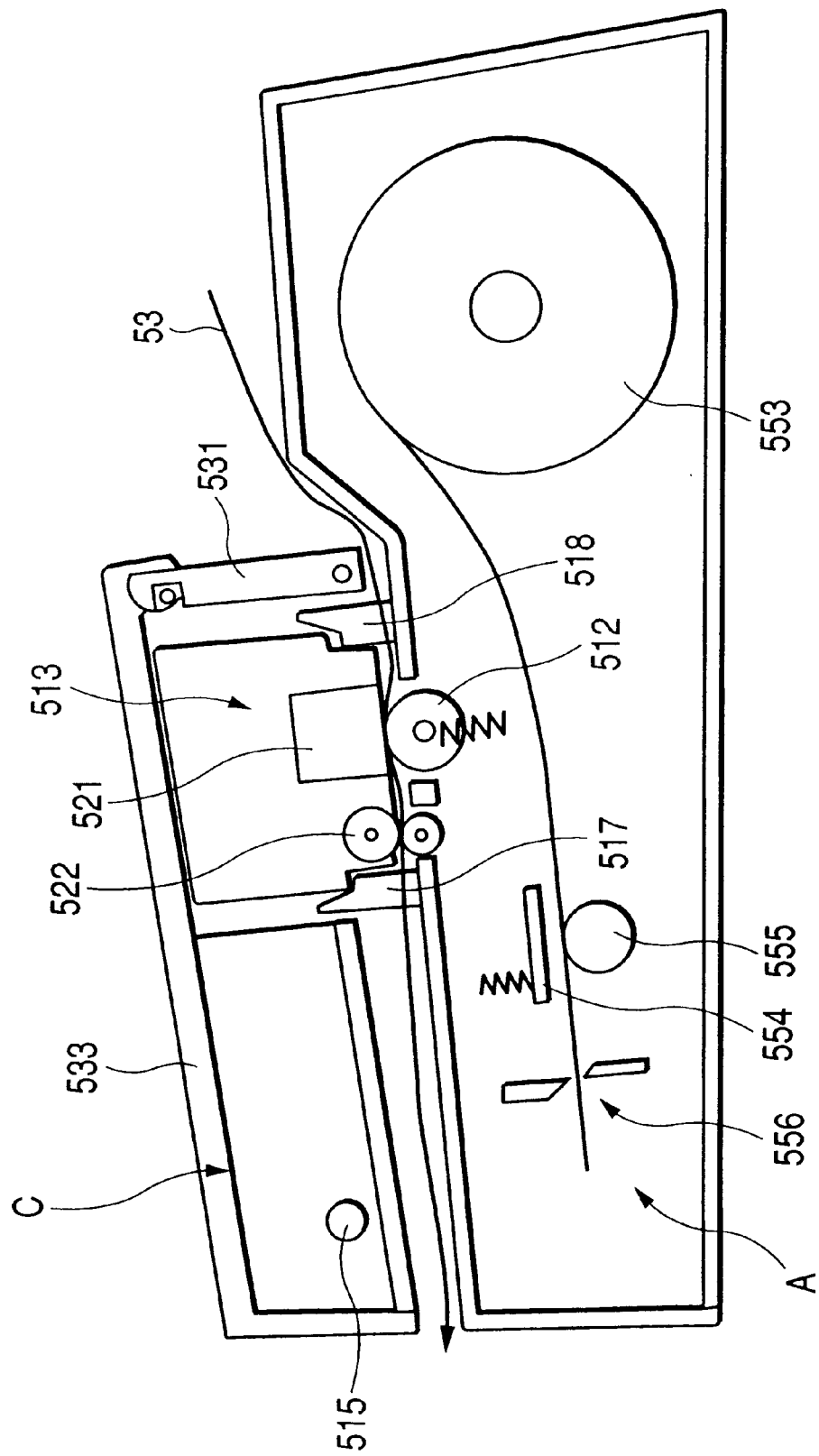
FIG. 34 is a longitudinal sectional side view of the facsimile device according to a third implementation of the fifth embodiment of the present invention.
Figure 35:
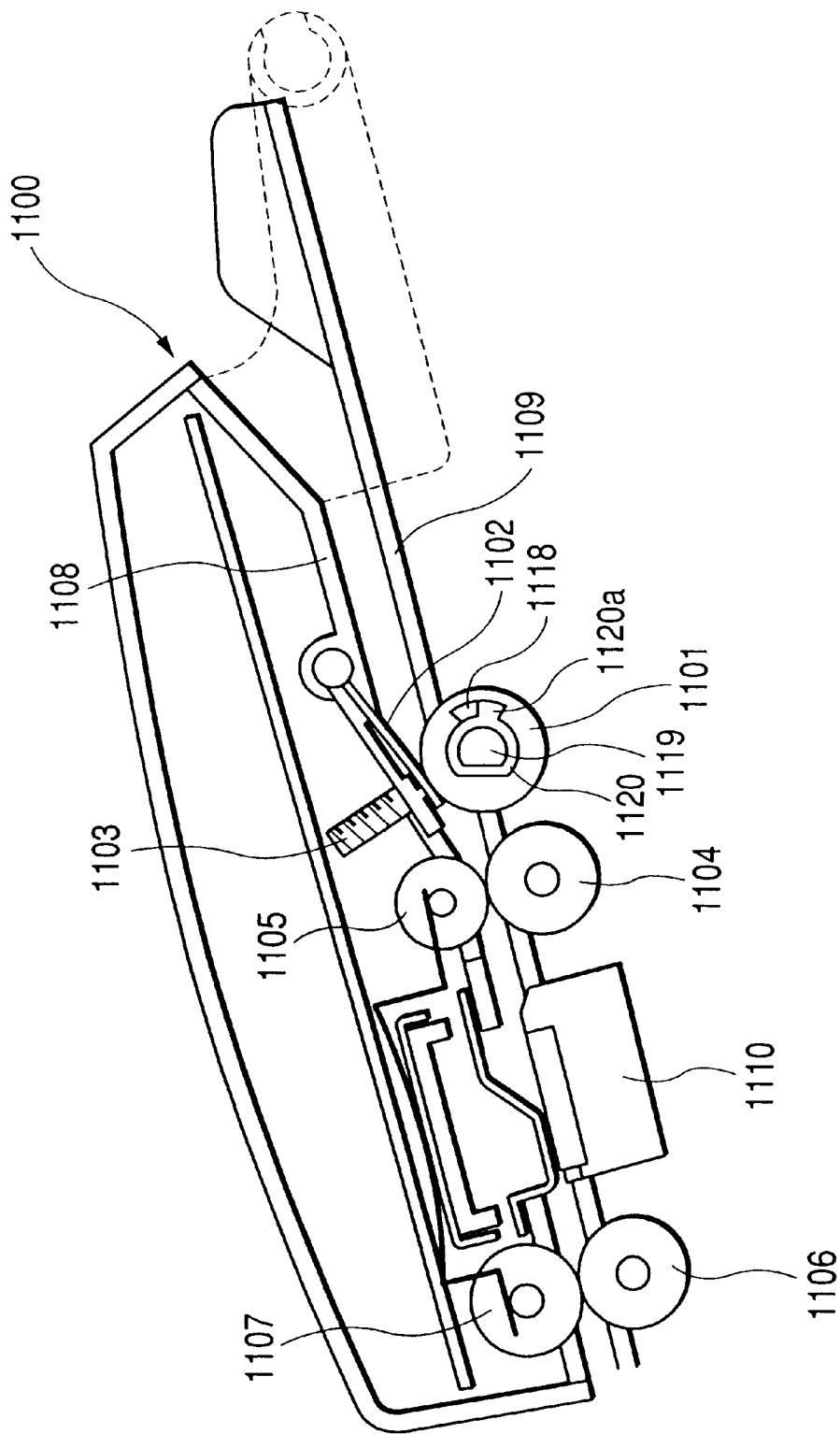
FIG. 35 is a partial sectional front view in the vicinity of a separating roller and a separating piece of a conventional facsimile device.
Figure 36:
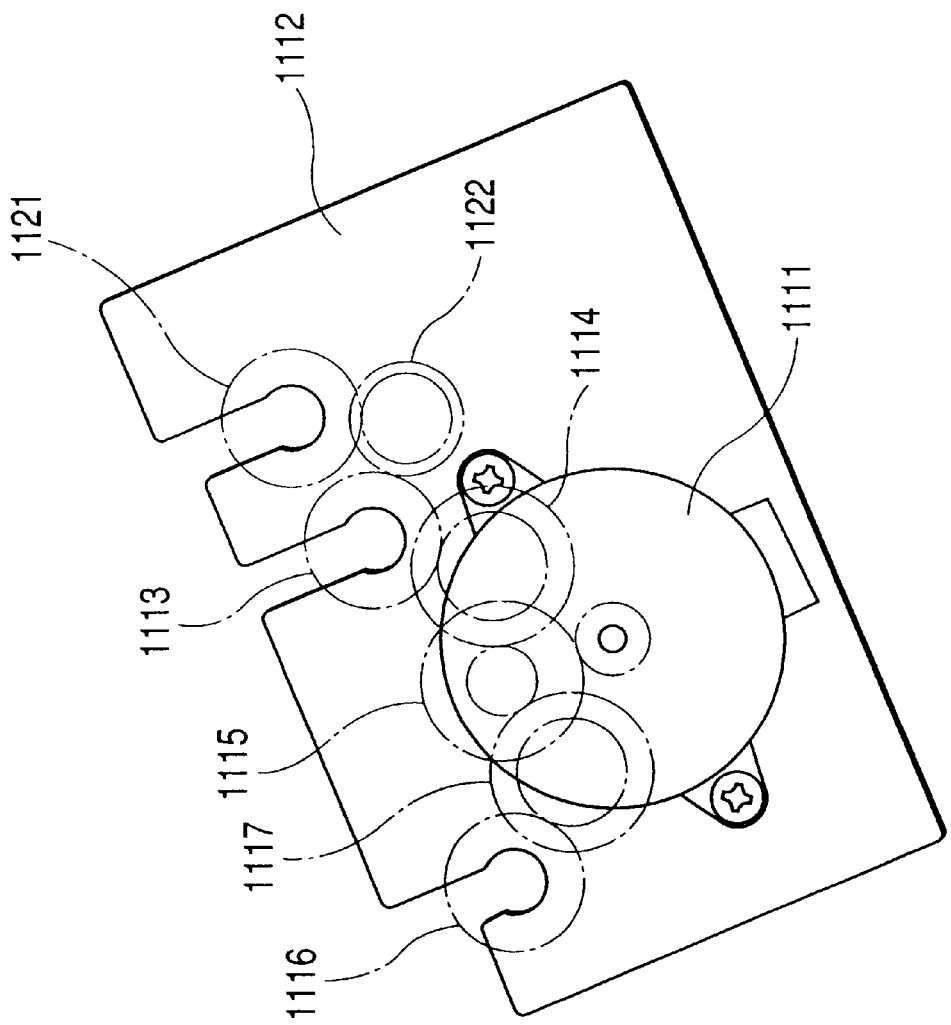
FIG. 36 is a partial front view of the drive system of the reading section in the conventional facsimile device.
Figure 37:
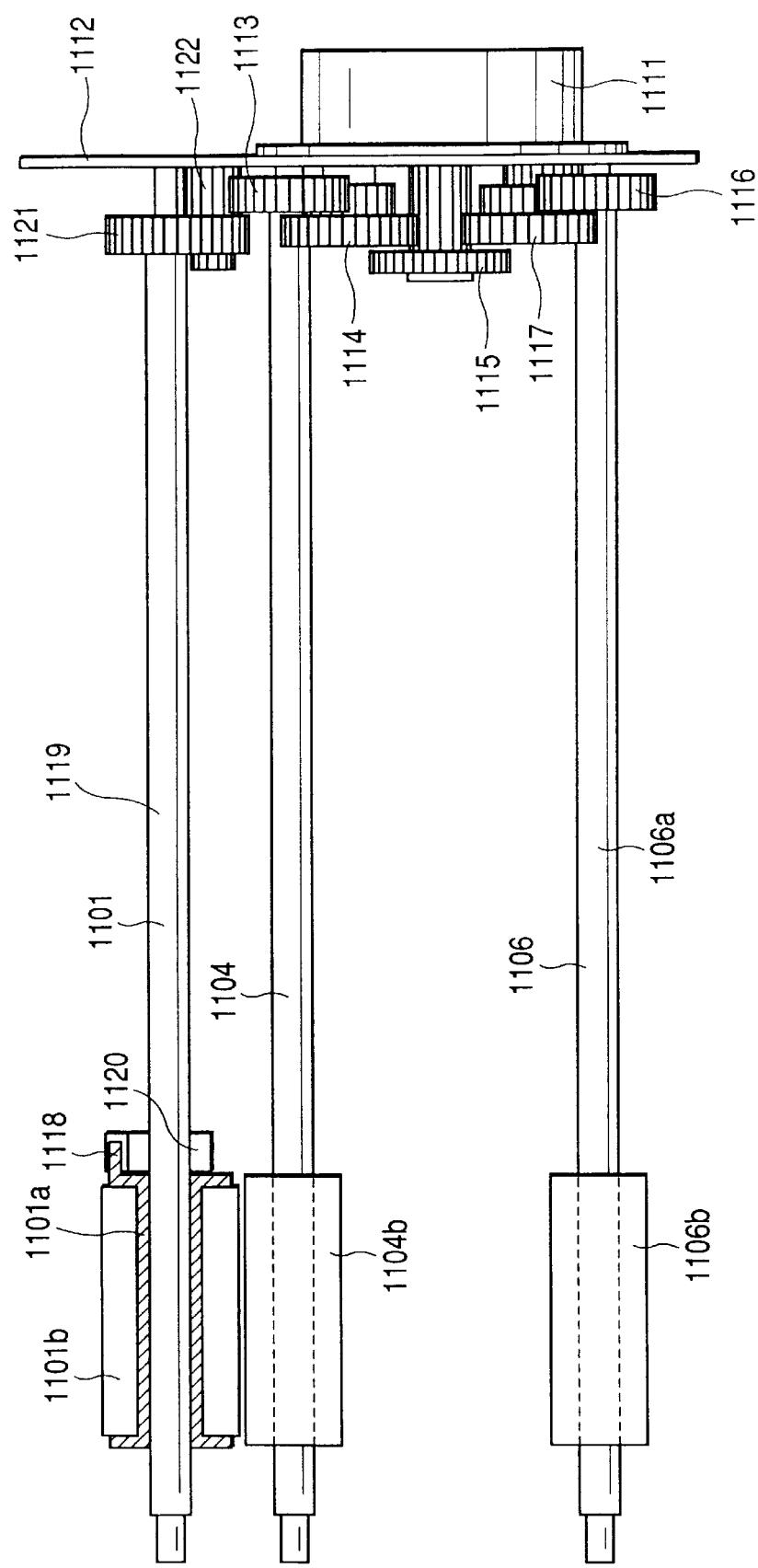
FIG. 37 is a plan view of the drive device of the reading section in the conventional facsimile device.
Figure 38:
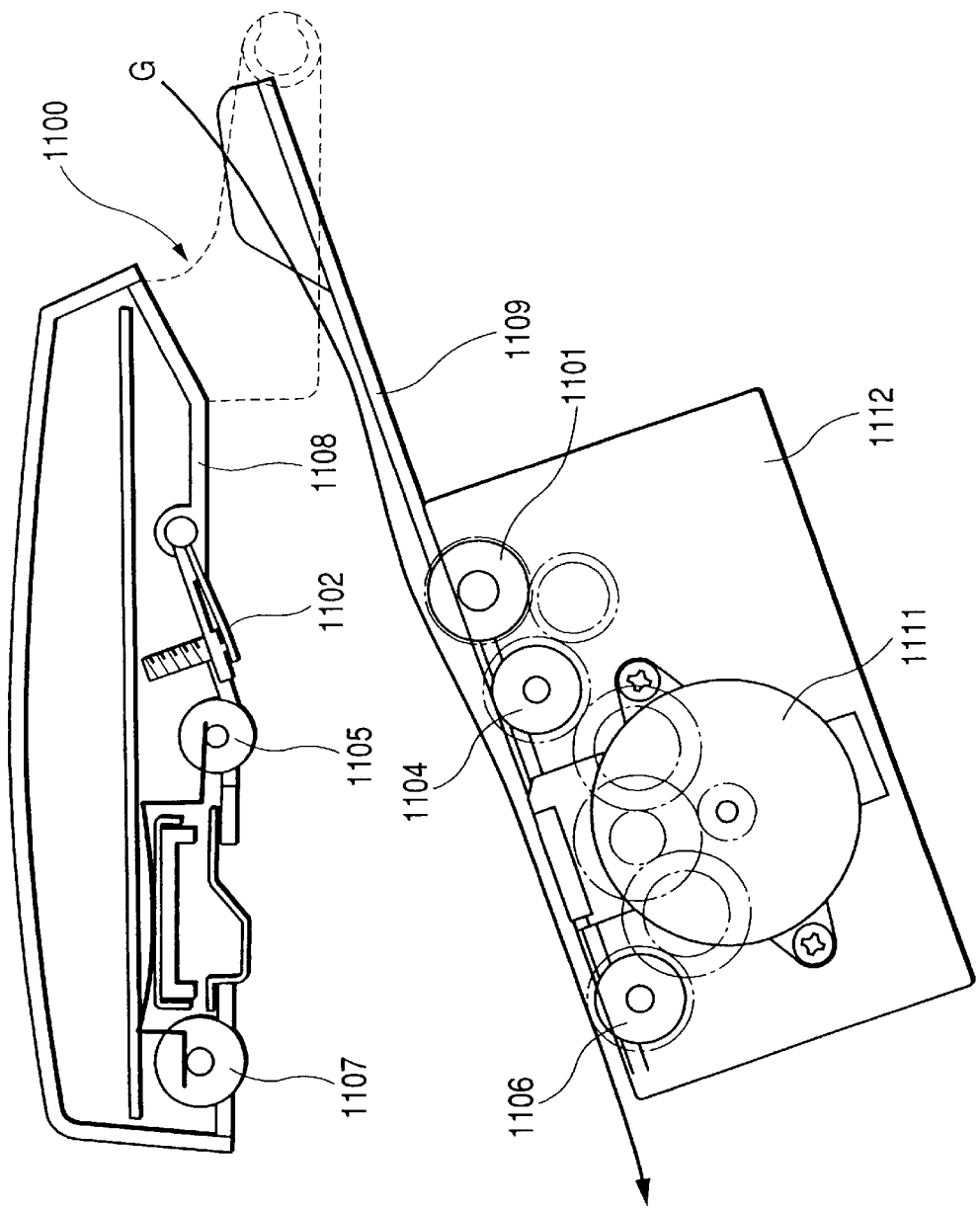
FIG. 38 is a sectional front view in which the sheet conveying path of the conventional facsimile device is opened.
Figure 39:
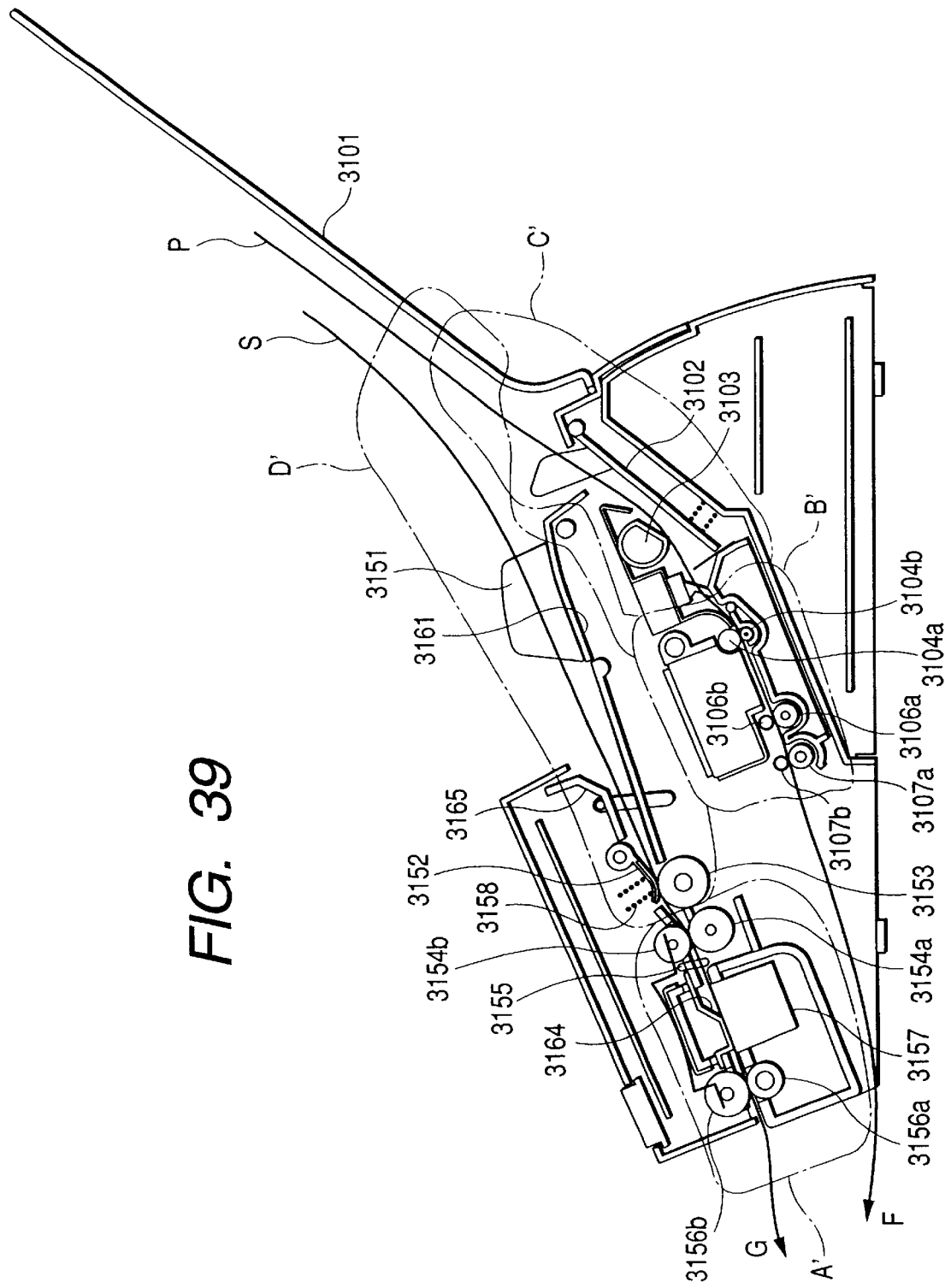
FIG. 39 is a longitudinal sectional side view showing the facsimile device according to the related art as the basis of the present invention.
Figure 40:
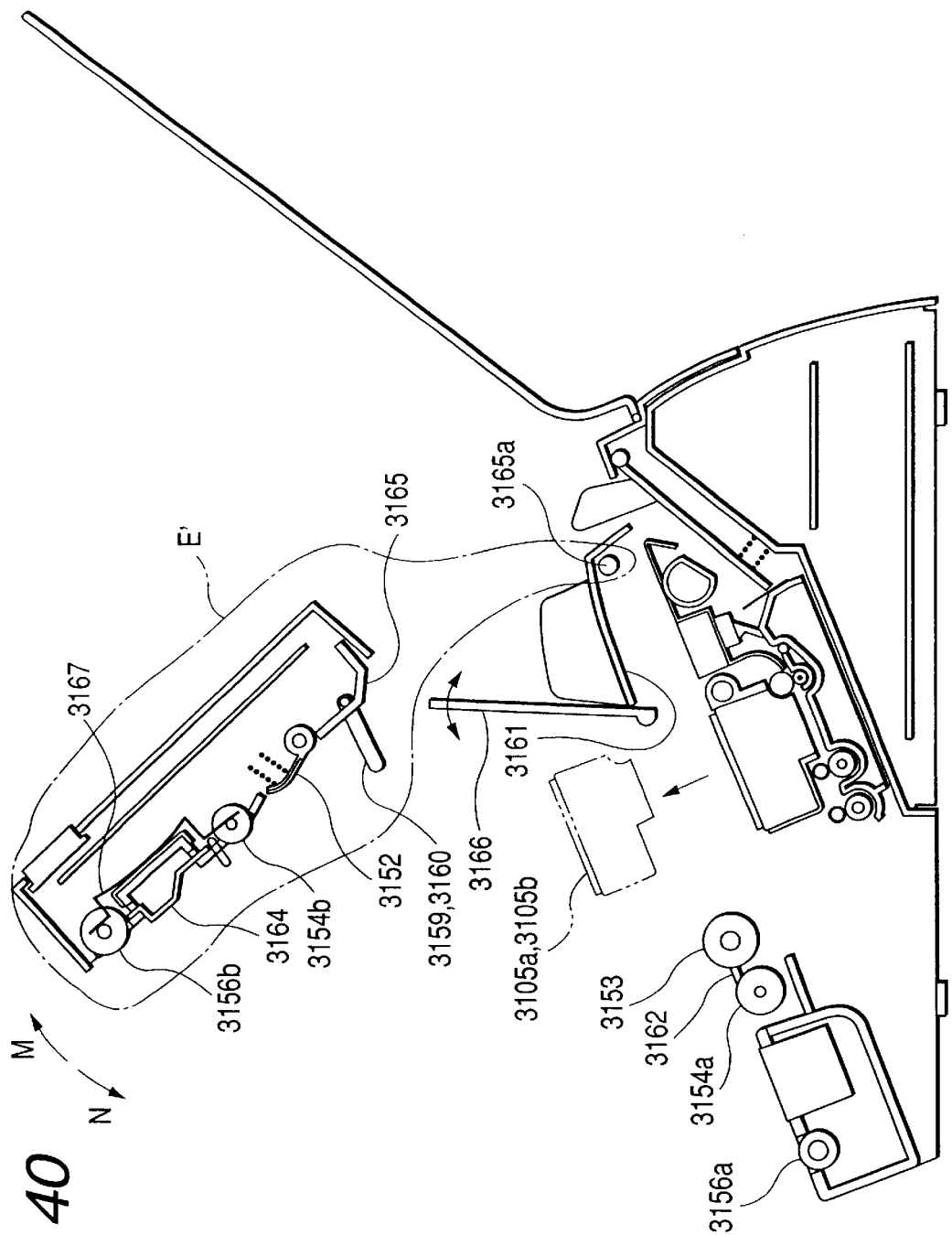
FIG. 40 is a longitudinal sectional front view showing the operation during maintenance of the facsimile device of the related art as the basis of the present invention.
Figure 41:
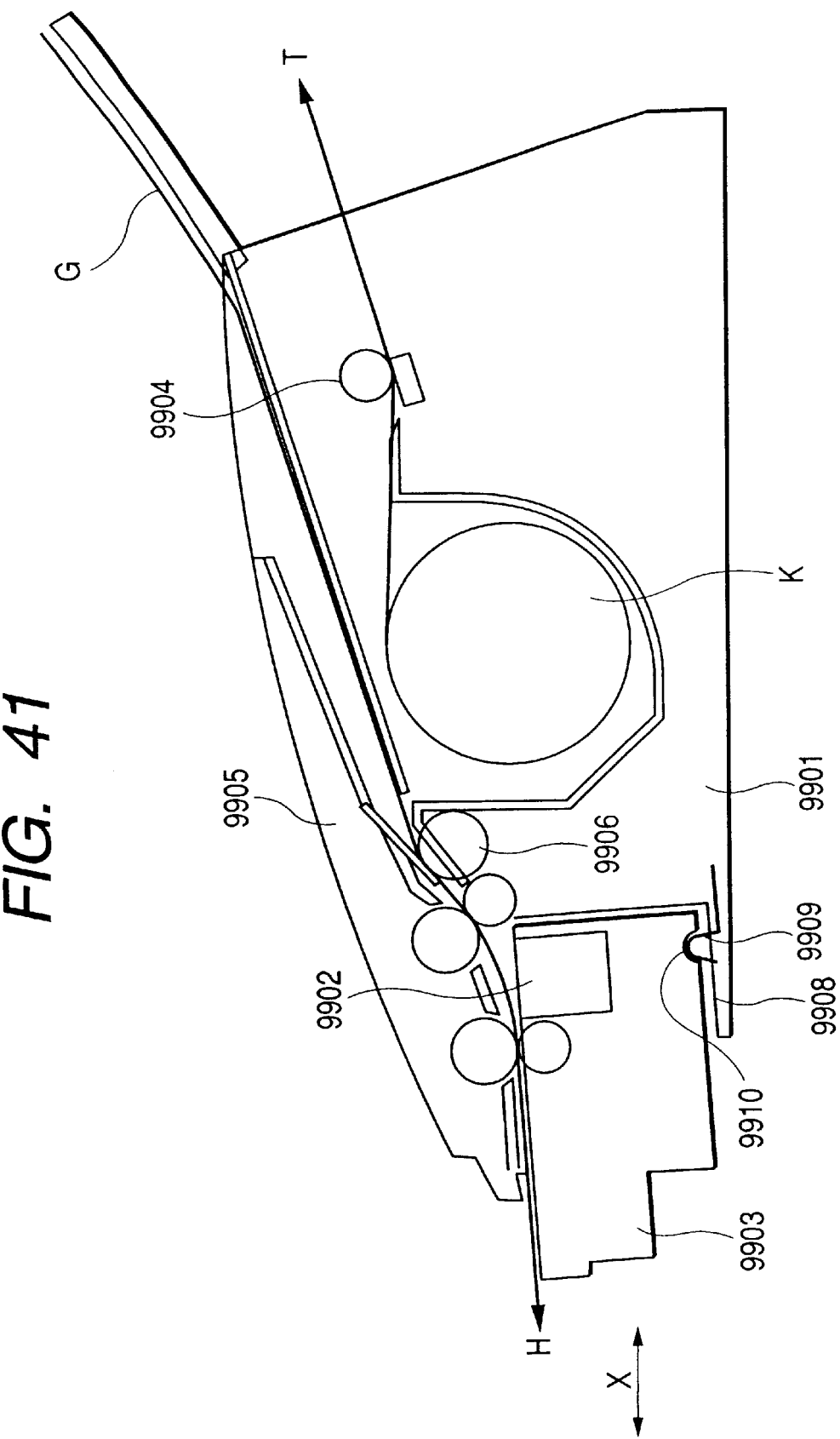
FIG. 41 is a schematic longitudinal sectional side view of the conventional facsimile device.
Figure 42:
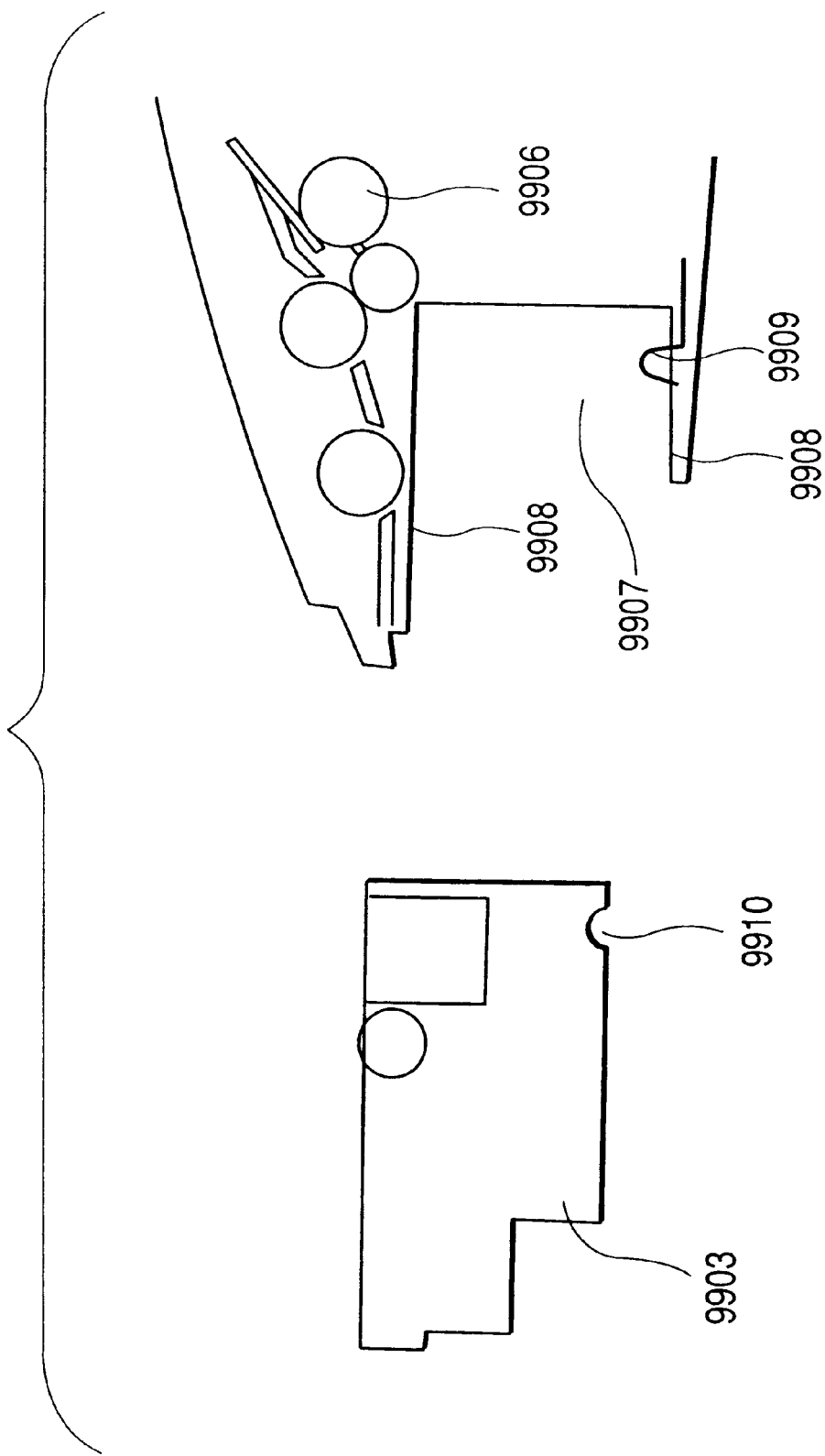
FIG. 42 is a longitudinal sectional side view showing a section from which the hand scanner is removed in the facsimile device of FIG. 41.

FIG. 34 shows a third implementation. In the first implementation, the document reading section B is disposed below the document conveying path 560, but in the third implementation the document reading section B is disposed above the document conveying path 560 (with the contact sensor 521 turned downward). Furthermore, the reading cover section C covering the document reading section from above is disposed to be rotatable in the counterclockwise direction in the drawing. Moreover, the recording section 511 may be constituted of a thermal sensitive recording rolled sheet 553, recording head 554, feeding roller 555, cutter 556, and the like.

In the constitution, in the same manner as in the first implementation, the protection of the reading section, the enhancement of positioning precision, and other effects are obtained. Additionally, since the reading section is positioned above, the operating property is further enhanced. Since the document with its surface facing upward is discharged, the contamination of the document by the recording sheet is prevented.

As described above, according to the present invention, in the case where the document reading section is mounted on the device body, since the positioning means for positioning the document reading section is disposed in the device body or the reading cover section openable/closable to the device body, the document reading section can securely be disposed in the adequate position of the device, and the read image quality of the conveyed document can be enhanced.

Moreover, the document reading section can be inserted to the device body substantially from above for storage, and the portion above the section is covered with the reading cover section. Therefore, the jam handling can easily be performed. Additionally, the action of the external force to the document reading section, the entrance of dust, and the like are prevented.

Furthermore, since the position of the document reading section in the document conveying direction, and the position of the document in the width and vertical directions are securely determined by the first and second regulating members, the document conveying defect caused by the positioning defect of the document reading section, image defects, and the like can be prevented.

What is claimed is:

1. An image reading device, comprising:
   a document conveying path for conveying a document;
   reading means for reading an image of the document conveyed along said document conveying path;
   a sheet conveying path for conveying a sheet; and
   recording means for recording an image on the sheet conveyed along said sheet conveying path;
   wherein said reading means can be detached from the remainder of the device, wherein said reading means reads an image of a document by manual scanning when detached from the device, and wherein when said reading means is detached from the device, a part of said sheet conveying path is opened.

2. The image reading device according to claim 1, wherein said recording means is disposed on an upstream end of the sheet conveying path, and said reading means is disposed on a downstream end of said document conveying path.

3. The image reading device according to claim 2, wherein said reading means is disposed above a sheet discharge port of said sheet conveying path.

4. The image reading device according to claim 1, wherein a top surface portion of said reading means forms a guide of said document conveying path.

5. The image reading device according to claim 4, wherein a bottom surface portion of said reading means forms a guide of said sheet conveying path.

6. The image reading device according to claim 1, further comprising detecting means for detecting that said reading means is attached to/detached from said device body.

7. The image reading device according to claim 1, further comprising an openable unit for opening said document conveying path when said reading means is to be detached from the remainder of the device.

8. The image reading device according to claim 7, wherein the device is divided into a main unit and said openable unit, with said document conveying path as a boundary, and wherein said reading means and said recording means are disposed in the main unit.

9. The image reading device according to claim 8, further comprising separating means for separating a stack of documents to be read, sheet by sheet, the separating means being disposed in the openable unit.

10. The image reading device according to claim 9, wherein said separating means comprises a separating roller and a plate separating member.

11. The image reading device according to claim 8, further comprising: conveying means for conveying the document to said reading means; and a drive source for operating the conveying means, said conveying means and said drive source being disposed in the main unit.

12. The image reading device according to claim 1, wherein a sheet conveying direction is the same as a document conveying direction, and said sheet conveying path is disposed under said document conveying path and substantially parallel to said document conveying path.

13. An image reading device, comprising:
a document conveying path for conveying a document;
a scanner having a contact sensor for reading an image of the document conveyed along said document conveying path;
a sheet conveying path for conveying a sheet; and
an ink jet head for recording an image on the sheet conveyed along said sheet conveying path,
wherein said scanner is detachable from the remainder of the device,
wherein said scanner reads an image of a document by manual scanning when detached from the device, and
wherein when said scanner is detached from the device, a part of said sheet conveying path is opened.

14. The image reading device according to claim 13, wherein said scanner is disposed above a sheet discharge port of said sheet conveying path, and wherein accessibility to the sheet discharge port is increased when said scanner is detached.

15. The image reading device according to claim 13, further comprising an openable unit for opening said document conveying path, wherein said reading means can be detached from the remainder of the device when said document conveying path is opened, wherein the device is divided into a main unit and said openable unit, with said document conveying path as a boundary, and wherein said scanner and said ink jet head are disposed in the main unit.

16. The image reading device according to claim 15, wherein said openable unit includes a document guide, which covers a recording section in which said ink jet head is disposed, and which provides access to said recording section when said openable unit is opened.

17. The image reading device according to claim 13, wherein a sheet conveying direction is the same as a document conveying direction, and said sheet conveying path is disposed under said document conveying path and substantially parallel to said document conveying path.

18. An image reading device, comprising:
a document conveying path for conveying a document;
reading means for reading an image of the document conveyed along said document conveying path; and
an openable unit for opening said document conveying path,
wherein said reading means can be detached from the remainder of the device when said document conveying path is opened,
wherein said reading means reads an image of a document by manual scanning when detached from the device, and
wherein said openable unit rotates on a fulcrum disposed on an upstream side of a document conveying direction so that said document conveying path can be opened.

19. The image reading device according to claim 18, wherein said fulcrum is disposed from said reading means to an upstream side of the document conveying direction.

20. The image reading device according to claim 18, wherein the device is divided into a main unit and said openable unit, with said document conveying path as a boundary, and wherein said reading means is disposed in the main unit.

21. The image reading device according to claim 20, further comprising separating means for separating a stack of documents to be read, sheet by sheet, said separating means being disposed in said openable unit.

22. The image reading device according to claim 18, wherein a top surface portion of said reading means forms a guide of said document conveying path.

23. An image reading device, comprising:
a document conveying path for conveying a document;
reading means for reading an image of the document conveyed along said document conveying path;
a sheet conveying path for conveying a sheet; and
recording means for recording an image on the sheet conveyed along said sheet conveying path,
wherein said reading means can be detached from the remainder of the device,
wherein said reading means reads an image of a document by manual scanning when detached from the device,
wherein a top surface portion of said reading means forms a guide of said document conveying path, and
wherein a bottom surface portion of said reading means forms a guide of said sheet conveying path.

24. The image reading device according to claim 23, further comprising an openable unit for opening said document conveying path, wherein said reading means can be detached from the remainder of the device when said document conveying path is opened.

25. The image reading device according to claim 23, wherein a sheet conveying direction is the same as a document conveying direction, and said sheet conveying path is disposed under said document conveying path and substantially parallel to said document conveying path.

26. The image reading device according to claim 25, wherein said recording means is disposed on an upstream end of the sheet conveying path, and said reading means is disposed on a downstream end of said document conveying path.

27. The image reading device according to claim 26, wherein said reading means is disposed above a sheet discharge port of said sheet conveying path.

* * * * *

UNITED STATES PATENT AND TRADEMARK OFFICE
CERTIFICATE OF CORRECTION

PATENT NO. : 6,801,344 B2
DATED : October 5, 2004
INVENTOR(S) : Kazuyuki Morinaga et al.

It is certified that error appears in the above-identified patent and that said Letters Patent is hereby corrected as shown below:

Title page,
Item [56], References Cited, FOREIGN PATENT DOCUMENTS,
"EP   0 840 194   5/1998" should read -- EP   0 840 494   5/1998 --.
Item [57], ABSTRACT,
Line 1, "comprises" should read -- comprising --.

Column 4,
Line 14, "cases" should read -- causes --.

Column 23,
Line 23, "mounted" should read -- mounted on --.

Column 30,
Line 39, "roller" should read -- rollers --; and
Line 43, "sate" should read -- state --.

Signed and Sealed this

Twenty-ninth Day of March, 2005

JON W. DUDAS
*Director of the United States Patent and Trademark Office*